US012625412B2

(12) United States Patent
Lee

(10) Patent No.: US 12,625,412 B2
(45) Date of Patent: May 12, 2026

(54) CAMERA ACTUATOR AND CAMERA MODULE INCLUDING THE SAME

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1023 days.

(21) Appl. No.: 17/779,714

(22) PCT Filed: Nov. 23, 2020

(86) PCT No.: PCT/KR2020/016560
§ 371 (c)(1),
(2) Date: May 25, 2022

(87) PCT Pub. No.: WO2021/107524
PCT Pub. Date: Jun. 3, 2021

(65) Prior Publication Data
US 2022/0404683 A1 Dec. 22, 2022

(30) Foreign Application Priority Data

Nov. 29, 2019 (KR) ........................ 10-2019-0157001

(51) Int. Cl.
*G03B 5/06* (2021.01)
*G03B 17/17* (2021.01)

(52) U.S. Cl.
CPC ............... *G03B 5/06* (2013.01); *G03B 17/17* (2013.01); *G03B 2205/0023* (2013.01); *G03B 2205/0069* (2013.01)

(58) Field of Classification Search
CPC .. G03B 5/06; G03B 17/17; G03B 2205/0023; G03B 2205/0069; G03B 5/00; G03B 2205/0007; G03B 2205/0046; G03B 30/00; G03B 5/02; H04N 23/687; H04N 23/55; H04N 23/50; H04N 23/51; H04N 23/54; H02K 41/0356
See application file for complete search history.

(56) References Cited

U.S. PATENT DOCUMENTS

| | | |
|---|---|---|
| 2011/0215889 A1 | 9/2011 | Schworm |
| 2018/0024329 A1 | 1/2018 | Goldenberg et al. |
| 2018/0109660 A1 | 4/2018 | Yoon et al. |

(Continued)

FOREIGN PATENT DOCUMENTS

| | | |
|---|---|---|
| JP | 2002-182258 A | 6/2002 |
| KR | 10-2017-0105236 A | 9/2017 |

(Continued)

*Primary Examiner* — Jennifer D. Carruth
*Assistant Examiner* — Agnes Dobrowolski
(74) *Attorney, Agent, or Firm* — Birch, Stewart, Kolasch & Birch, LLP

(57) ABSTRACT

An embodiment of the present invention discloses a camera actuator including a housing, a mover disposed in the housing, a tilting guide part disposed between the housing and the mover, a driving part disposed in the housing to drive the mover, a first magnetic body disposed at the mover, and a second magnetic body disposed to face the first magnetic body, wherein the tilting guide part is pressed by the mover due to repulsive force of the first magnetic body and the second magnetic body.

15 Claims, 44 Drawing Sheets

(56)  References Cited

U.S. PATENT DOCUMENTS

| | | | |
|---|---|---|---|
| 2018/0203328 A1 | 7/2018 | Kang et al. | |
| 2018/0259787 A1 | 9/2018 | Kim et al. | |
| 2018/0367714 A1 | 12/2018 | Im et al. | |
| 2019/0230256 A1 | 7/2019 | Kao et al. | |
| 2019/0268515 A1* | 8/2019 | Im | ......................... H04N 23/55 |

FOREIGN PATENT DOCUMENTS

| | | | |
|---|---|---|---|
| KR | 10-2018-0041040 A | 4/2018 | |
| KR | 10-2018-0045239 A | 5/2018 | |
| KR | 10-2018-0085460 A | 7/2018 | |
| KR | 101901705 B1 * | 9/2018 | ............ G02B 7/021 |
| KR | 10-2019-0101904 A | 9/2019 | |

* cited by examiner

【Fig. 1】
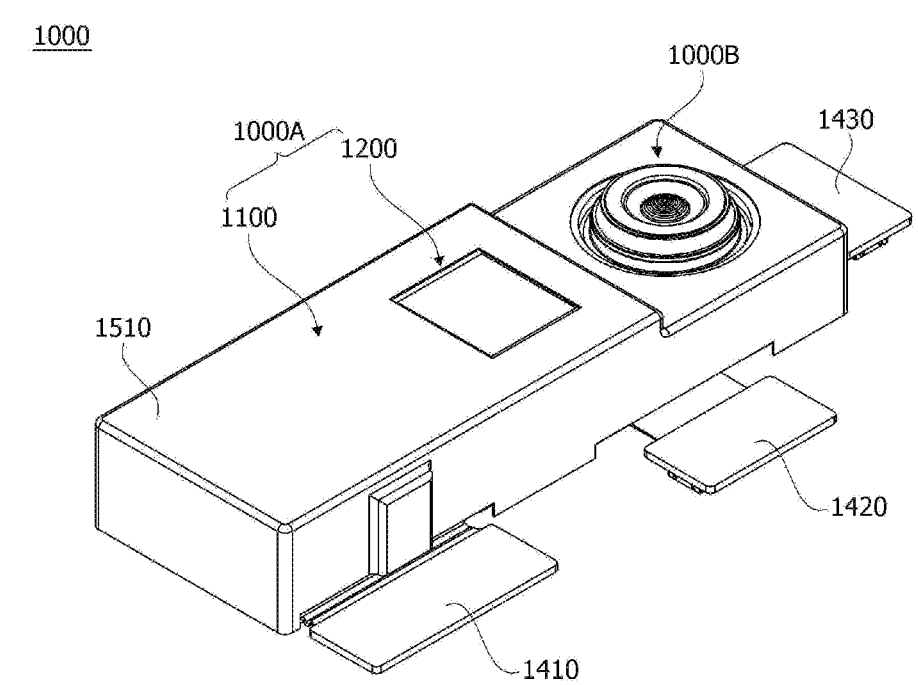
【Fig. 2a】
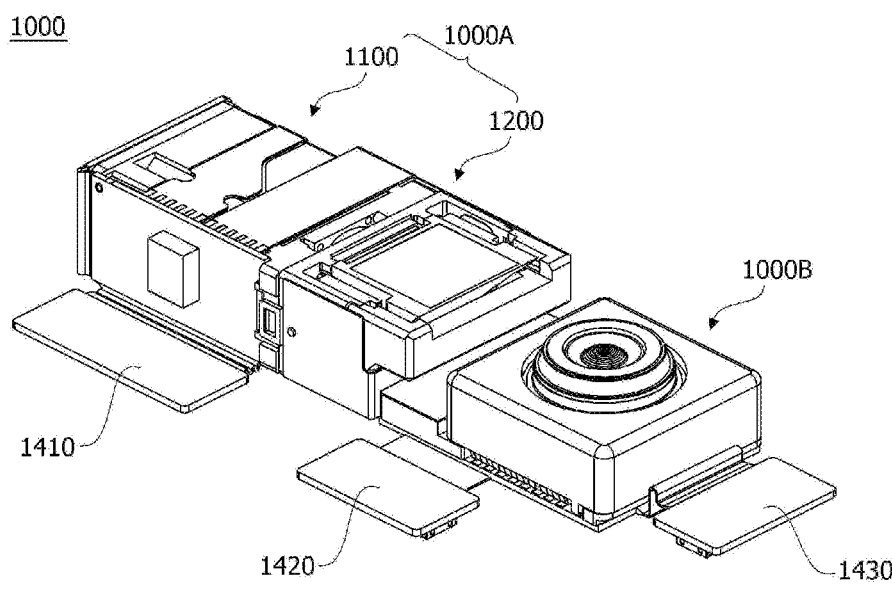

【Fig. 2b】
1000
1000A
1100 1200 1000B
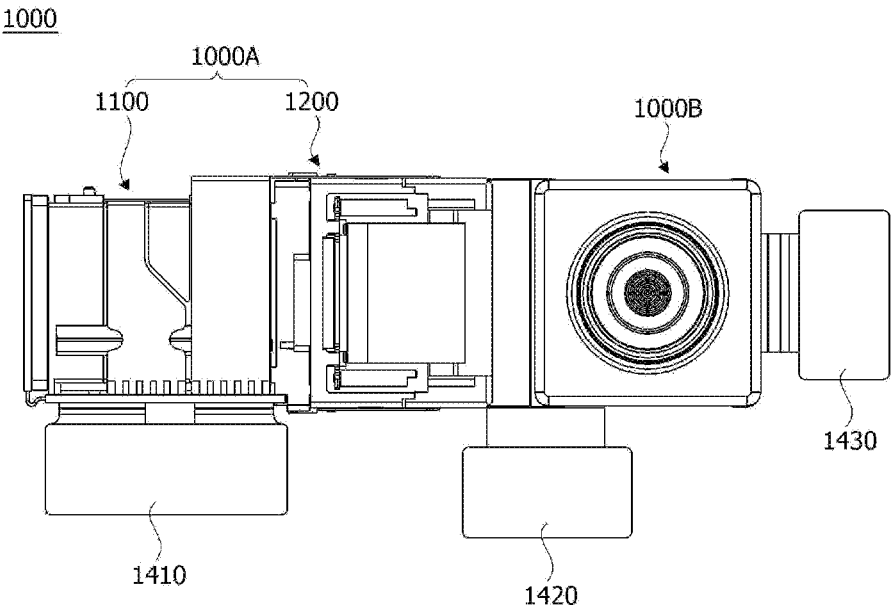
1430
1410 1420
【Fig. 3a】
1000A
1200 1100
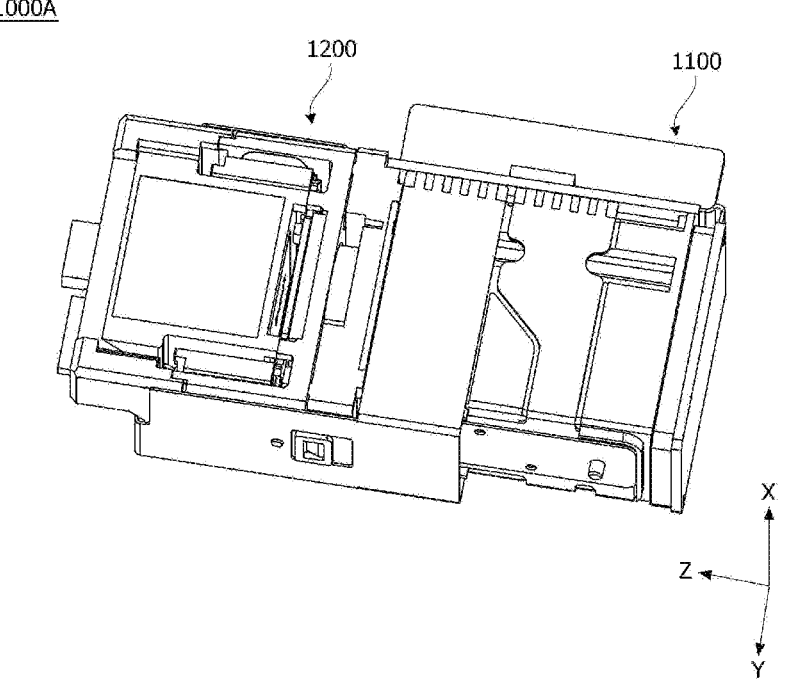

【Fig. 3b】
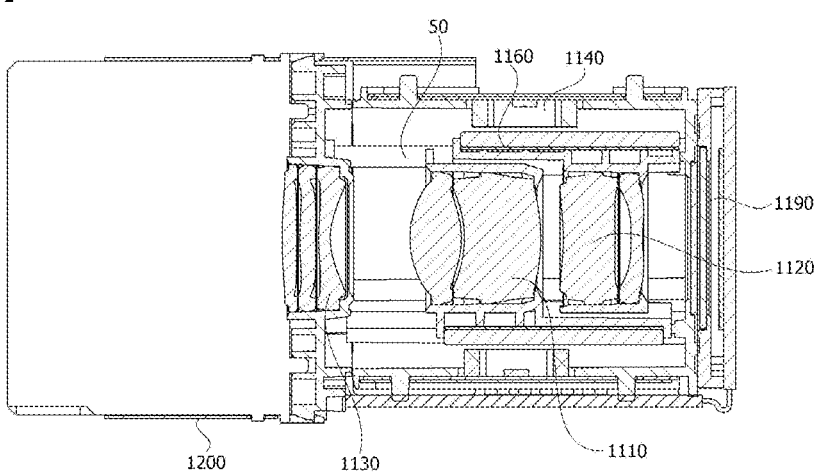
【Fig. 4a】
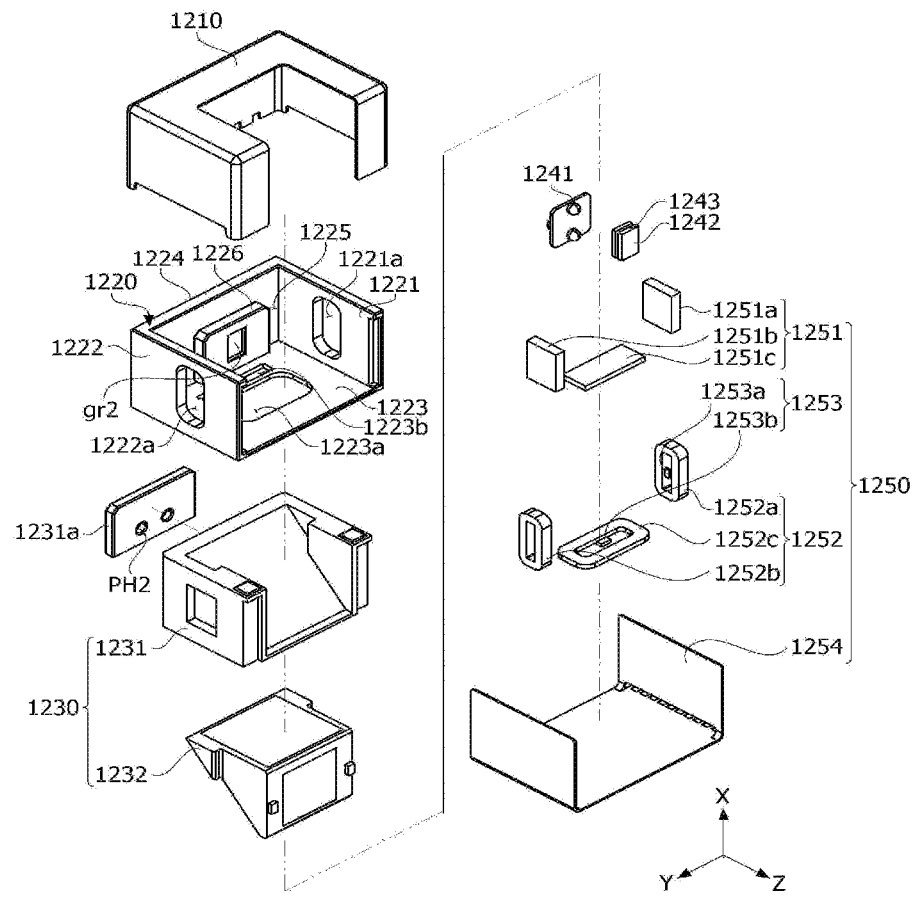

【Fig. 4b】
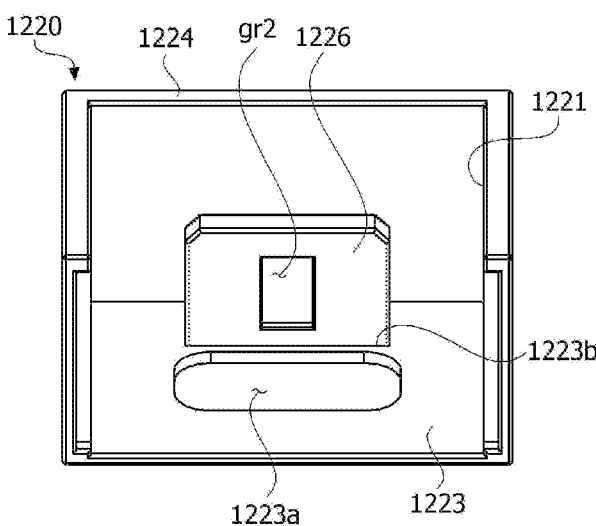
【Fig. 5a】
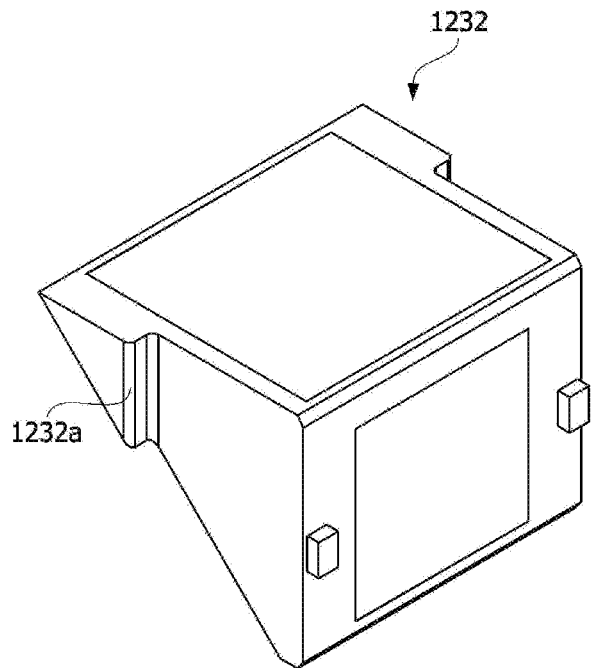

【Fig. 5b】
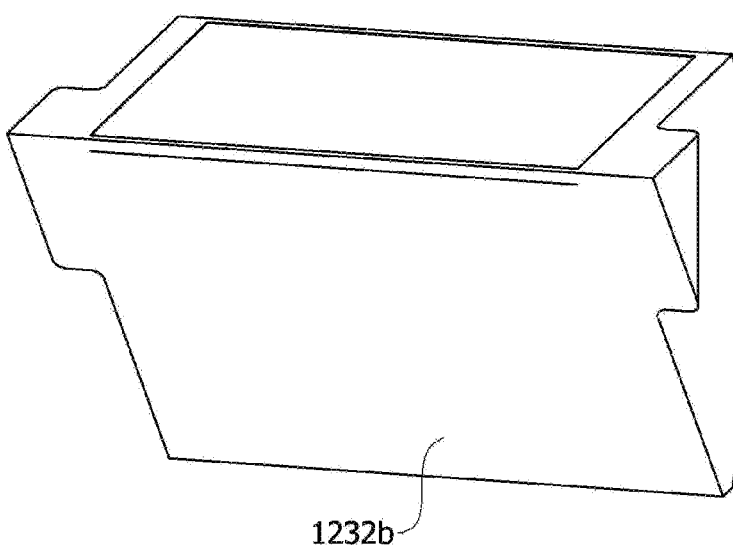
1232b
【Fig. 6a】
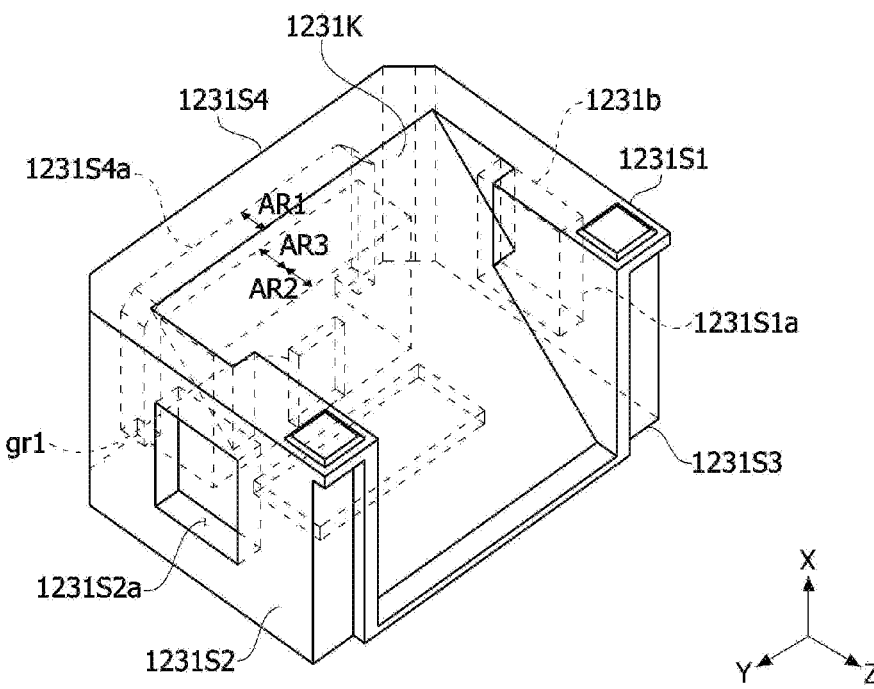

【Fig. 6b】
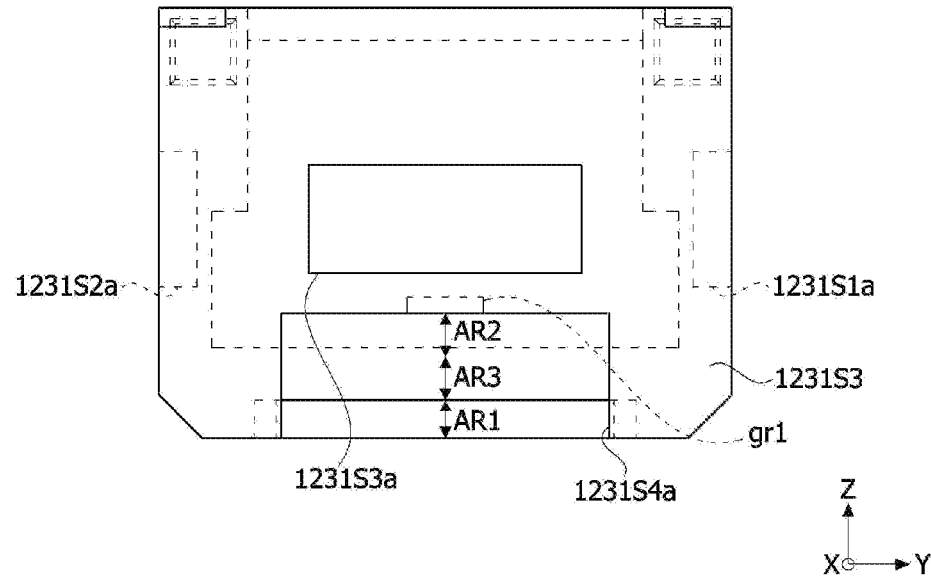
【Fig. 6c】
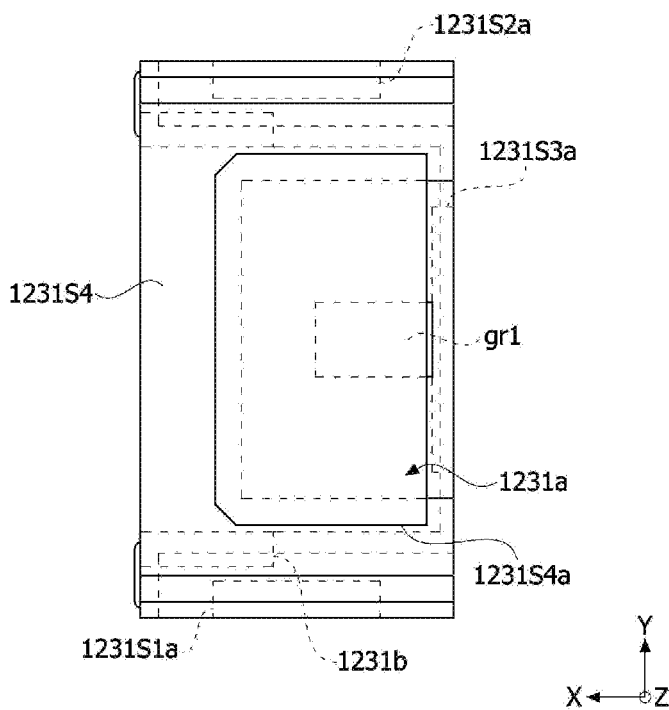

【Fig. 6d】
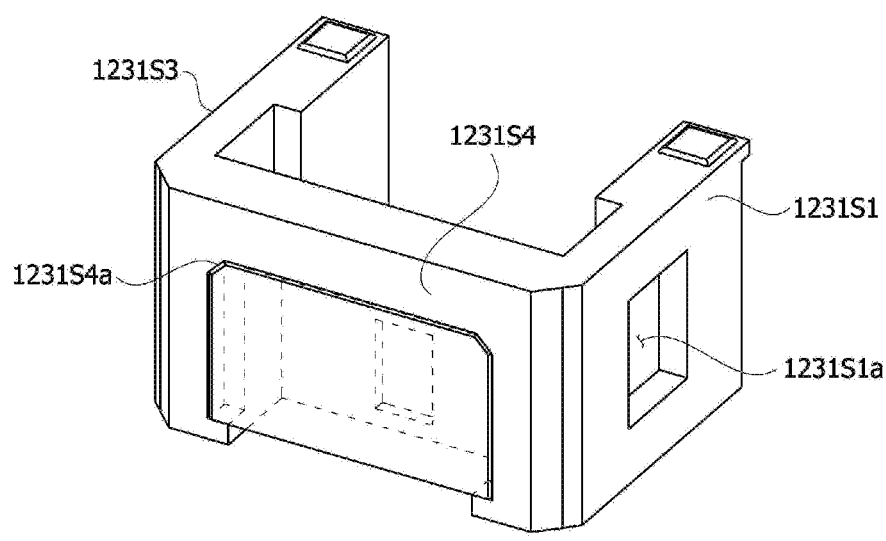
【Fig. 7a】
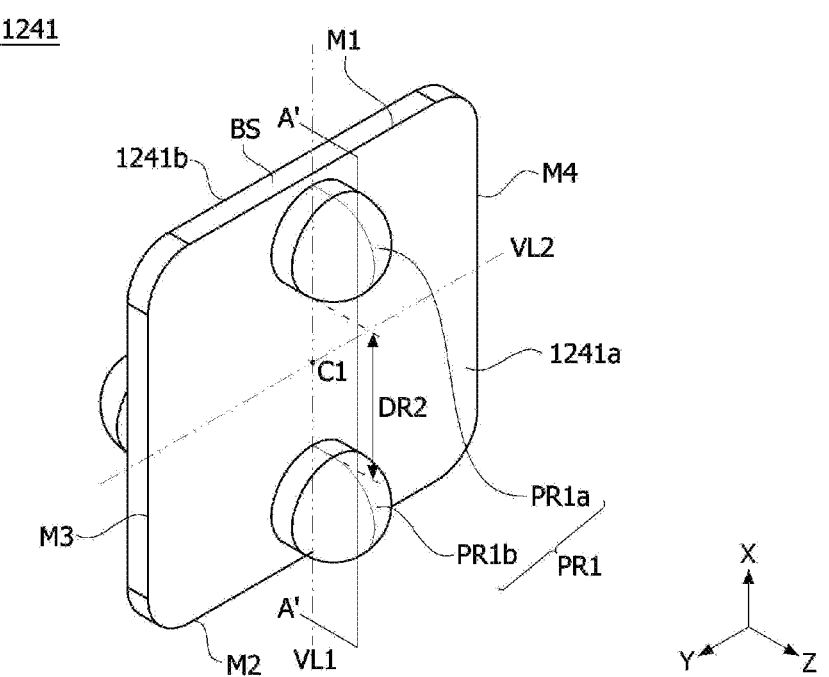

【Fig. 7b】
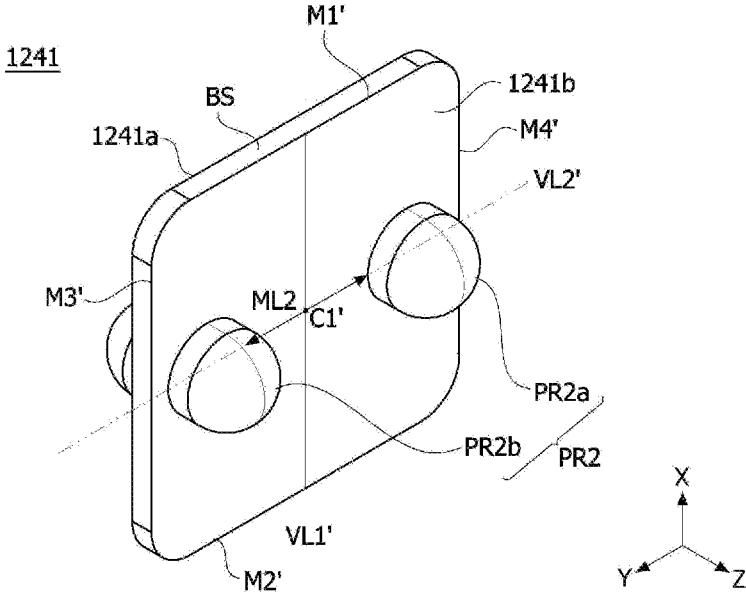
【Fig. 7c】
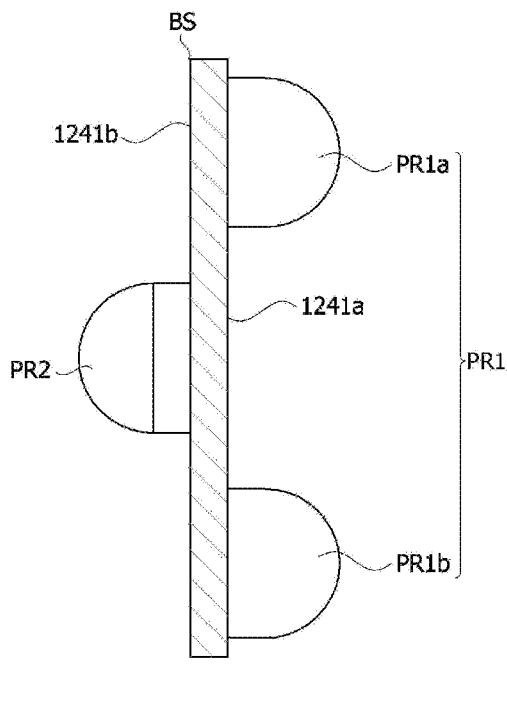

【Fig. 8a】
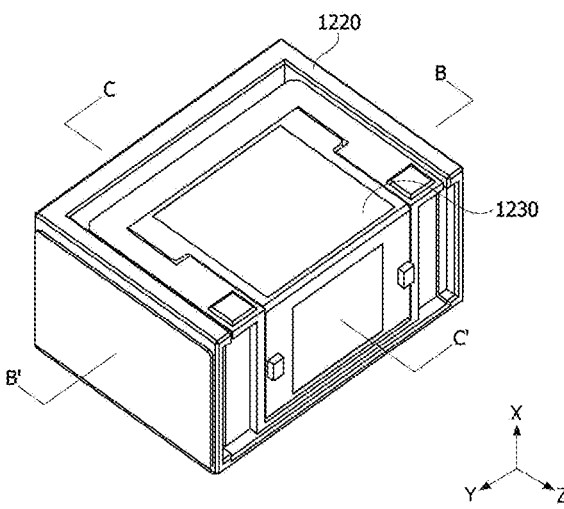
【Fig. 8b】
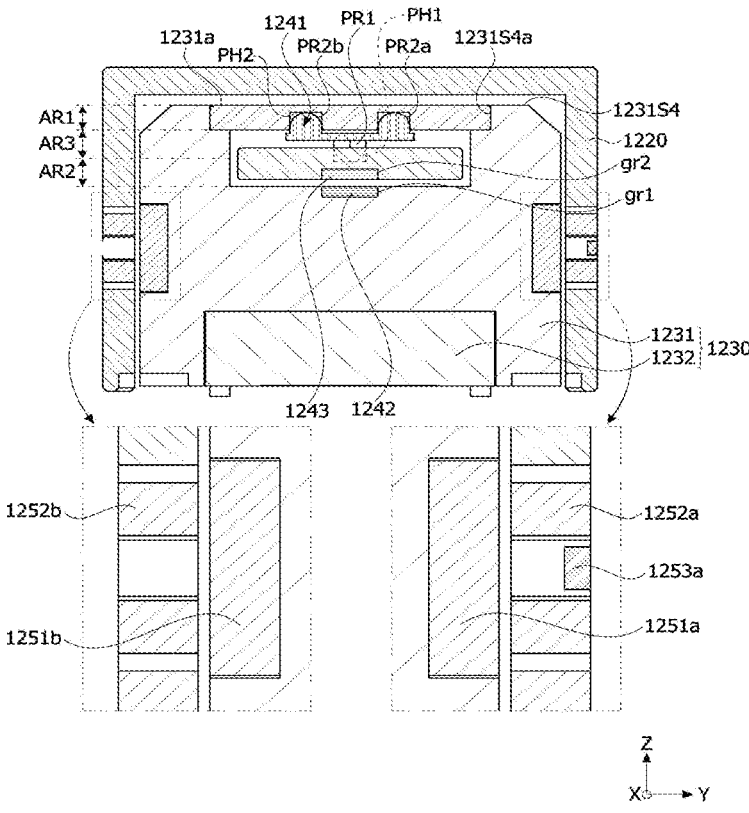

【Fig. 8c】
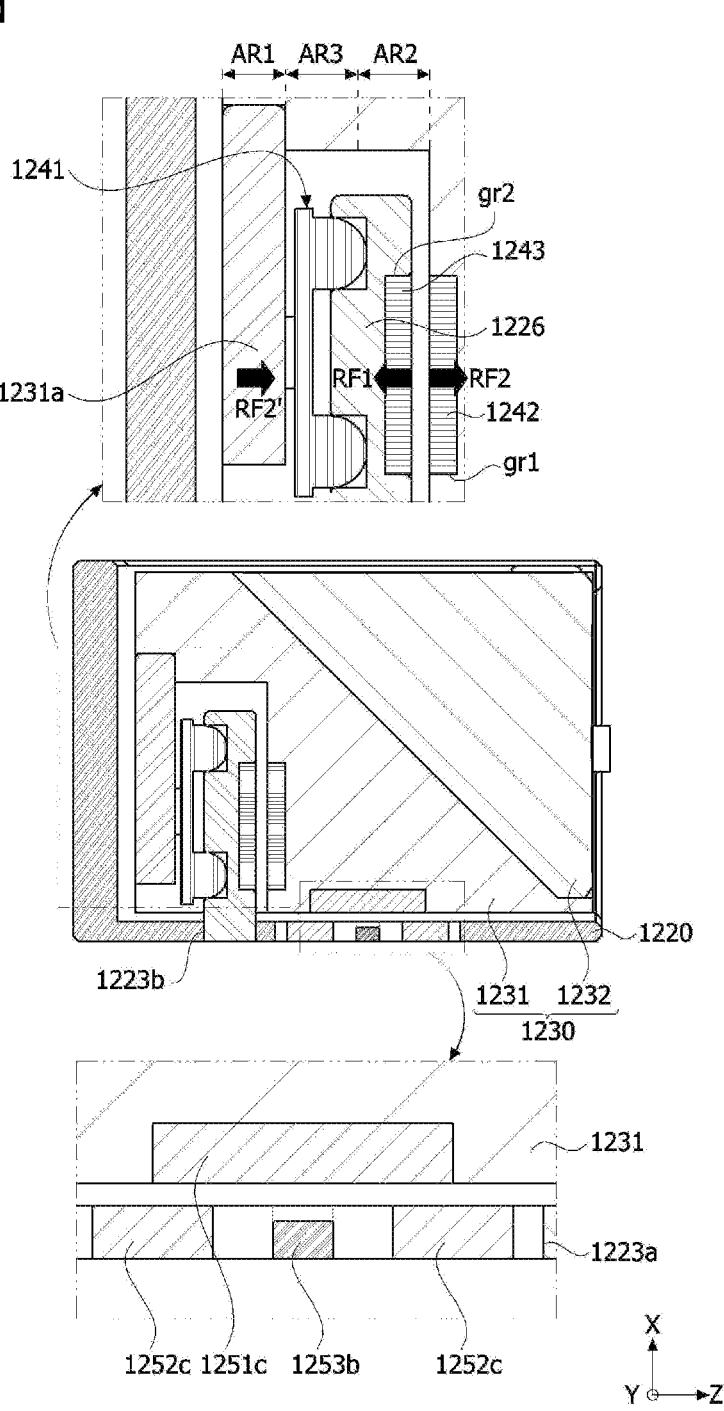

【Fig. 9】
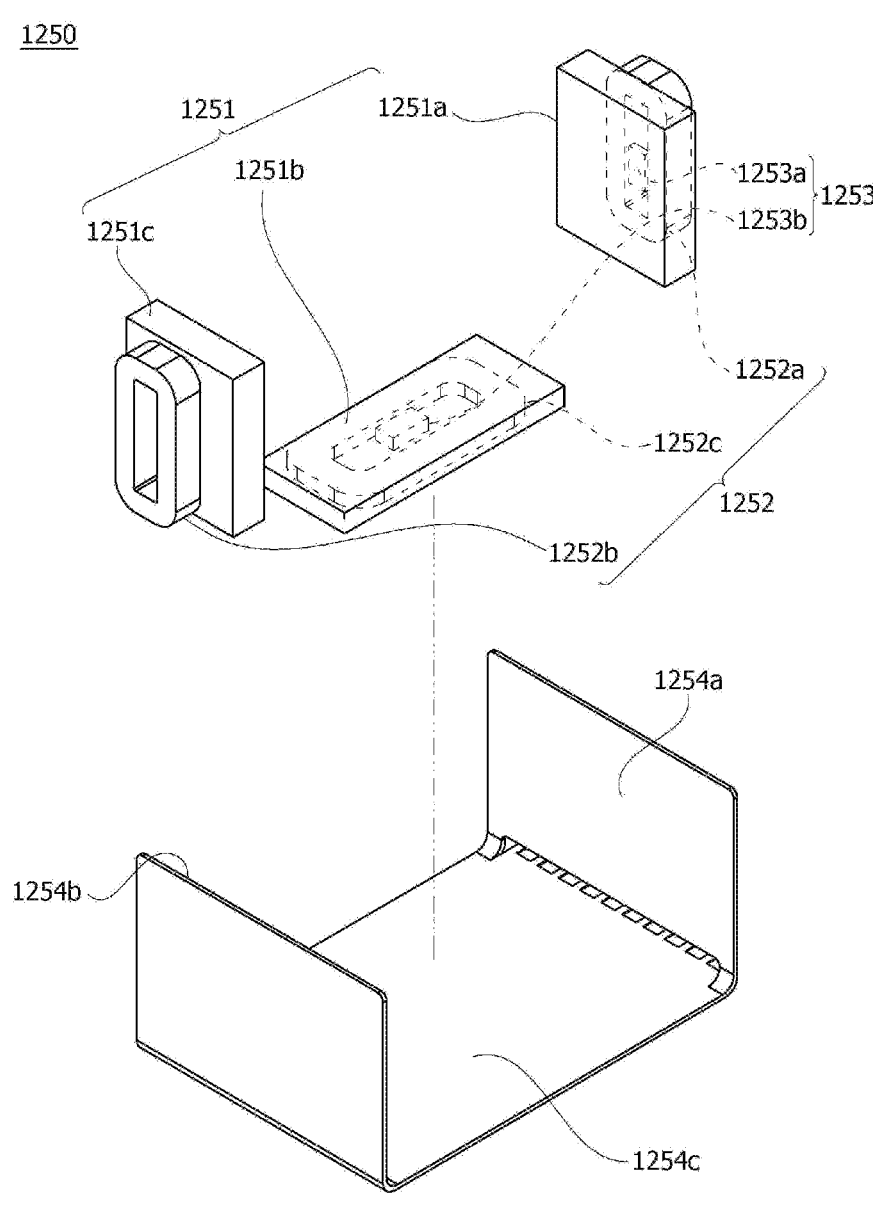

【Fig. 10a】
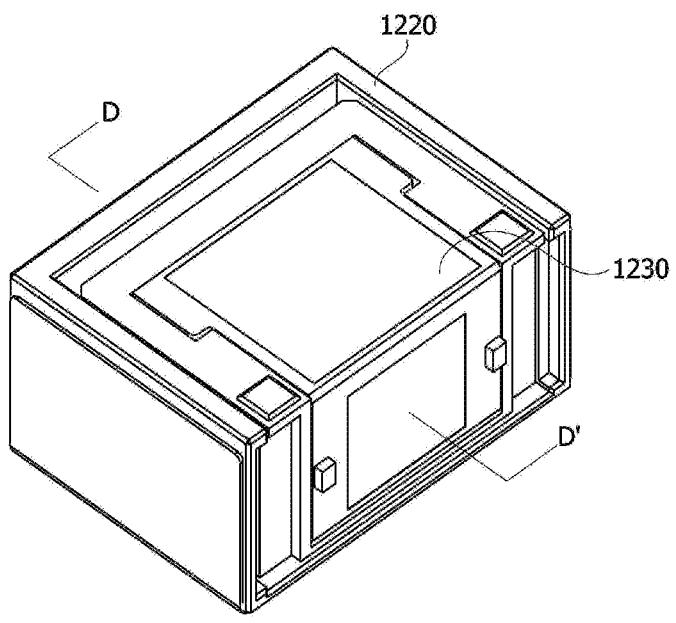
【Fig. 10b】
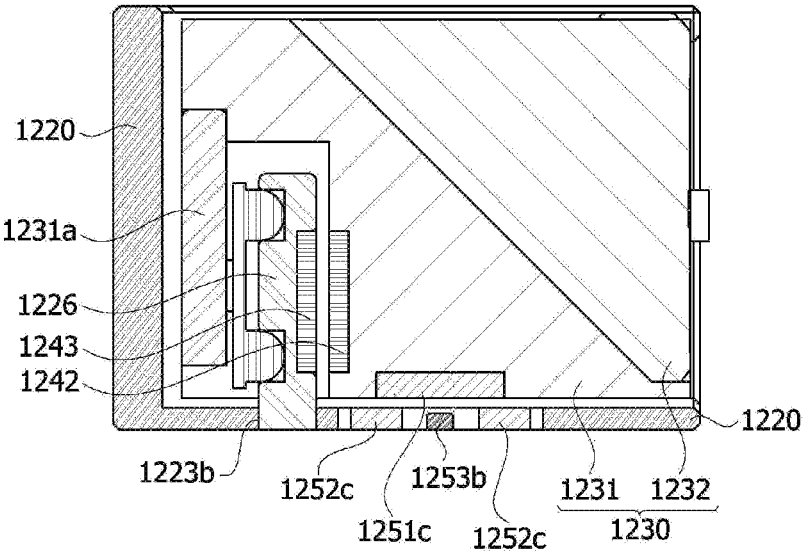

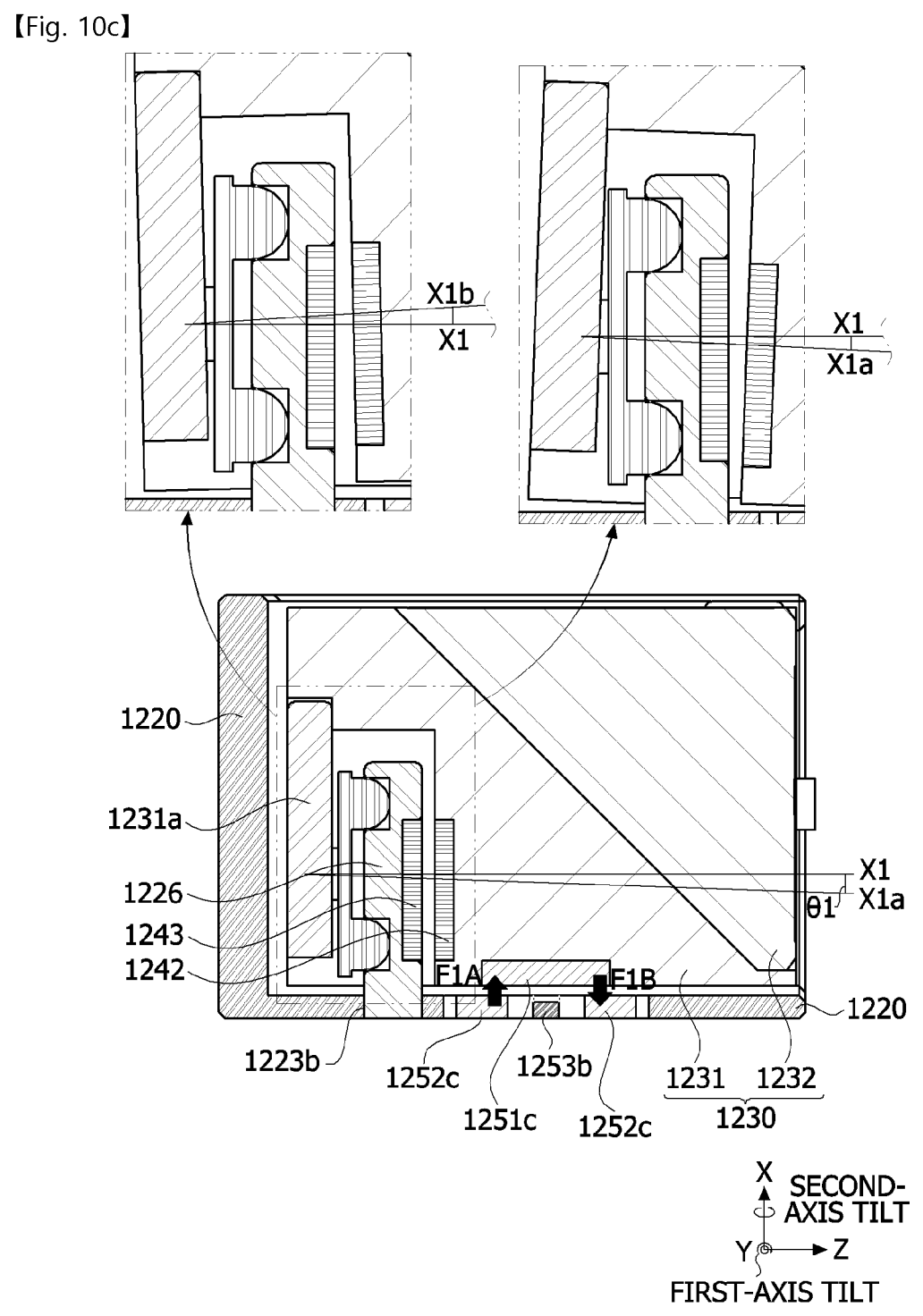

X
SECOND-
AXIS TILT

Y→Z

FIRST-AXIS TILT

【Fig. 11a】
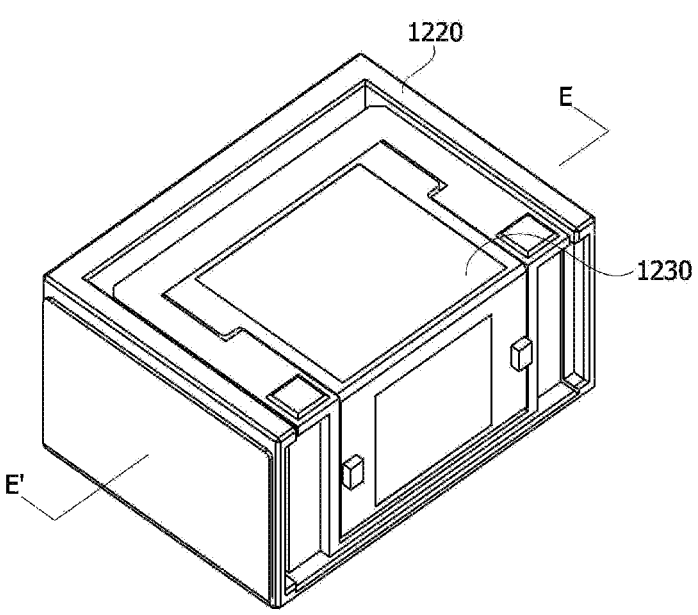
【Fig. 11b】
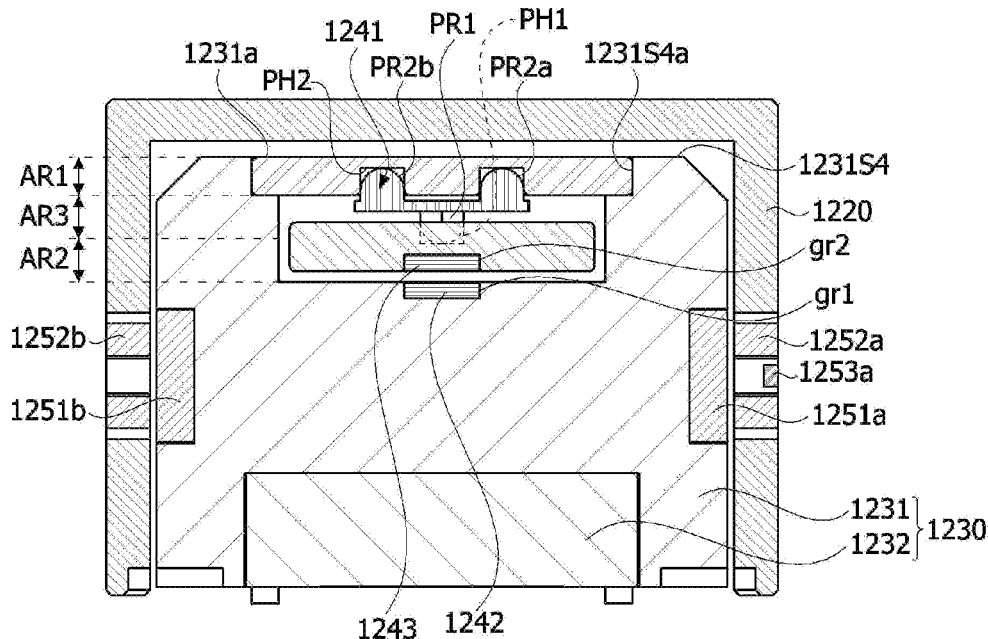

【Fig. 11c】
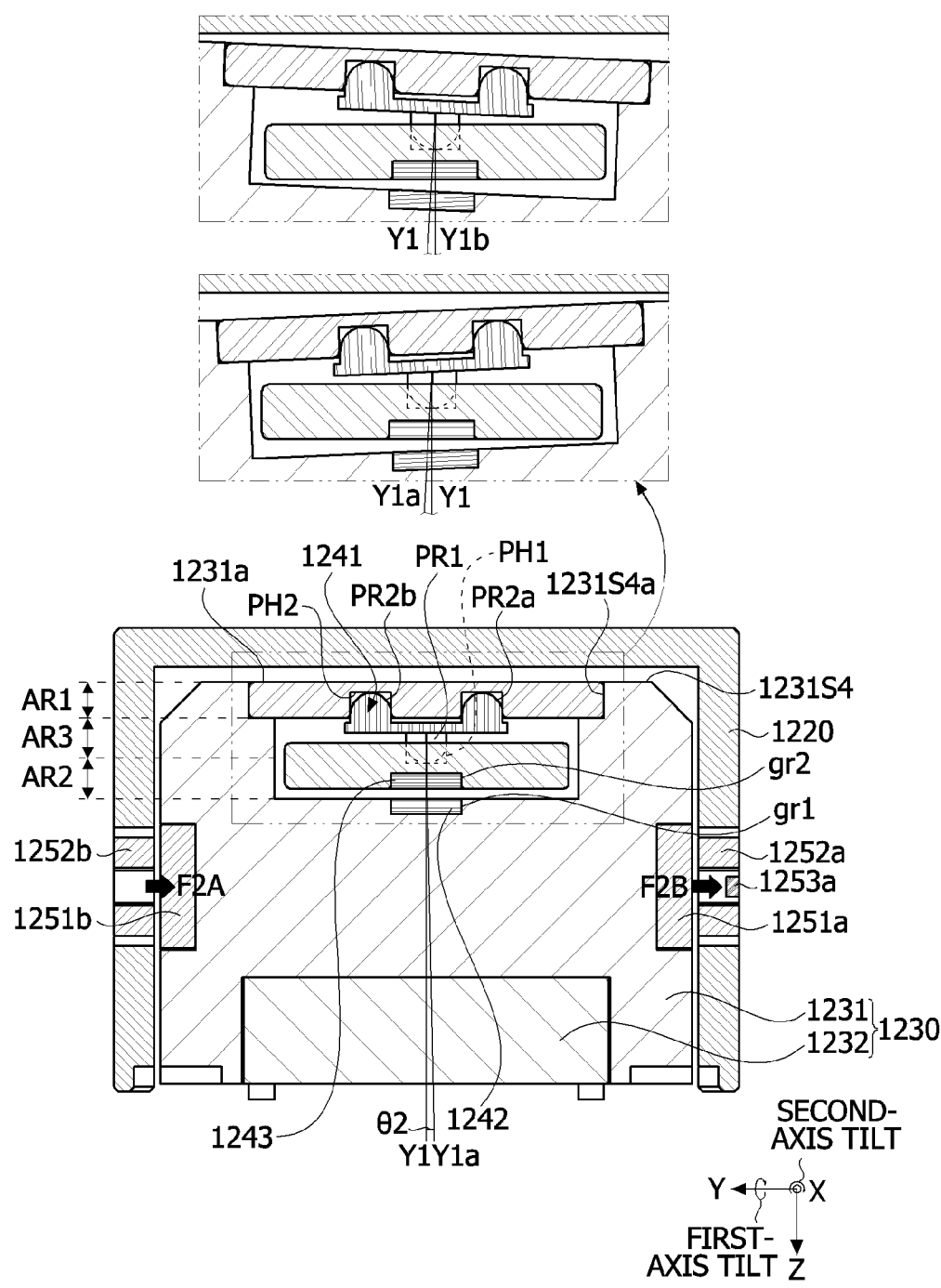

【Fig. 12a】
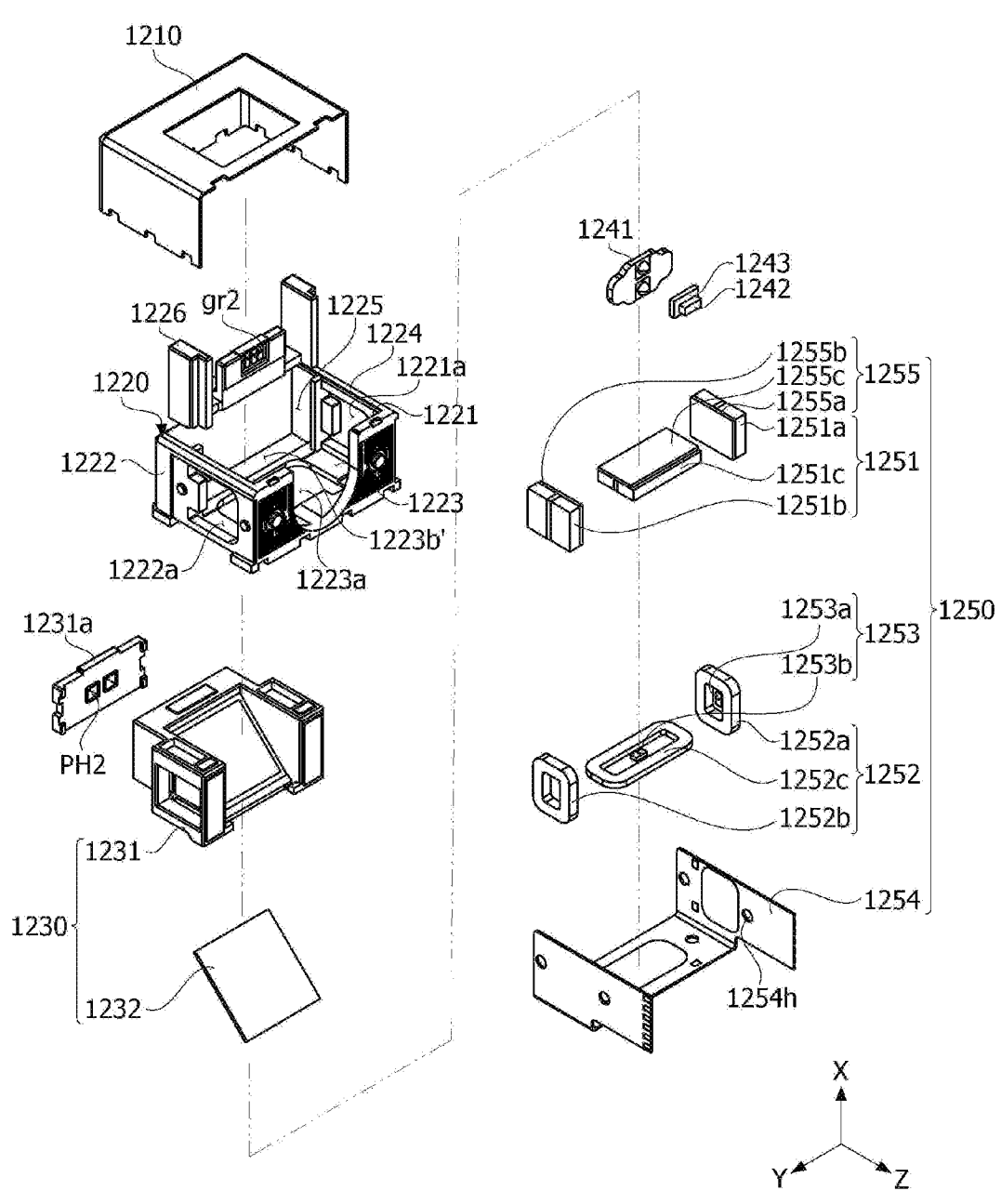

【Fig. 12b】
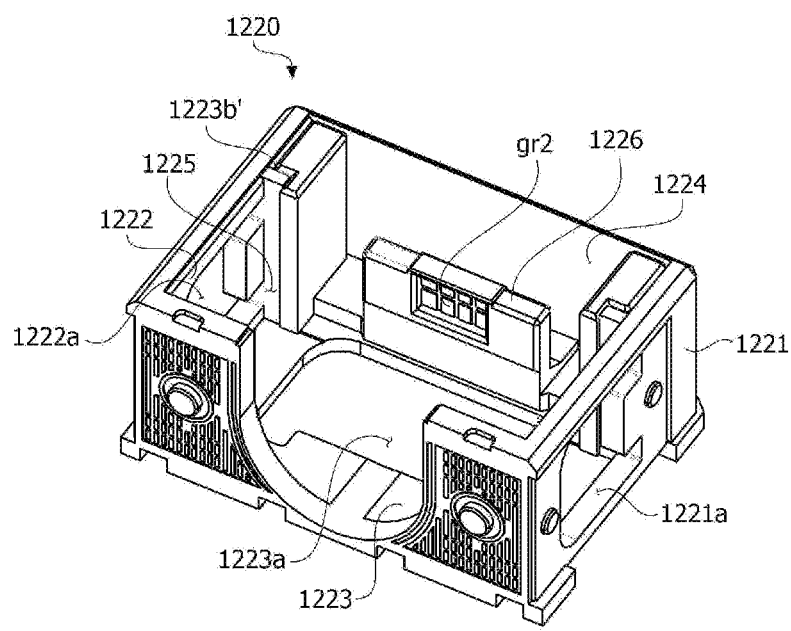
【Fig. 13a】
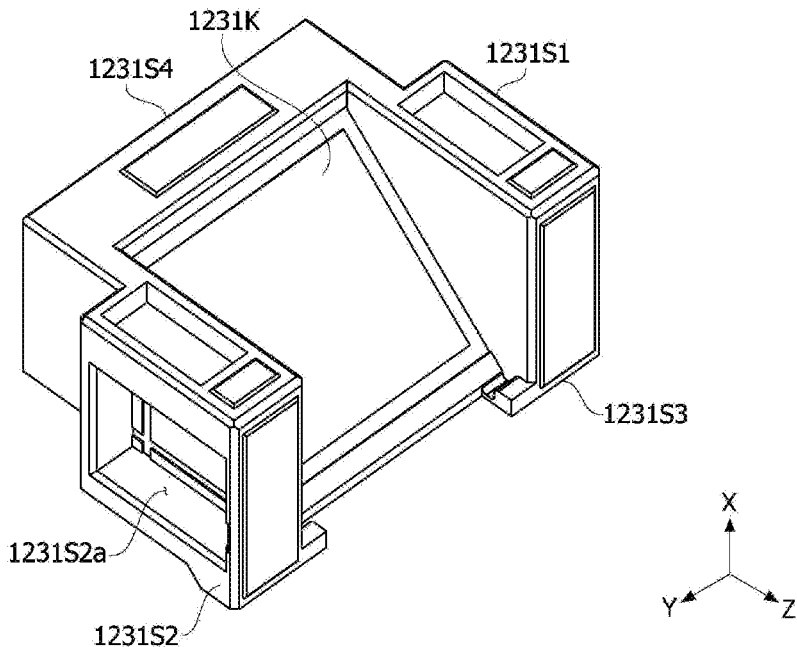

【Fig. 13b】
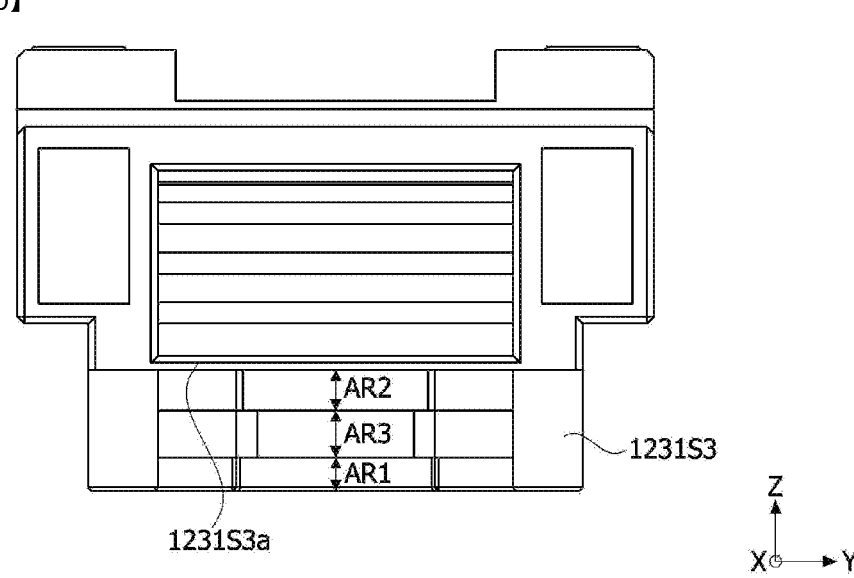
【Fig. 13c】
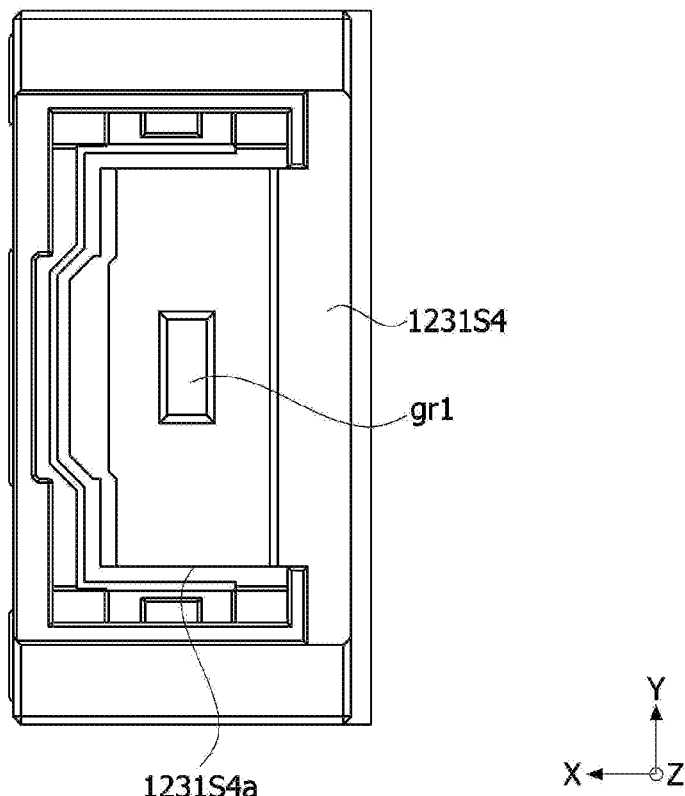

【Fig. 14a】
<u>1241</u>
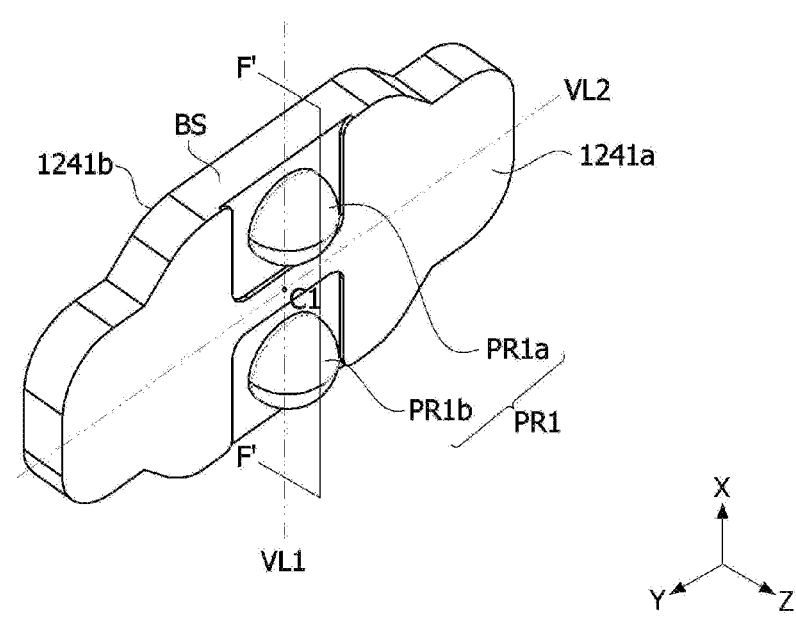
【Fig. 14b】
<u>1241</u>
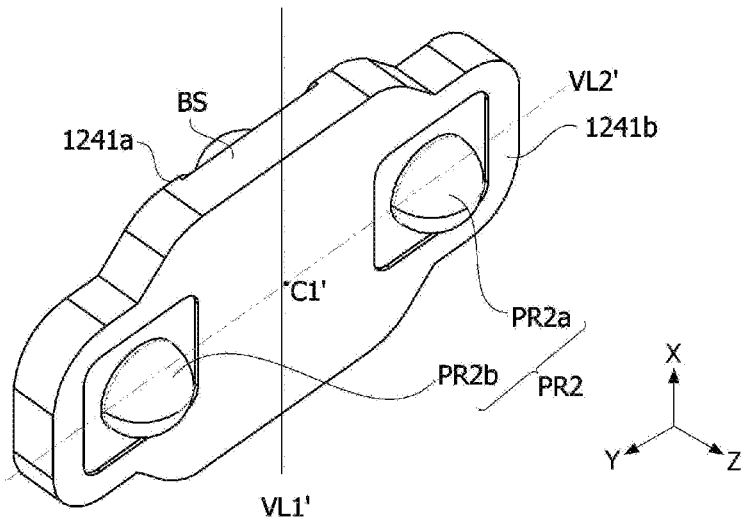

【Fig. 14c】
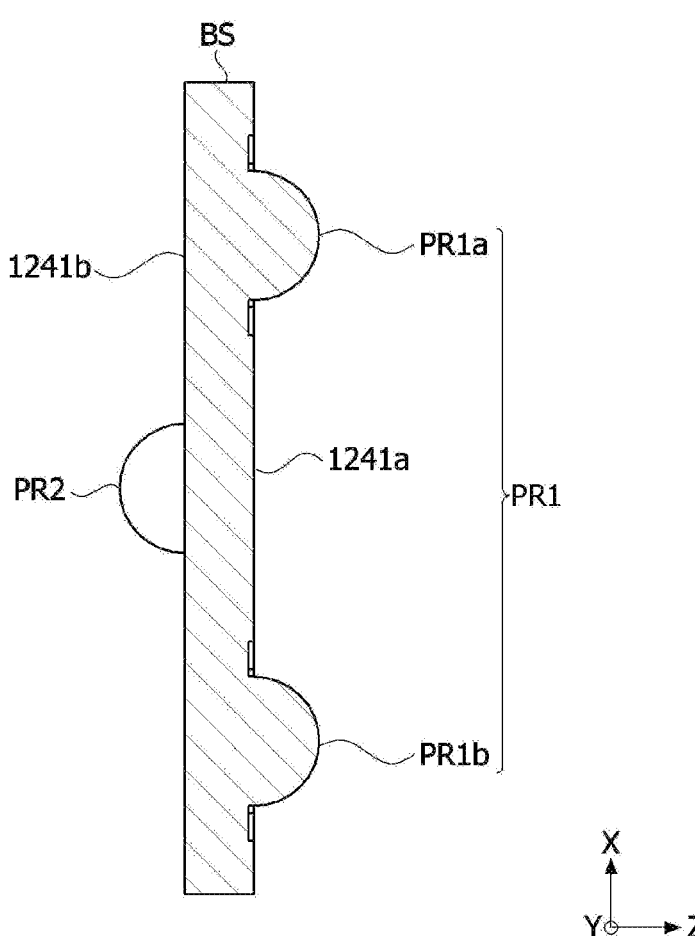

【Fig. 15a】
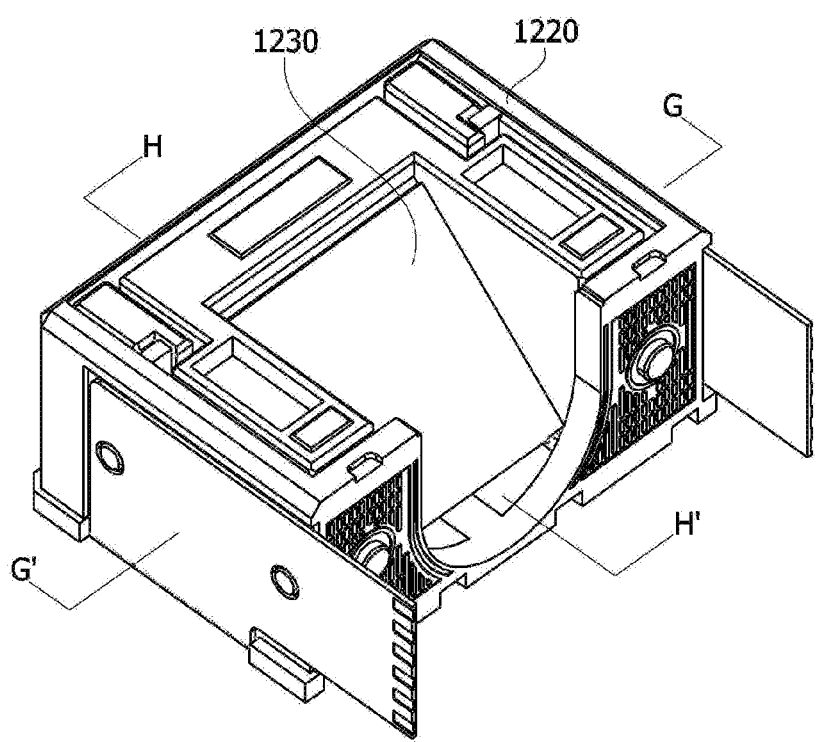
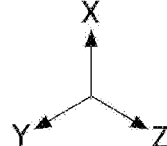

【Fig. 15b】
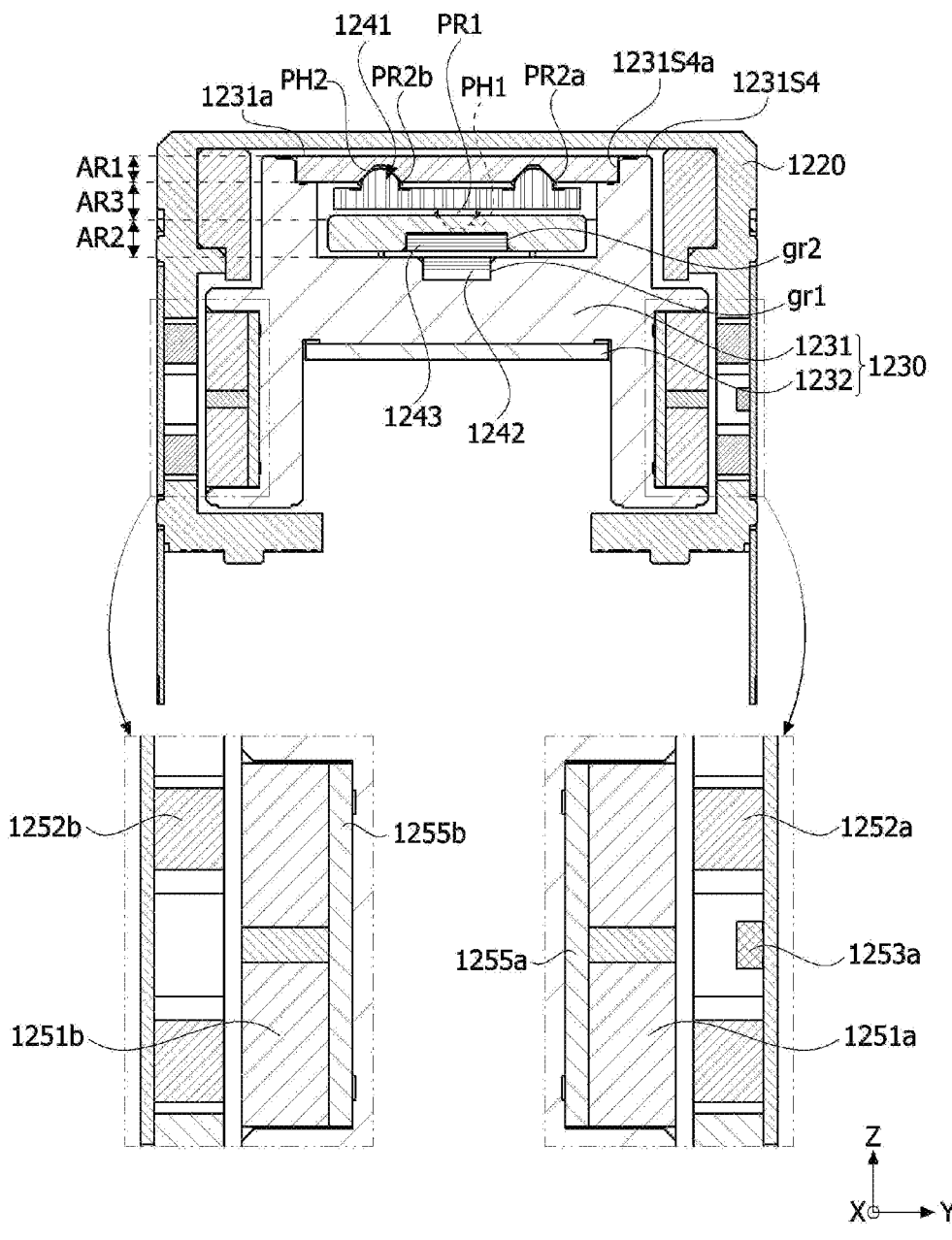

【Fig. 15c】
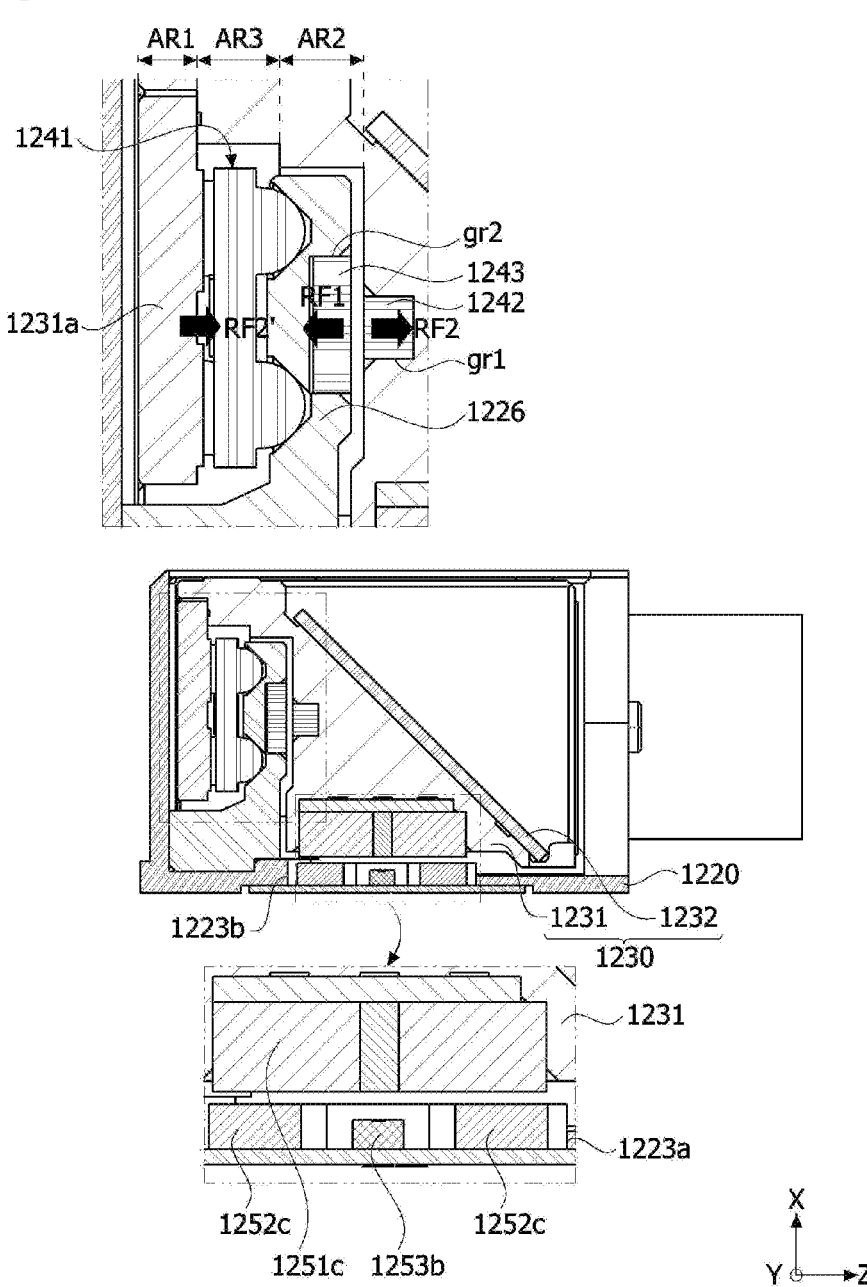

【Fig. 16】
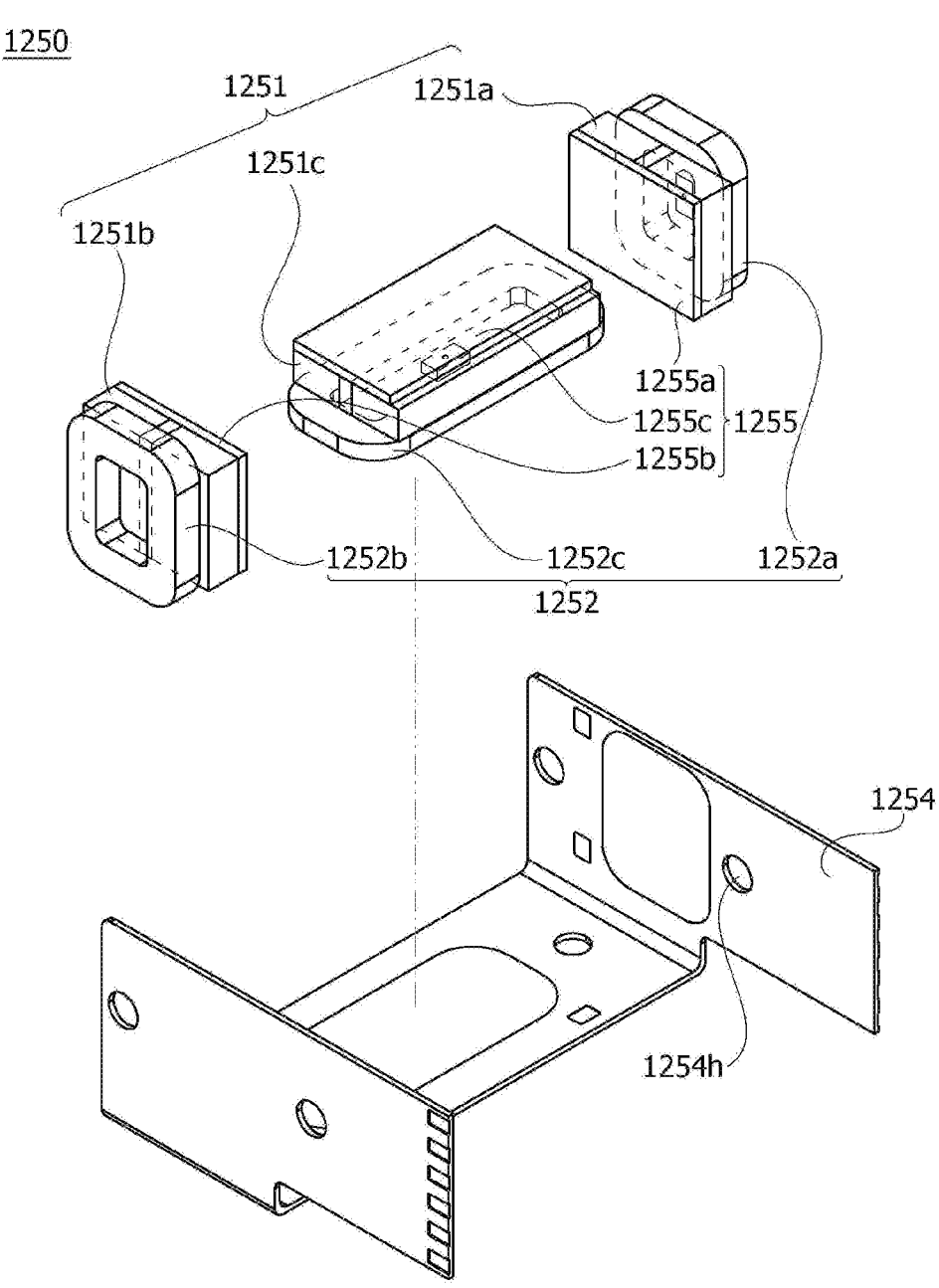

【Fig. 17a】
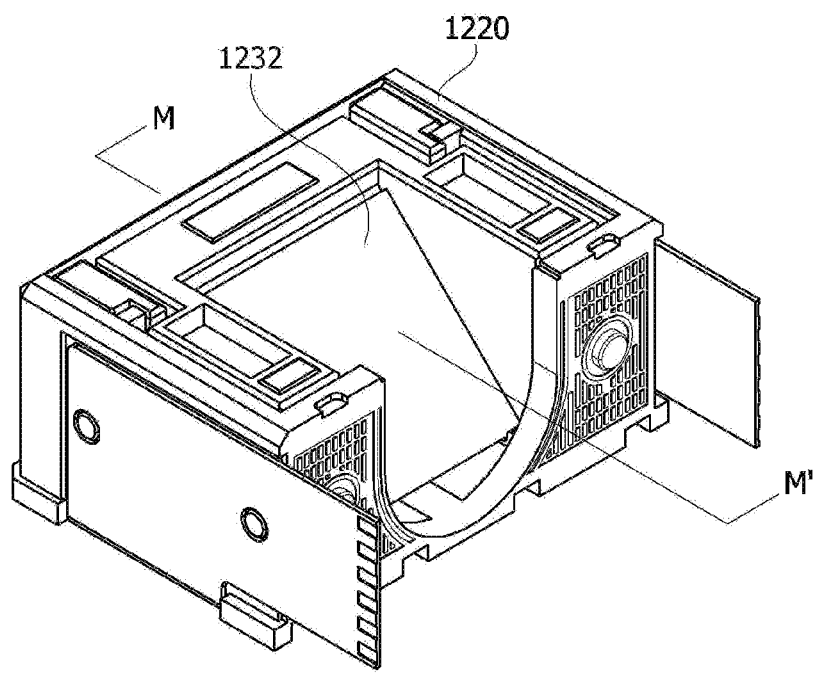
【Fig. 17b】
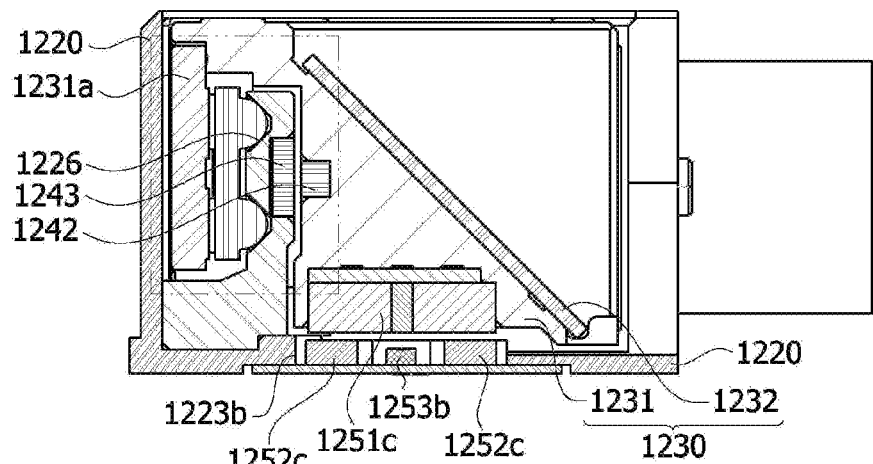

【Fig. 17c】
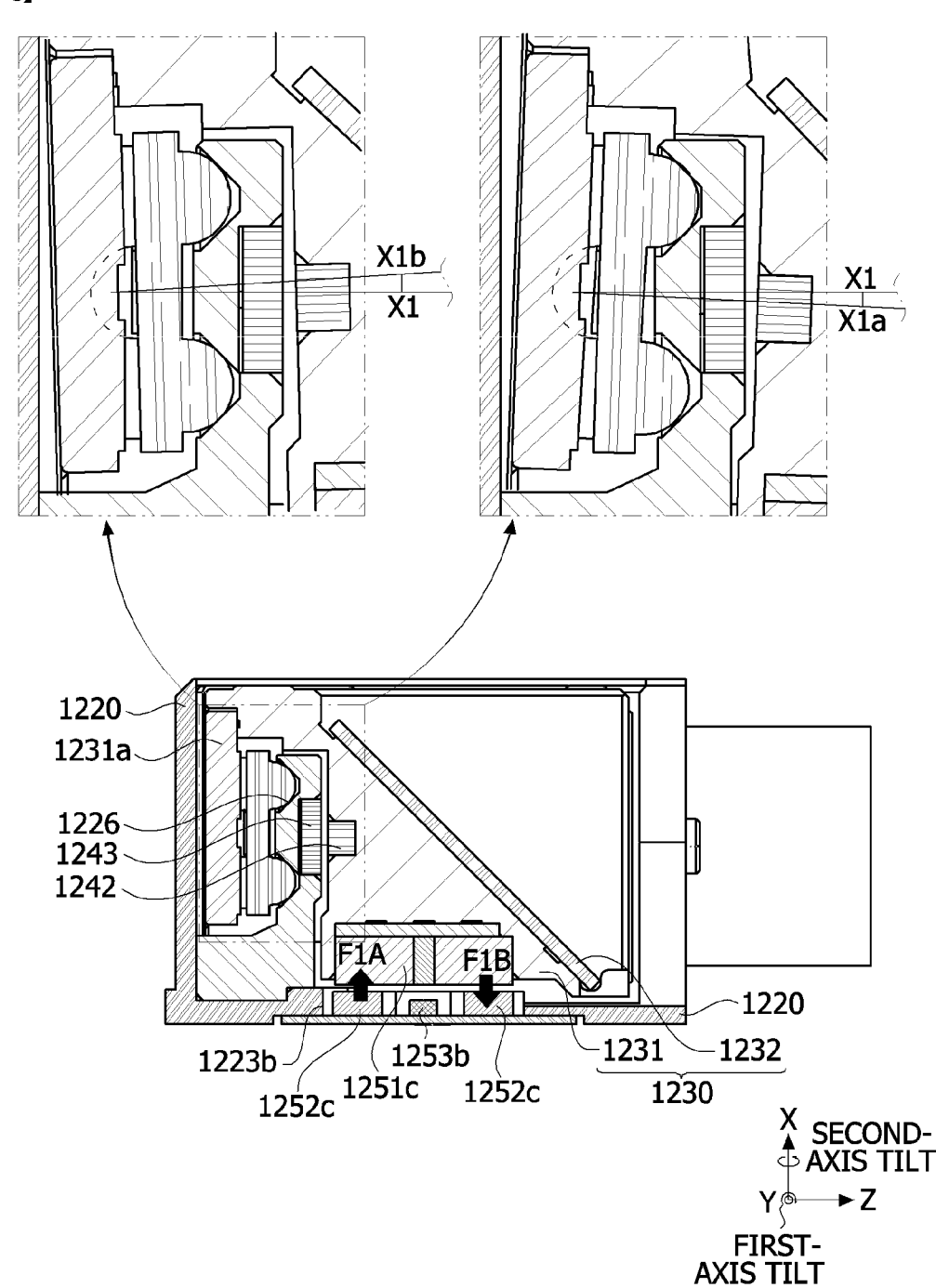

【Fig. 18a】
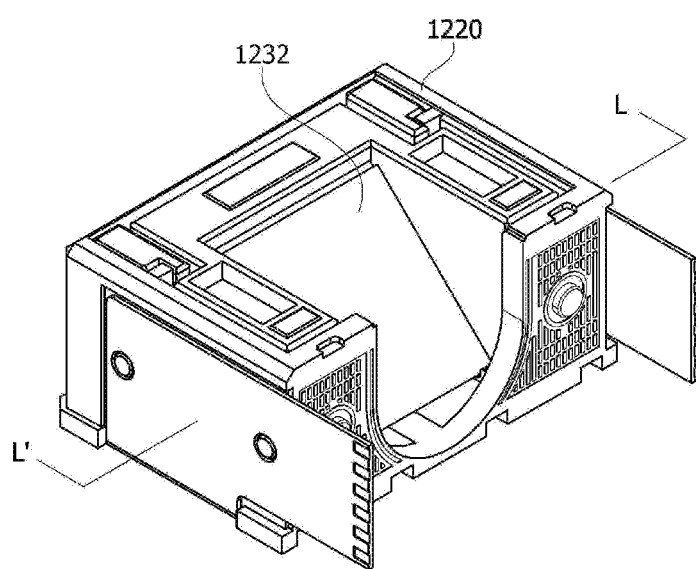
【Fig. 18b】
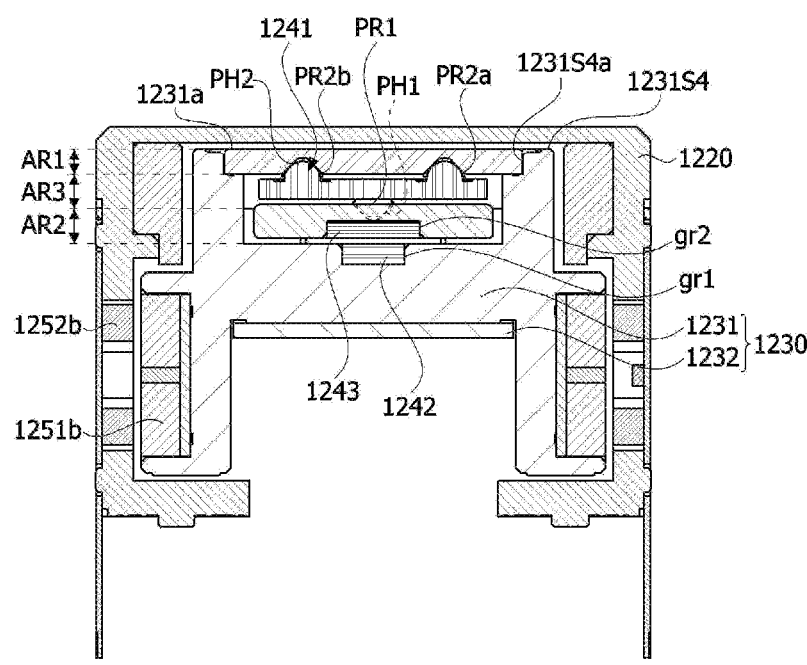

【Fig. 18c】
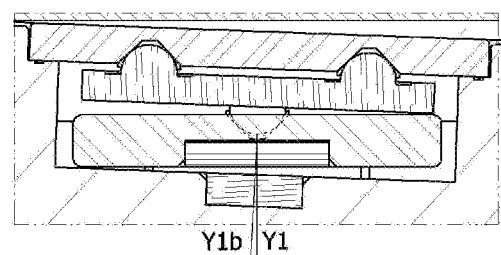
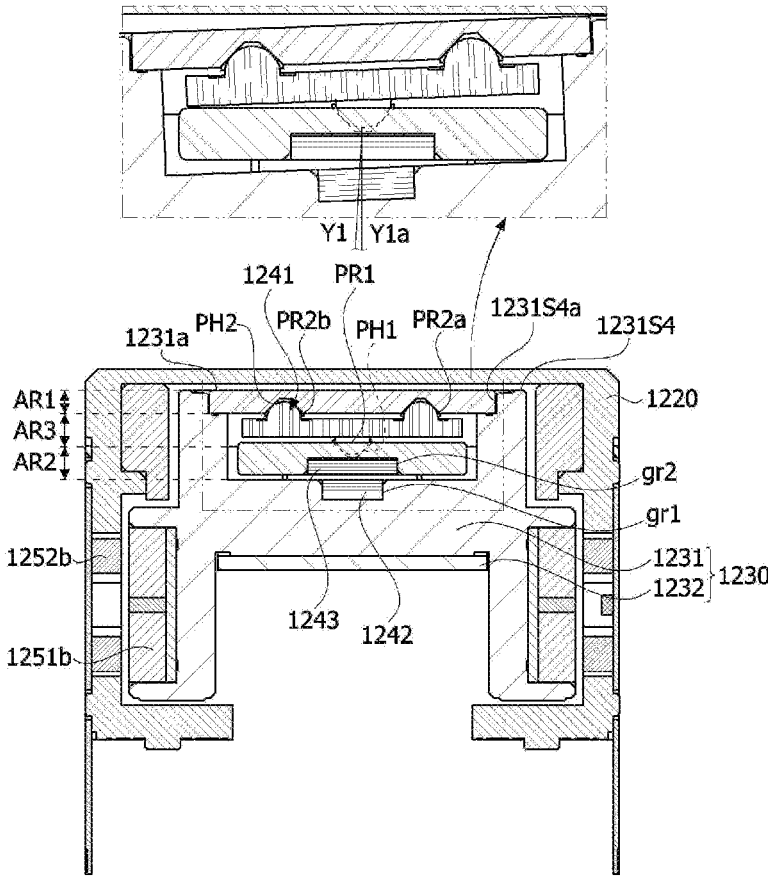

【Fig. 19a】
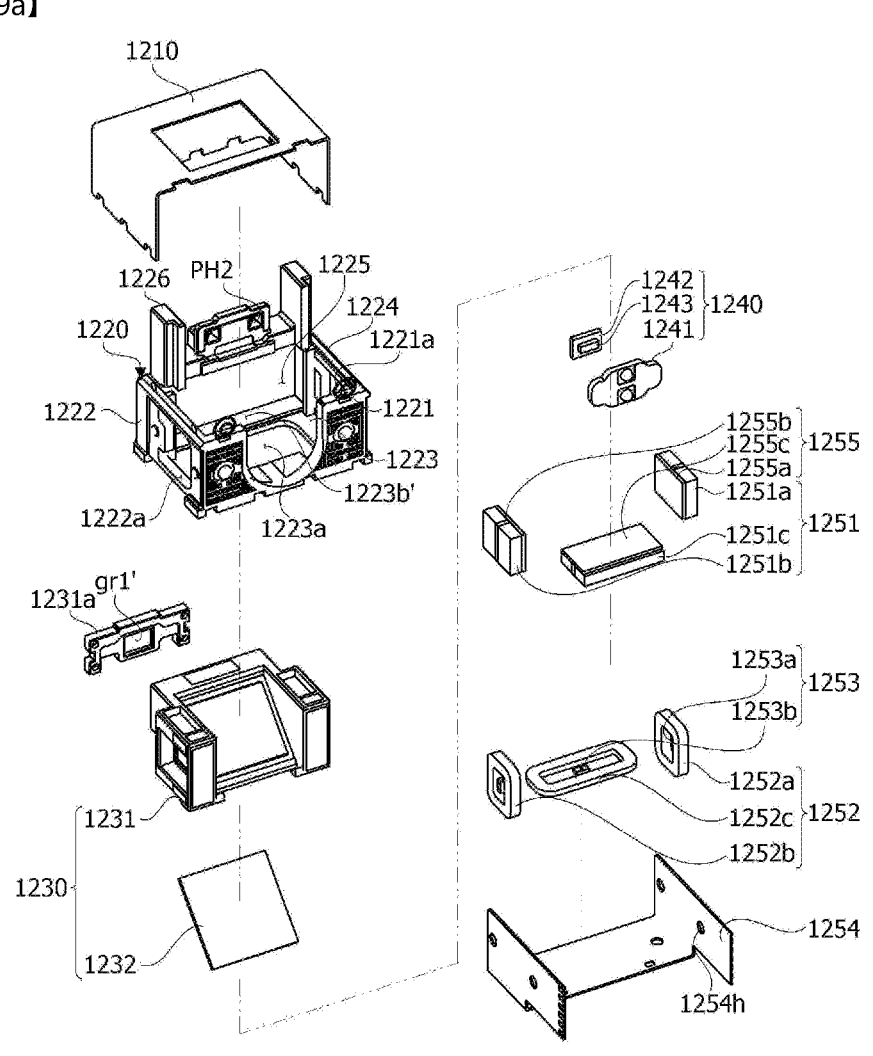
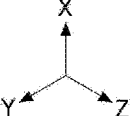

【Fig. 19b】
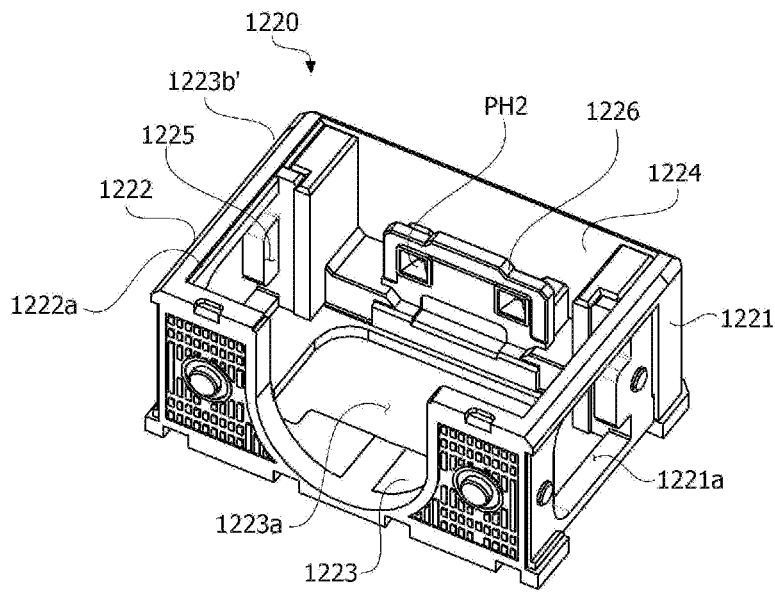
【Fig. 20a】
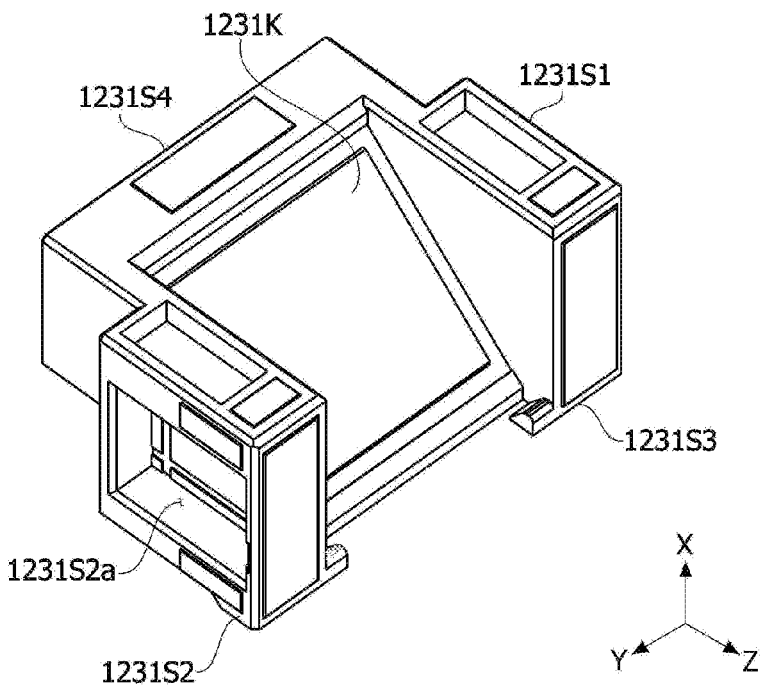

【Fig. 20b】
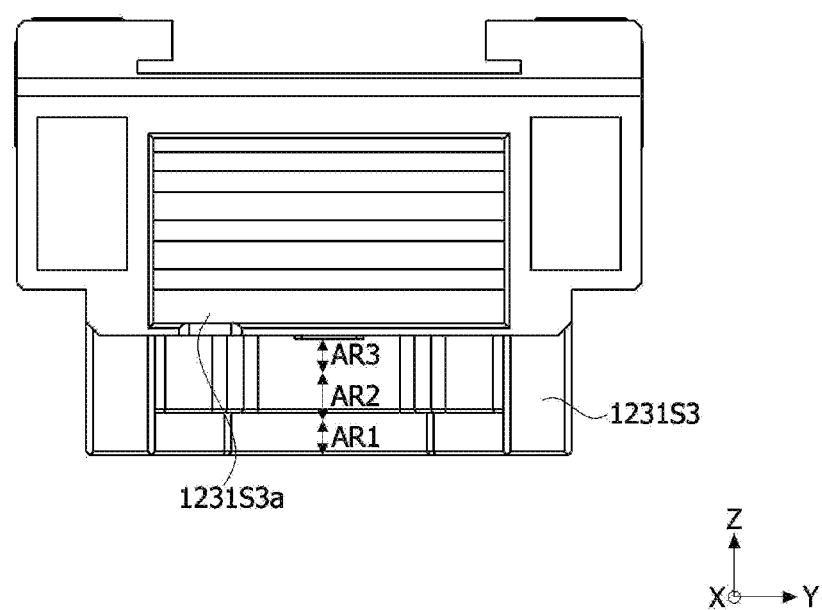
【Fig. 20c】
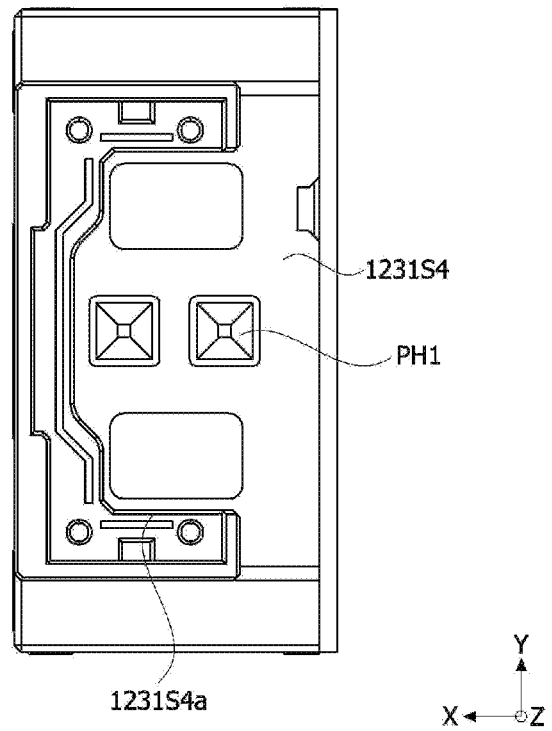

【Fig. 21a】
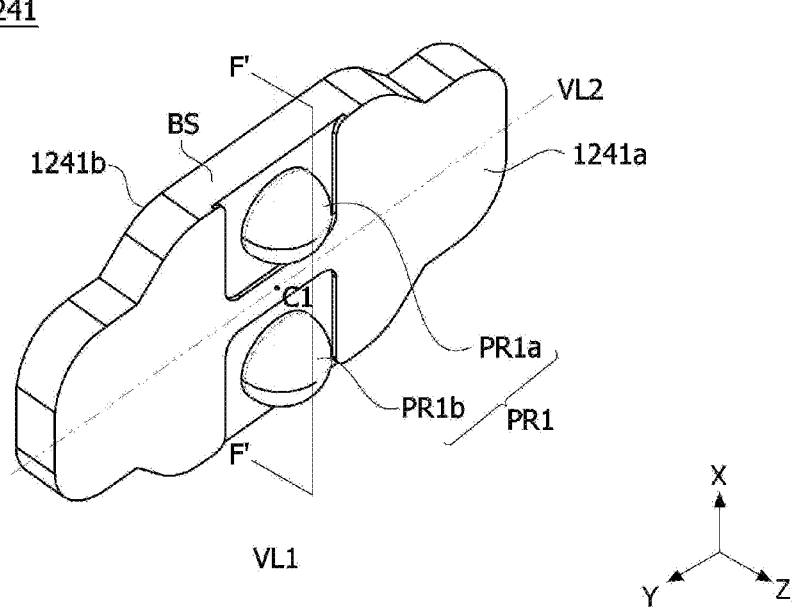
【Fig. 21b】
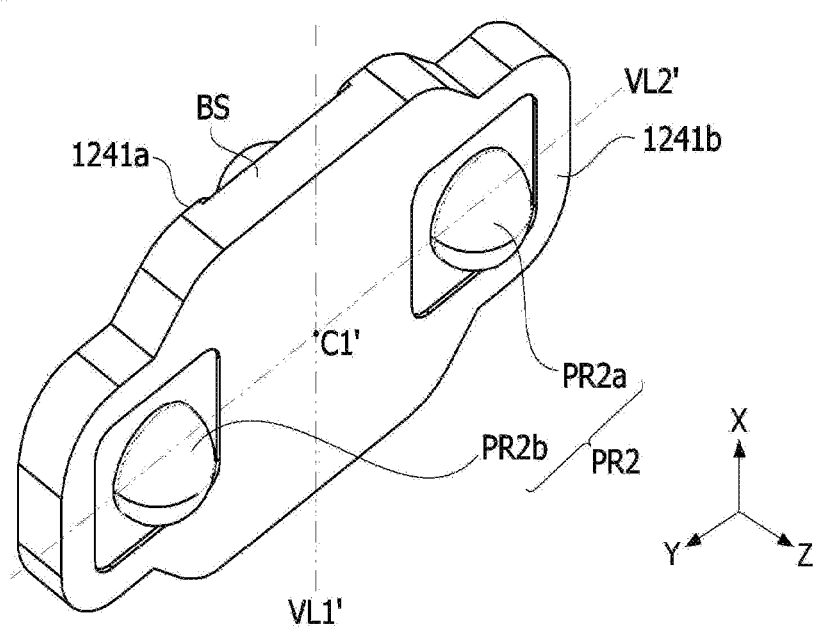

【Fig. 21c】
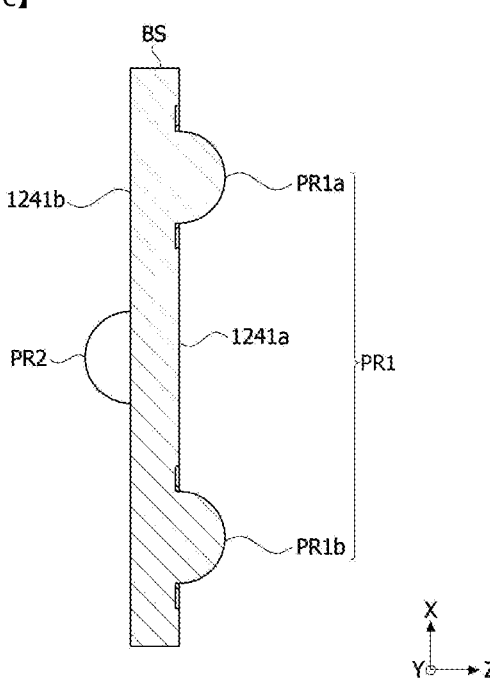
【Fig. 22a】
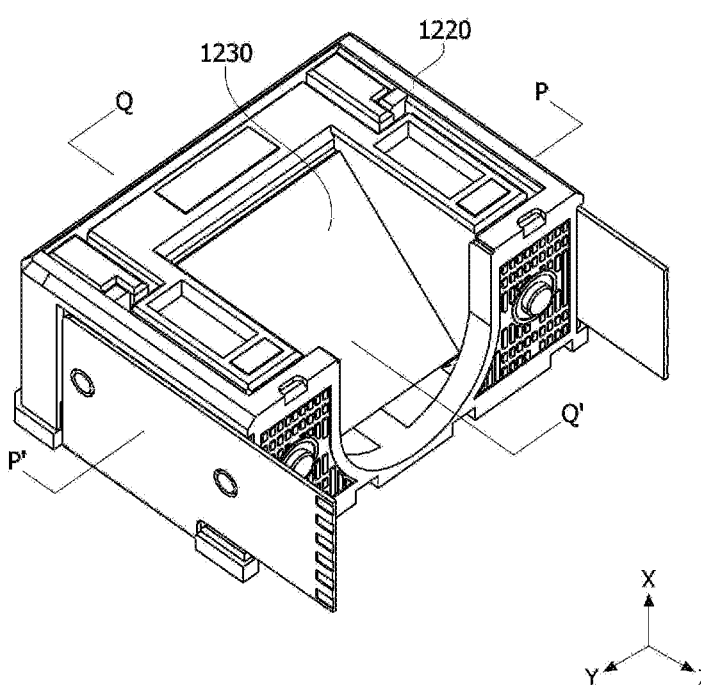

【Fig. 22b】
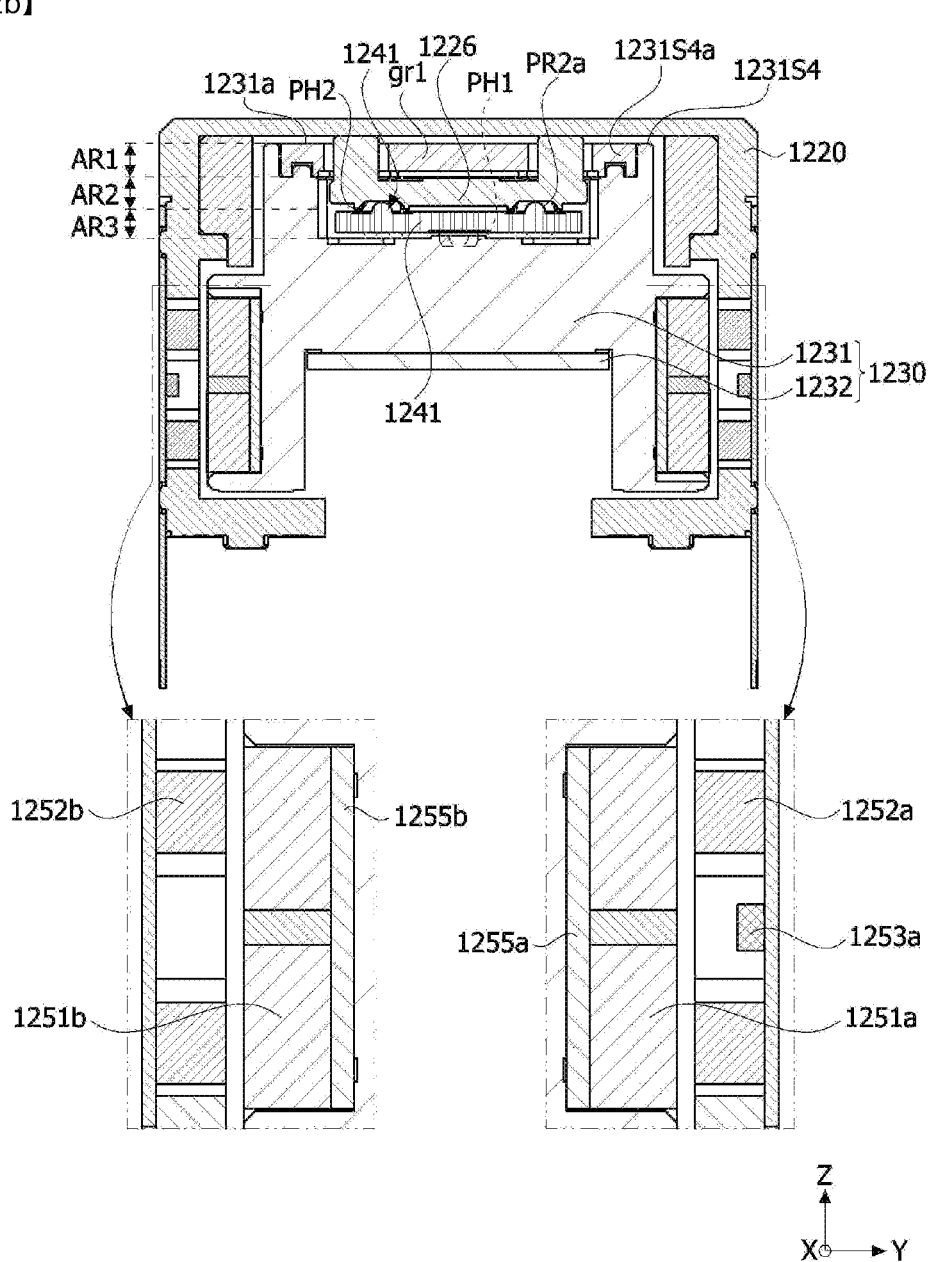

【Fig. 22c】
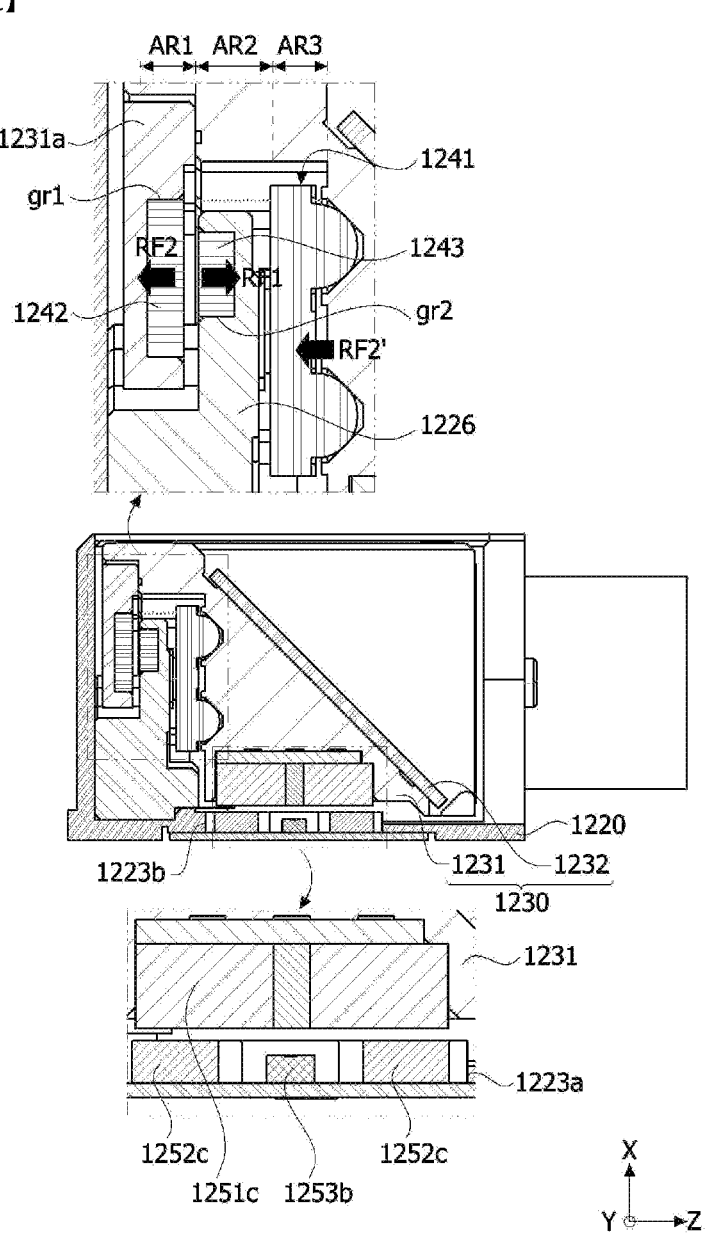

【Fig. 23】
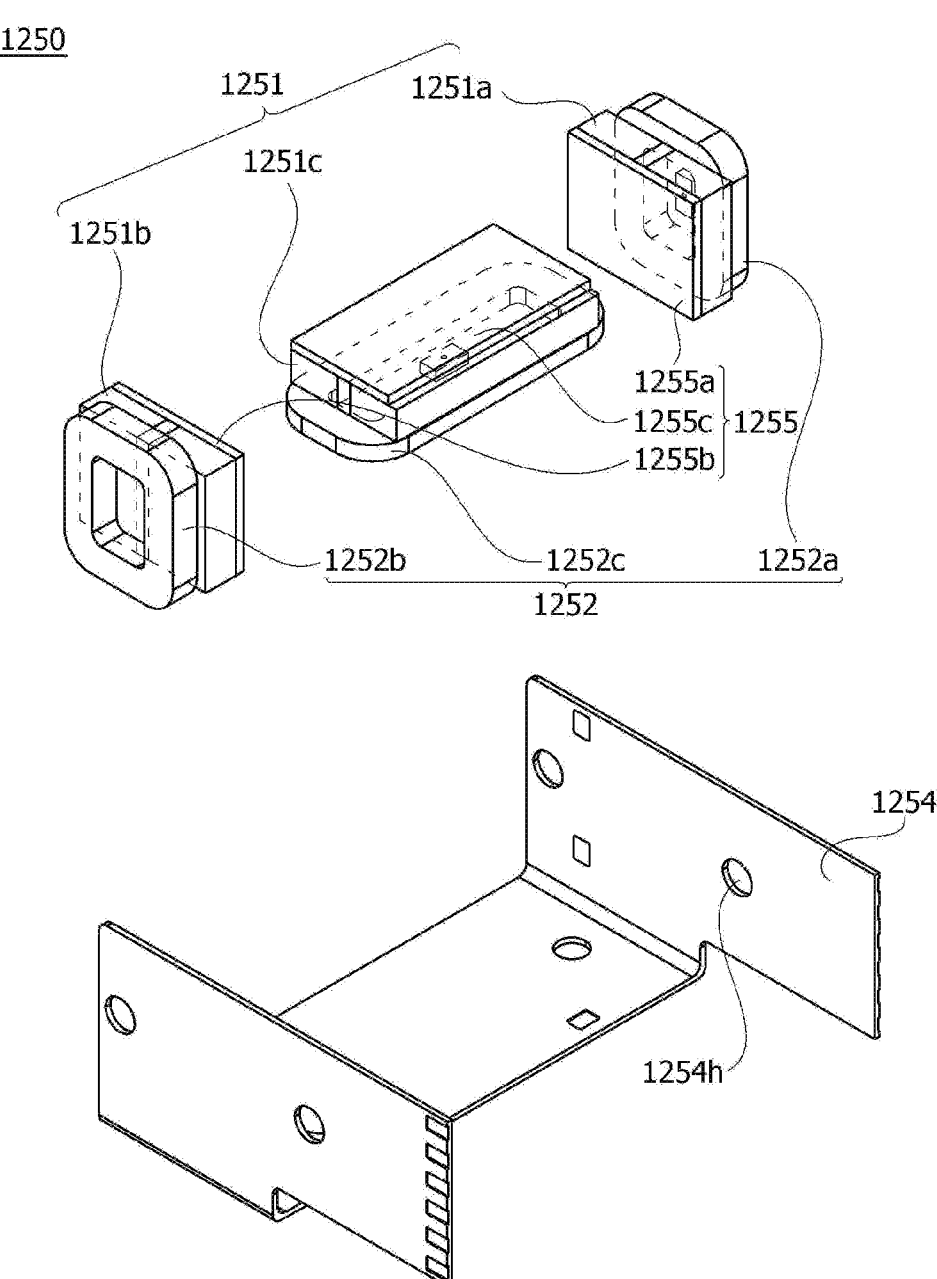

【Fig. 24a】
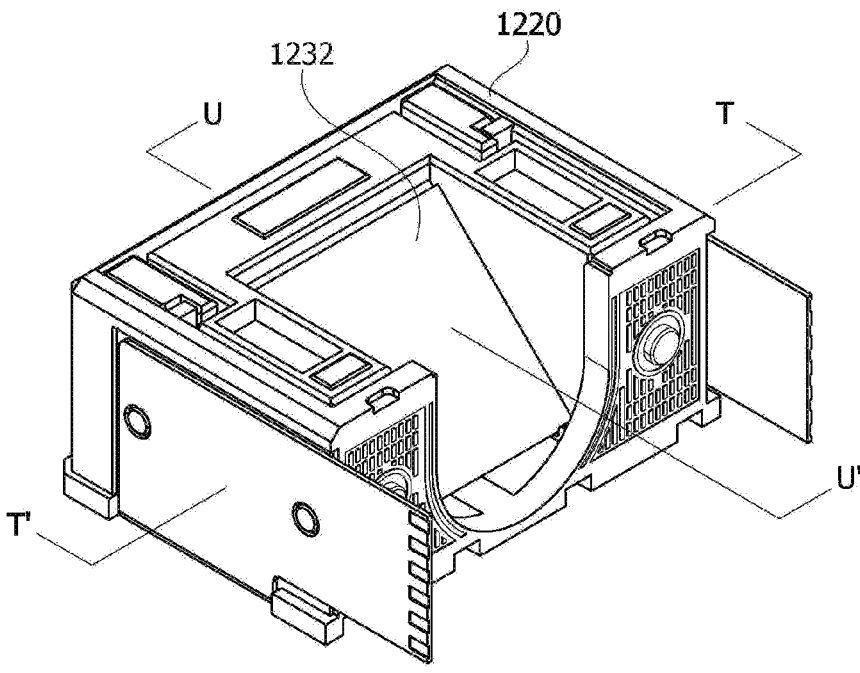
【Fig. 24b】
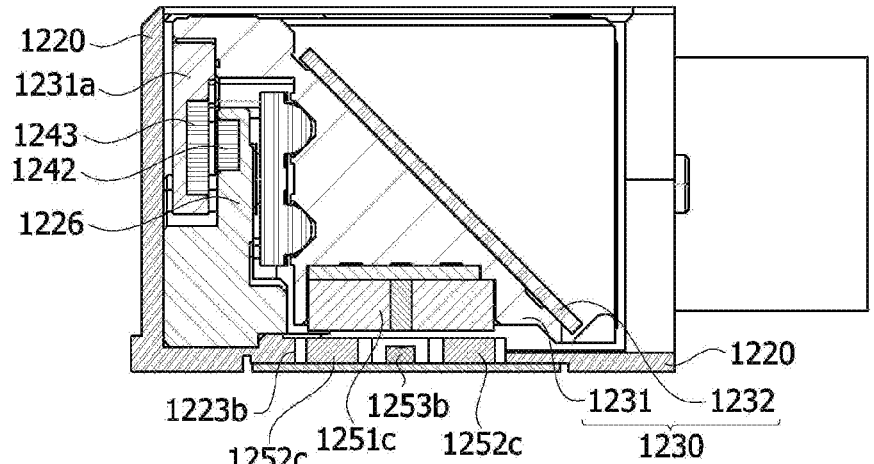

【Fig. 24c】
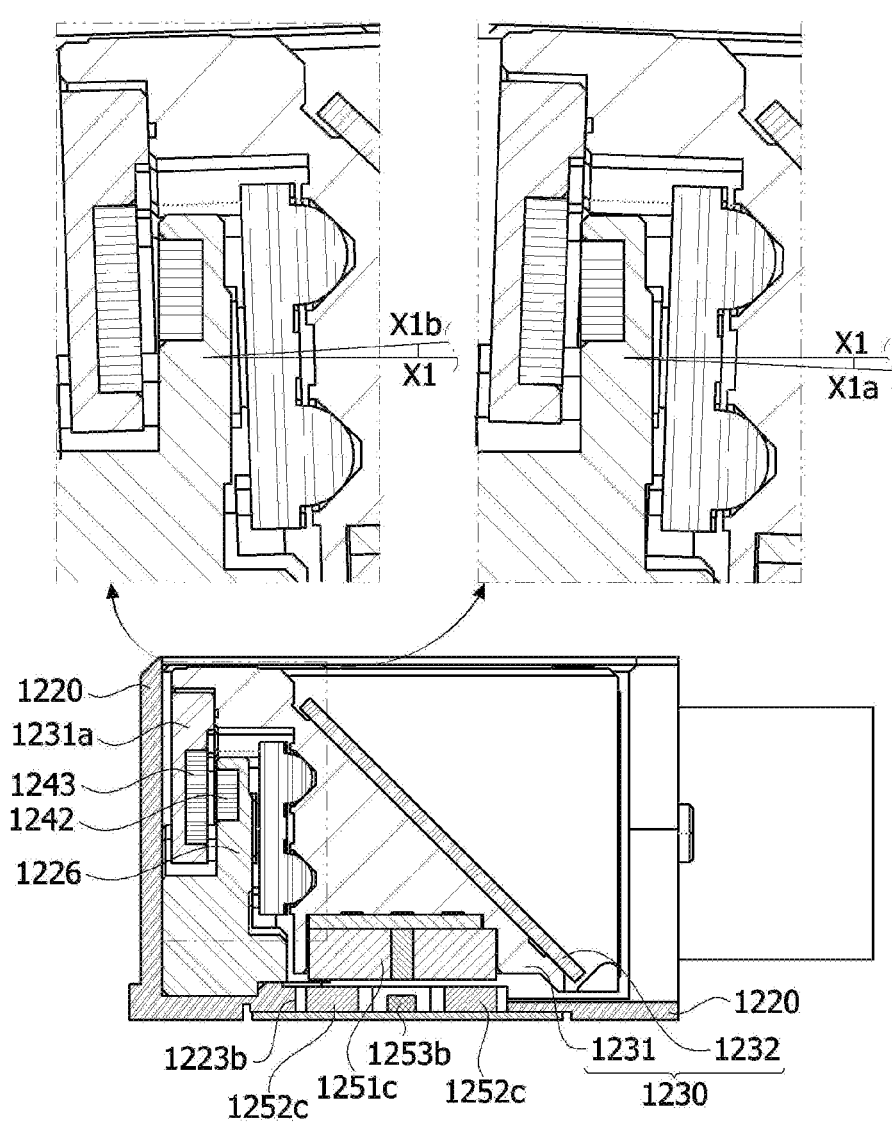

【Fig. 25a】
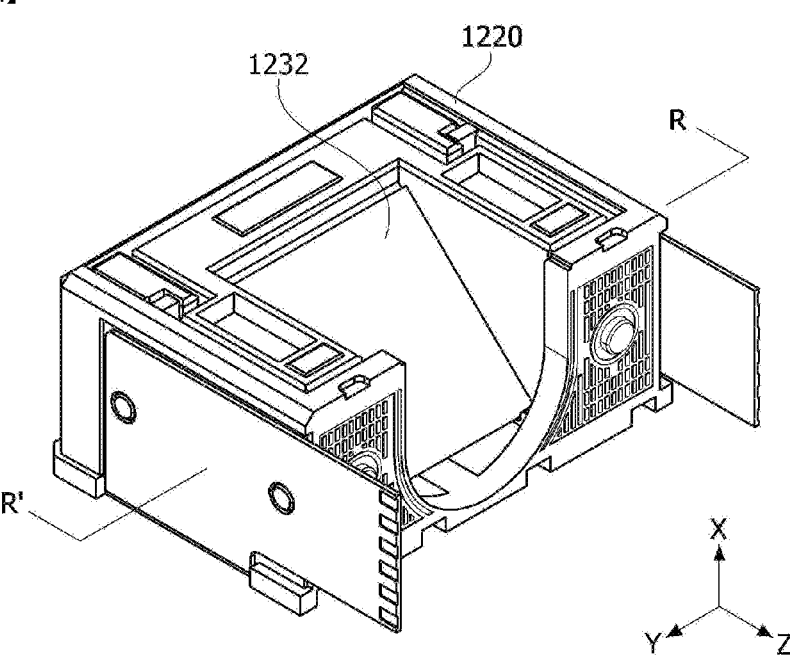
【Fig. 25b】
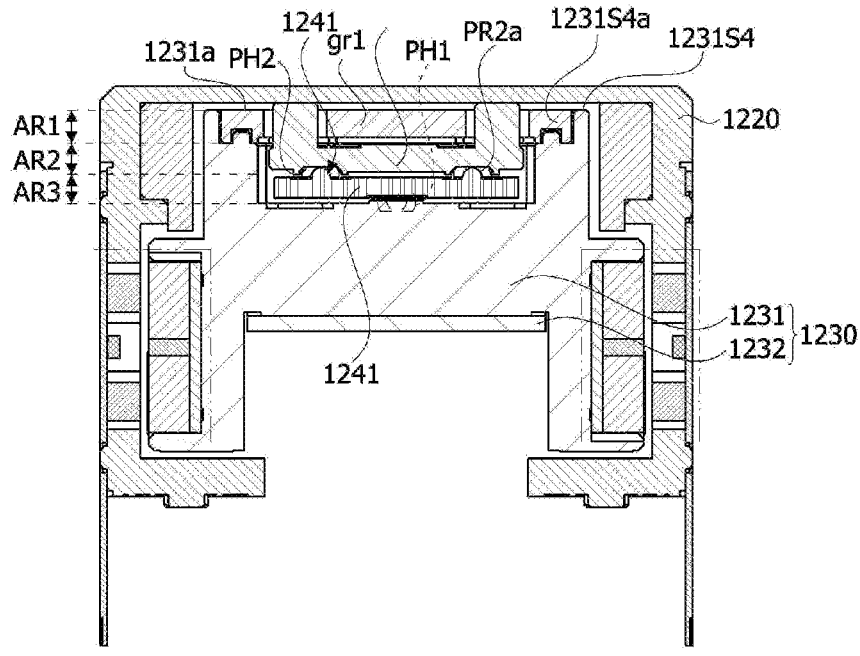

【Fig. 25c】
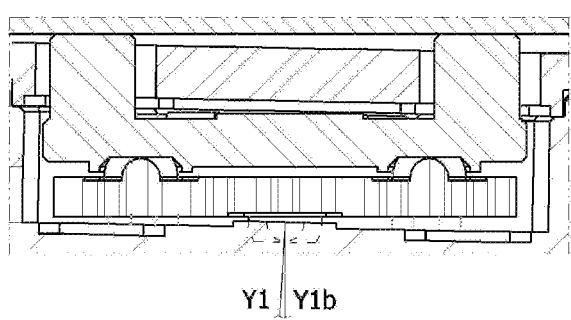
Y1 | Y1b
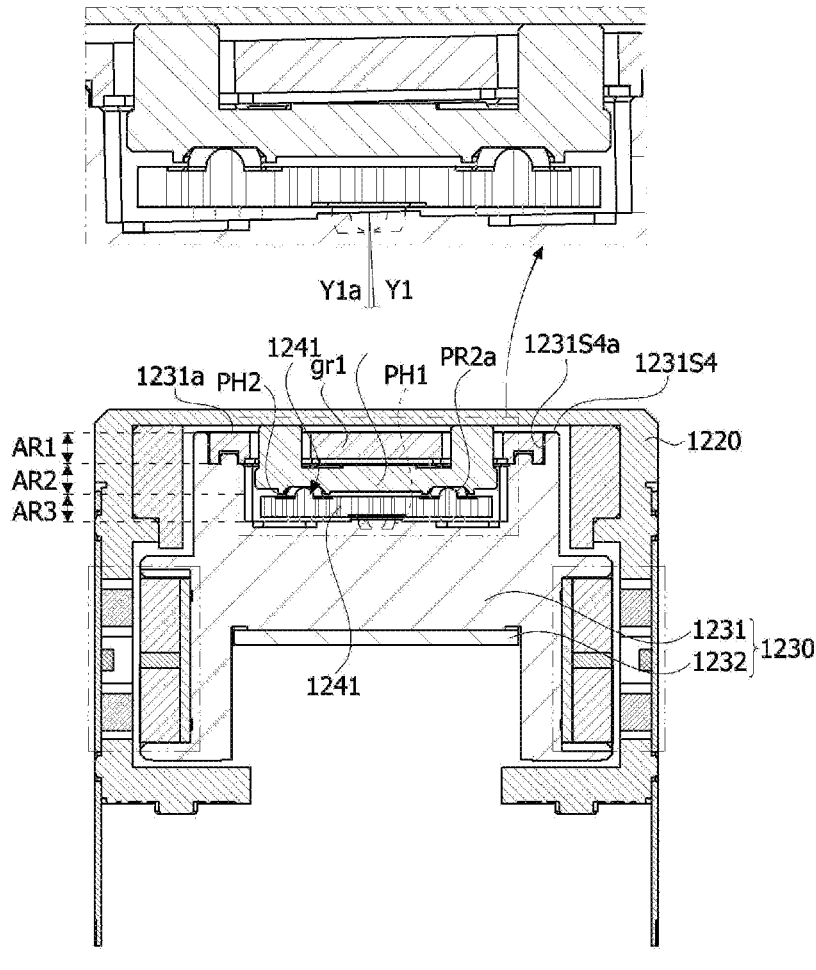
Y1a | Y1

【Fig. 26】
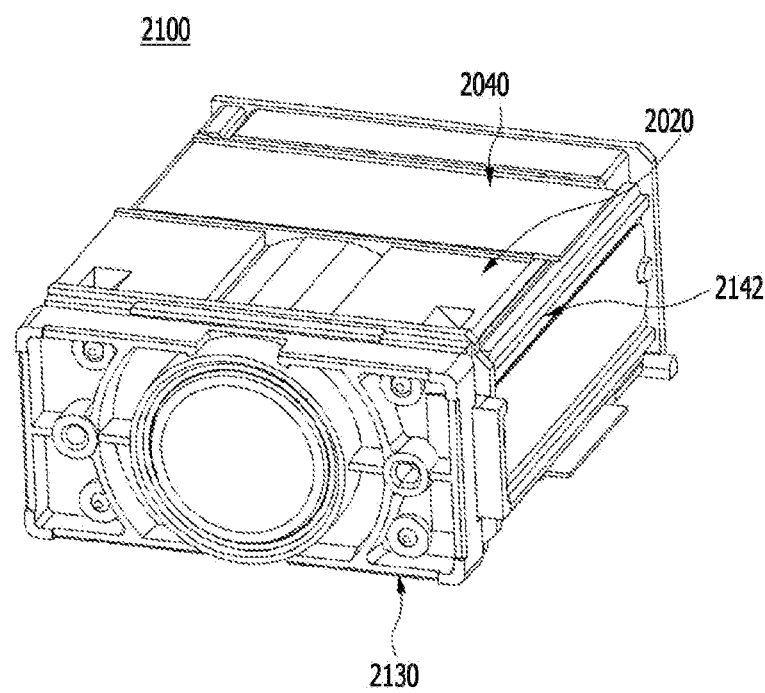
【Fig. 27】
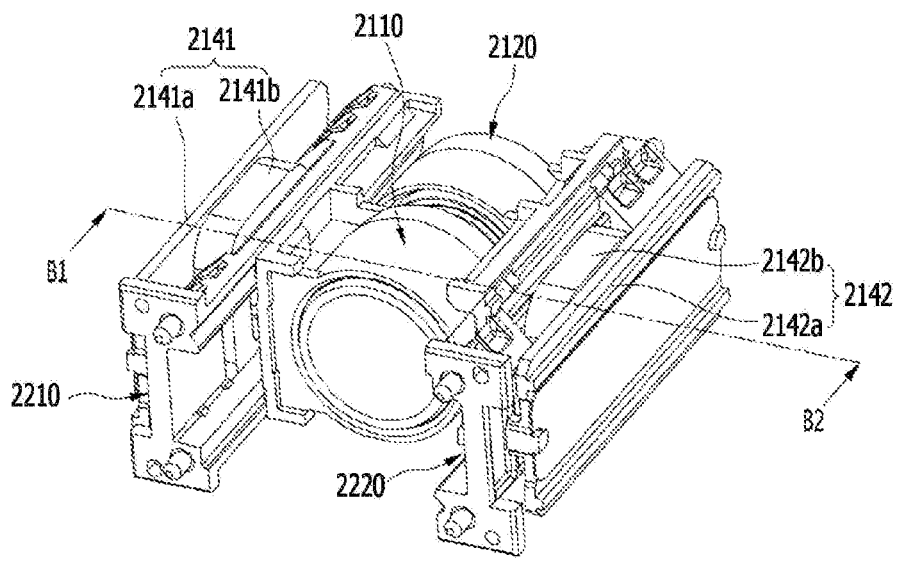

【Fig. 28】
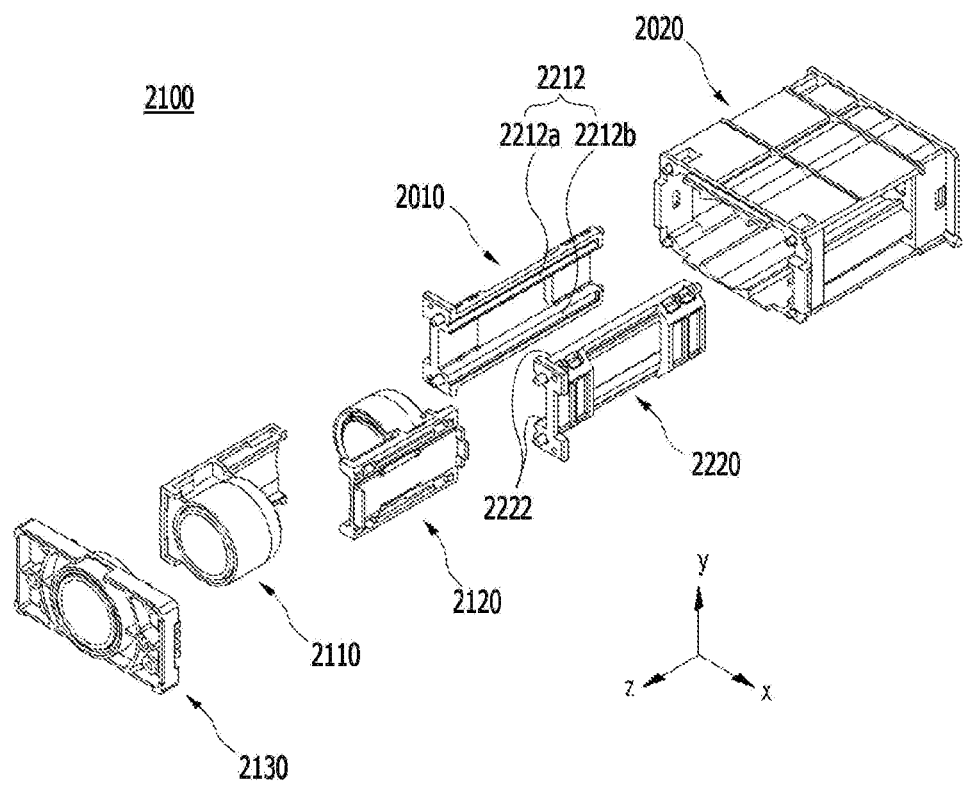
【Fig. 29a】
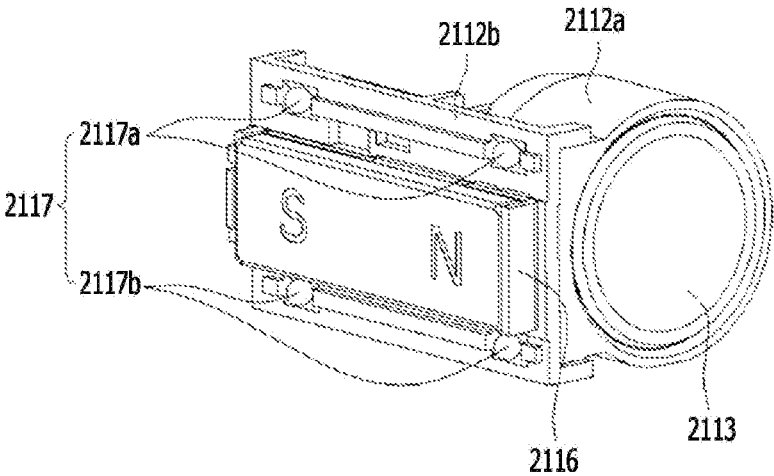

【Fig. 29b】
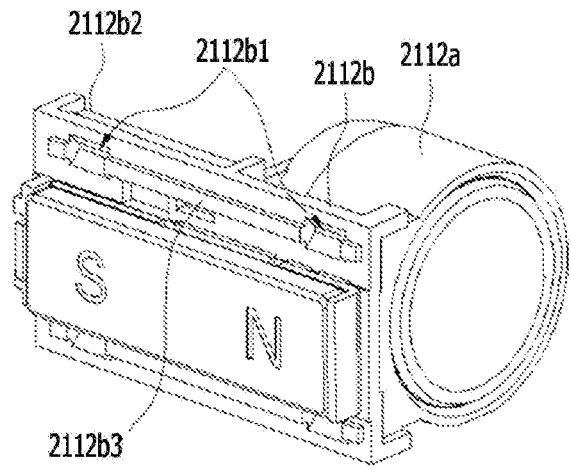
【Fig. 30】
2130
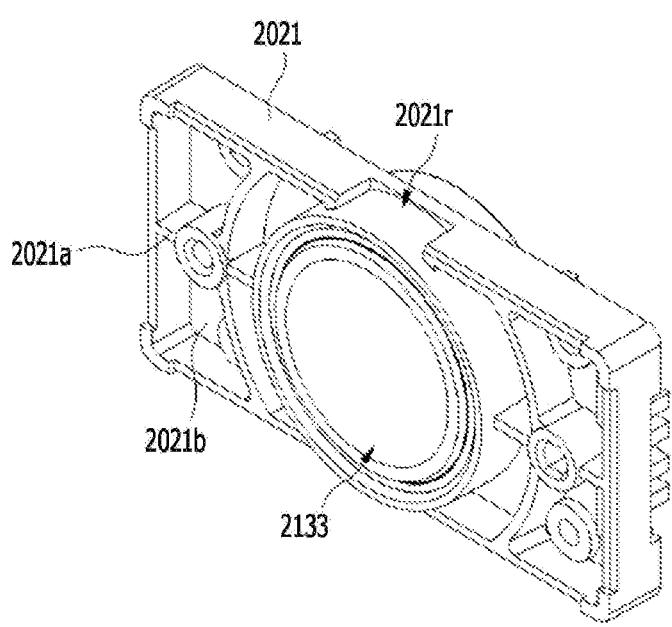

【Fig. 31】
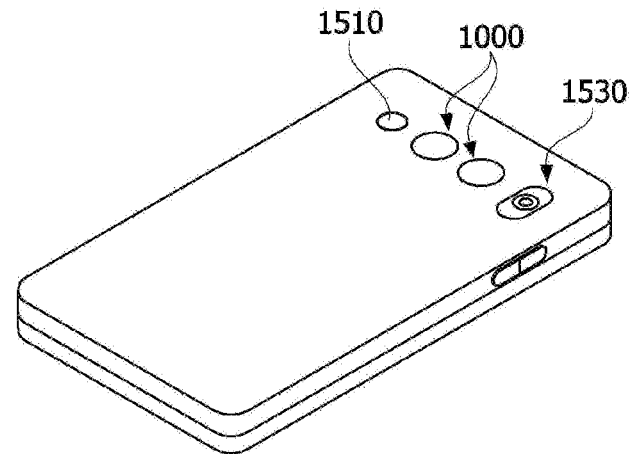
【Fig. 32】
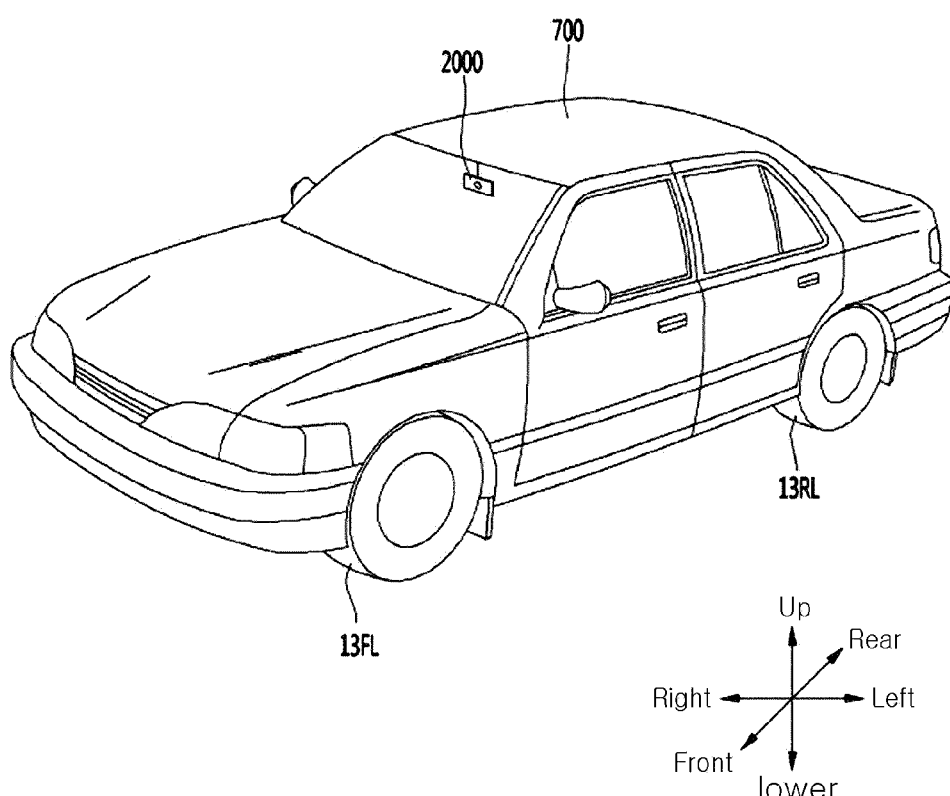

CAMERA ACTUATOR AND CAMERA MODULE INCLUDING THE SAME

CROSS REFERENCE TO RELATED APPLICATIONS

This application is the National Phase of PCT/KR2020/016560 filed on Nov. 23, 2020, which claims priority under 35 U.S.C. § 119 (a) to Patent Application No. 10-2019-0157001 filed in the Republic of Korea, all of which are hereby expressly incorporated by reference into the present application.

BACKGROUND

1. Field of the Invention

The present invention relates to a camera actuator and a camera module including the same.

2. Discussion of Related Art

Cameras are devices that capture pictures or videos of subjects and are mounted in portable devices, drones, vehicles, and the like. A camera module may have an image stabilization (IS) function that corrects or prevents a blurry image caused by user movement to improve the quality of the image, an auto-focusing (AF) function that automatically adjusts a gap between an image sensor and a lens to align a focal length of the lens, and a zooming function that increases or reduces magnification of a distant subject through a zoom lens to capture the subject.

Meanwhile, the larger the number of pixels in an image sensor, the higher the resolution and the smaller the size of each pixel, but the smaller the pixel, the less the amount of light received during the same period of time. Therefore, the larger the number of pixels in a camera, the greater the potential for the blurry image phenomenon to occur severely due to hand shaking when the shutter speed is slow in a dark environment. The optical image stabilizer (OIS) technology, which is a technology in which an optical path is changed to correct blur due to movement, is a typical IS technology.

According to the general OIS technology, movement of a camera may be detected through a gyro sensor or the like, and on the basis of the detected movement, a lens may be tilted or moved or a camera module including a lens and an image sensor may be tilted or moved. In a case in which the lens or the camera module including the lens and the image sensor is tilted or moved for OIS, a space for tilting or movement is required to be additionally secured around the lens or the camera module.

Meanwhile, an OIS actuator may be disposed around the lens. Here, the OIS actuator may include actuators responsible for tilting about two axes perpendicular to the optical axis Z, i.e., an actuator responsible for X-axis tilting and an actuator responsible for Y-axis tilting.

However, due to the need for an ultra-slim, ultra-small camera module, there is a great limitation in space for arranging the OIS actuators, and it may be difficult to guarantee sufficient space in which the lens or the camera module including the lens and the image sensor may be tilted or moved for OIS. Also, it is preferable that the larger the number of pixels in a camera, the larger the size of a lens to increase the amount of light received, but there may be a limitation in increasing the size of the lens due to the space occupied by the OIS actuators.

Also, in a case in which all of the zooming function, AF function, and OIS function are included in the camera module, there is a problem in that an OIS magnet, an AF magnet, and a zooming magnet are disposed close to each other and cause magnetic field interference to occur.

SUMMARY OF THE INVENTION

The present invention is directed to providing a camera actuator that may be applied to an ultra-slim, ultra-small, and high-resolution camera.

A camera actuator according to an embodiment of the present invention includes a housing, a mover disposed in the housing, a tilting guide part disposed between the housing and the mover, a driving part disposed in the housing to drive the mover, a first magnetic body disposed at the mover, and a second magnetic body disposed to face the first magnetic body, wherein the tilting guide part is pressed by the mover due to repulsive force of the first magnetic body and the second magnetic body.

The mover may include a seating groove configured to accommodate the tilting guide part, and the camera actuator may further include a first member and a second member that are configured to be accommodated in the seating groove.

The tilting guide part may be disposed between the first member and the second member, and the second member may be disposed between the tilting guide part and the mover.

The seating groove may include a first groove located on a bottom surface, the second member may include a second groove disposed on a surface facing the first groove, the first magnetic body may be disposed in the first groove, and the second magnetic body may be disposed in the second groove.

The tilting guide part may include a base, a first protruding part that protrudes from a first surface of the base, and a second protruding part that protrudes from a second surface of the base.

The mover may be tilted about a first axis with respect to the first protruding part and may be tilted about a second axis with respect to the second protruding part.

The first member may include a first protrusion groove configured to accommodate the first protruding part, and the second member may include a second protrusion groove configured to accommodate the second protruding part.

The first member, the second member, and the tilting guide part may at least partially overlap the mover along the second axis, the tilting guide part may overlap the first member and the second member along a third axis, and the third axis may be perpendicular to the first axis and the second axis.

The seating groove may include a first area in which the first member is accommodated and a second area in which the second member is accommodated, and a height of the first area may be larger than a height of the second area.

The seating groove may include a third area in which the tilting guide part is accommodated, and the third area may be disposed between the first area and the second area.

A height of the third area may be smaller than the height of the first area and larger than the height of the second area.

The driving part may include a driving magnet and a driving coil, the driving magnet may include a first magnet, a second magnet, and a third magnet, the driving coil may include a first coil, a second coil, and a third coil, the first magnet and the second magnet may be symmetrically disposed about the first axis on the mover, the first coil and the second coil may be symmetrically disposed about the first axis between the housing and the mover, the third magnet may be disposed on a bottom surface of the mover, and the third coil may be disposed on a bottom surface of the housing.

The tilting guide part may overlap the third coil or the third magnet along the third axis.

The second member may be disposed between the tilting guide part and the first member.

A camera actuator according to an embodiment includes a housing, a mover disposed in the housing, a tilting guide part disposed between the housing and the mover, a driving part disposed in the housing to drive the mover, a first magnetic body disposed at the mover, and a support member disposed in the housing and in which a second magnetic body is disposed, wherein the tilting guide part is disposed between the mover and the support member, and surfaces of the first magnetic body and the second magnetic body that face each other have the same polarity.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a perspective view of a camera module according to an embodiment;

FIG. 2A is a perspective view of a state in which a shield can is removed from the camera illustrated in FIG. 1;

FIG. 2B is a plan view of the camera module illustrated in FIG. 2A;

FIG. 3A is a perspective view of a first camera module illustrated in FIG. 2A;

FIG. 3B is a lateral cross-sectional view of the first camera module illustrated in FIG. 3A;

FIG. 4A is an exploded perspective view of a second camera actuator according to a first embodiment;

FIG. 4B is a perspective view of a housing according to the first embodiment;

FIG. 5A is a perspective view of a mover according to an embodiment;

FIG. 5B is a perspective view of the mover in a direction different from FIG. 5A;

FIG. 6A is a perspective view of a prism holder according to an embodiment;

FIG. 6B is a bottom view of the prism holder according to an embodiment;

FIG. 6C is a lateral view of the prism holder according to an embodiment;

FIG. 6D is another lateral view of the prism holder according to an embodiment;

FIG. 7A is a perspective view of a tilting guide part according to an embodiment;

FIG. 7B is a perspective view of the tilting guide part in a direction different from FIG. 7A;

FIG. 7C is a cross-sectional view of the tilting guide part taken along line AA' in FIG. 7A;

FIG. 8A is a perspective view of the second camera actuator from which the shield can and a substrate are removed according to an embodiment;

FIG. 8B is a cross-sectional view taken along line BB' in FIG. 8A;

FIG. 8C is a cross-sectional view taken along line CC' in FIG. 8A;

FIG. 9 is a view illustrating a driving part according to an embodiment;

FIG. 10A is a perspective view of the second camera actuator according to an embodiment;

FIG. 10B is a cross-sectional view taken along line DD' in FIG. 10A;

FIG. 10C is an exemplary view of movement of the second camera actuator illustrated in FIG. 10B;

FIG. 11A is a perspective view of the second camera actuator according to an embodiment;

FIG. 11B is a cross-sectional view taken along line EE' in FIG. 11A;

FIG. 11C is an exemplary view of movement of the second camera actuator illustrated in FIG. 11B;

FIG. 12A is an exploded perspective view of a second camera actuator according to a second embodiment;

FIG. 12B is a perspective view of a housing according to the second embodiment;

FIG. 13A is a perspective view of a prism holder according to an embodiment;

FIG. 13B is a bottom view of the prism holder according to an embodiment;

FIG. 13C is a lateral view of the prism holder according to an embodiment;

FIG. 14A is a perspective view of a tilting guide part according to an embodiment;

FIG. 14B is a perspective view of the tilting guide part in a direction different from FIG. 14A;

FIG. 14C is a cross-sectional view of the tilting guide part taken along line FF' in FIG. 14A;

FIG. 15A is a perspective view of the second camera actuator from which a shield can and a substrate are removed according to an embodiment;

FIG. 15B is a cross-sectional view taken along line GG' in FIG. 15A;

FIG. 15C is a cross-sectional view taken along line HH' in FIG. 15A;

FIG. 16 is a view illustrating a driving part according to an embodiment;

FIG. 17A is a perspective view of the second camera actuator according to an embodiment;

FIG. 17B is a cross-sectional view taken along line MM' in FIG. 17A;

FIG. 17C is an exemplary view of movement of the second camera actuator illustrated in FIG. 17B;

FIG. 18A is a perspective view of the second camera actuator according to an embodiment;

FIG. 18B is a cross-sectional view taken along line LL' in FIG. 18A;

FIG. 18C is an exemplary view of movement of the second camera actuator illustrated in FIG. 18B;

FIG. 19A is an exploded perspective view of a second camera actuator according to a third embodiment;

FIG. 19B is a perspective view of a housing according to the third embodiment;

FIG. 20A is a perspective view of a prism holder according to an embodiment;

FIG. 20B is a bottom view of the prism holder according to an embodiment;

FIG. 20C is a lateral view of the prism holder according to an embodiment;

FIG. 21A is a perspective view of a tilting guide part according to an embodiment;

FIG. 21B is a perspective view of the tilting guide part in a direction different from FIG. 21A;

FIG. 21C is a cross-sectional view of the tilting guide part taken along line FF' in FIG. 21A;

FIG. 22A is a perspective view of the second camera actuator from which a shield can and a substrate are removed according to an embodiment;

FIG. 22B is a cross-sectional view taken along line PP' in FIG. 22A;

FIG. 22C is a cross-sectional view taken along line QQ' in FIG. 22A;

FIG. 23 is a view illustrating a driving part according to an embodiment;

FIG. 24A is a perspective view of the second camera actuator according to an embodiment;

FIG. 24B is a cross-sectional view taken along line SS' in FIG. 24A;

FIG. 24C is an exemplary view of movement of the second camera actuator illustrated in FIG. 24B;

FIG. 25A is a perspective view of the second camera actuator according to an embodiment;

FIG. 25B is a cross-sectional view taken along line RR' in FIG. 25A;

FIG. 25C is an exemplary view of movement of the second camera actuator illustrated in FIG. 25B;

FIG. 26 is a perspective view of an auto-focusing (AF) or zooming actuator according to another embodiment of the present invention;

FIG. 27 is a perspective view in which some components are omitted from the actuator according to the embodiment illustrated in FIG. 26;

FIG. 28 is an exploded perspective view in which some components are omitted from the actuator according to the embodiment illustrated in FIG. 26;

FIG. 29A is a perspective view of a first lens assembly in the actuator according to the embodiment illustrated in FIG. 28;

FIG. 29B is a perspective view in which some components are omitted from the first lens assembly illustrated in FIG. 29A;

FIG. 30 is a perspective view of a third lens assembly in the actuator according to the embodiment illustrated in FIG. 28;

FIG. 31 is a perspective view of a mobile terminal to which a camera module according to an embodiment is applied; and FIG. 32 is a perspective view of a vehicle to which the camera module according to an embodiment is applied.

DETAILED DESCRIPTION OF EXEMPLARY EMBODIMENTS

Since various modifications may be made to the present invention and the present invention may have various embodiments, particular embodiments will be illustrated in the drawings and described. However, this does not limit the present invention to the particular embodiments, and all modifications, equivalents, and substitutes included in the idea and scope of the present invention should be construed as belonging to the present invention.

Terms including ordinals such as first and second may be used to describe various elements, but the elements are not limited by the terms. The terms are only used for the purpose of distinguishing one element from another element. For example, a second element may be referred to as a first element while not departing from the scope of the present invention, and likewise, a first element may also be referred to as a second element. The term and/or includes a combination of a plurality of related described items or any one item among the plurality of related described items.

When it is mentioned that a certain element is "connected" or "linked" to another element, although the certain element may be directly connected or linked to the other element, it should be understood that another element may be present therebetween. On the other hand, when it is mentioned that a certain element is "directly connected" or "directly linked" to another element, it should be understood that other elements are not present therebetween.

Terms used in the application are merely used to describe particular embodiments and are not intended to limit the present invention. A singular expression includes a plural expression unless the context clearly indicates otherwise. In the application, terms such as "include" or "have" should be understood as specifying that features, number, steps, operations, elements, components, or combinations thereof are present and not as precluding the possibility of the presence or addition of one or more other features, numbers, steps, operations, elements, components, or combinations thereof in advance.

Unless otherwise defined, all terms including technical or scientific terms used herein have the same meaning as commonly understood by one of ordinary skill in the art to which the present invention pertains. Terms, such as those defined in commonly used dictionaries, should be construed as having a meaning that is consistent with their meaning in the context of the relevant art and are not to be construed in an idealized or overly formal sense unless expressly so defined herein.

Hereinafter, an embodiment will be described in detail with reference to the accompanying drawings. The same or corresponding elements will be denoted by the same reference numerals throughout the drawings and repeated descriptions thereof will be omitted.

FIG. 1 is a perspective view of a camera module according to an embodiment, FIG. 2A is a perspective view of a state in which a shield can is removed from the camera module illustrated in FIG. 1, and FIG. 2B is a plan view of the camera module illustrated in FIG. 2A.

Referring to FIG. 1, a camera module 1000 may include a single camera module or a plurality of camera modules. For example, the camera module 1000 may include a first camera module 1000A and a second camera module 1000B. The first camera module 1000A and the second camera module 1000B may be covered by a predetermined shield can 1510.

Referring to FIGS. 1, 2A, and 2B, the first camera module 1000A may include a single actuator or a plurality of actuators. For example, the first camera module 1000A may include a first camera actuator 1100 and a second camera actuator 1200.

The first camera actuator 1100 may be electrically connected to a first group of circuit boards 1410, the second camera actuator 1200 may be electrically connected to a second group of circuit boards 1420, and although not illustrated, the second group of circuit boards 1420 may also be electrically connected to the first group of circuit boards 1410. The second camera module 1000B may be electrically connected to a third group of circuit boards 1430.

The first camera actuator 1100 may be a zooming actuator or an auto-focusing (AF) actuator. For example, the first camera actuator 1100 may support a single lens or a plurality of lenses and move the lens or lenses according to a control signal of a predetermined controller to perform an AF function or a zooming function. The second camera actuator 1200 may be an optical image stabilizer (OIS) actuator.

The second camera module 1000B may include a fixed-focal-length lens disposed in a predetermined lens barrel (not illustrated). The fixed-focal-length lens may also be referred to as "single-focal-length lens" or "single lens."

The second camera module 1000B may include an actuator (not illustrated) that is disposed in a predetermined housing (not illustrated) and is able to drive a lens part. The actuator may be a voice coil motor, a micro actuator, a silicon actuator, or the like and may be applied in various ways such as an electrostatic method, a thermal method, a bimorph method, and an electrostatic force method, but the present invention is not limited thereto.

Next, FIG. 3A is a perspective view of a first camera module illustrated in FIG. 2A, and FIG. 3B is a lateral cross-sectional view of the first camera module illustrated in FIG. 3A.

Referring to FIG. 3A, the first camera module 1000A may include the first camera actuator 1100 configured to perform the zooming function and the AF function and the second camera actuator 1200 disposed at one side of the first camera actuator 1100 and configured to perform the OIS function.

Referring to FIG. 3B, the first camera actuator 1100 may include an optical system and a lens driving part. For example, at least one or more of a first lens assembly 1110, a second lens assembly 1120, a third lens assembly 1130, and a guide pin 50 may be disposed in the first camera actuator 1100.

Also, the first camera actuator 1100 may include a driving coil 1140 and a driving magnet 1160 and perform a high-magnification zooming function.

For example, the first lens assembly 1110 and a second lens assembly 1120 may be moving lenses that move through the driving coil 1140, the driving magnet 1160, and the guide pin 50, and the third lens assembly 1130 may be a fixed lens, but the present invention is not limited thereto. For example, the third lens assembly 1130 may serve as a focator that focuses light to form an image at a specific position, and the first lens assembly 1110 may serve as a variator that re-forms the image formed by the third lens assembly 1130 at another position. Meanwhile, the first lens assembly 1110 may be in a state in which a distance with a subject or an image distance is considerably changed and a change in magnification is large, and the first lens assembly 1110, which is a variator, may play an important role in changes in a focal length or magnification of an optical system. Meanwhile, image points formed by the first lens assembly 1110, which is a variator, may be slightly different according to positions. Thus, the second lens assembly 1120 may perform a position compensation function for an image formed by the variator. For example, the second lens assembly 1120 may serve as a compensator that accurately forms the image points formed by the first lens assembly 1110, which is a variator, at the actual position of an image sensor 1190.

For example, the first lens assembly 1110 and the second lens assembly 1120 may be driven by an electromagnetic force due to an interaction between the driving coil 1140 and the driving magnet 1160.

Also, a predetermined image sensor 1190 may be disposed to be perpendicular to a direction of an optical axis of parallel light.

Next, the second camera actuator 1200 will be described in detail below with reference to FIG. 4 and the subsequent drawings.

Also, the camera module according to an embodiment may implement OIS through control of an optical path through a camera actuator, and accordingly, an occurrence of a decentering or tilting phenomenon may be minimized, and optimal optical characteristics may be obtained.

Since FIGS. 1 to 3 and description thereof are intended to describe the overall structure and operational principle of the camera module according to an embodiment of the present invention, embodiments of the present invention are not limited to specific configurations illustrated in FIGS. 1 to 3.

Meanwhile, in a case in which an OIS actuator and an AF or zooming actuator are disposed according to an embodiment of the present invention, while the OIS actuator is driven, magnetic field interference with an AF or zooming magnet may be prevented. Since a driving magnet of the second camera actuator 1200 is disposed to be separated from the first actuator 1100, magnetic field interference between the first camera actuator 1100 and the second camera actuator 1200 may be prevented. In the present specification, the term "OIS" may be interchangeably used with terms such as "hand-shaking correction," "optical image stabilization," "optical image correction," and "shaking correction."

Hereinafter, a control method and a specific structure of a second camera actuator according to one embodiment of the present invention will be described in more detail.

FIG. 4A is an exploded perspective view of a second camera actuator according to a first embodiment, and FIG. 4B is a perspective view of a housing according to the first embodiment.

Referring to FIGS. 4A and 4B, a second camera actuator 1200 according to the embodiment includes a shield can 1210, a housing 1220, a mover 1230, a rotating part 1240, a driving part 1250, a first member 1231a, and a second member 1226.

The mover 1230 may include a prism holder 1231 and a prism 1232 seated on the prism holder 1231. Also, the rotating part 1240 may include a tilting guide part 1241, and a first magnetic body 1242 and a second magnetic body 1243 that have different polarities to press the tilting guide part 1241. Also, the driving part 1250 includes a driving magnet 1251, a driving coil 1252, a Hall sensor part 1253, a substrate part 1254, and a yoke part 1255.

First, the shield can 1210 may be disposed at the outermost side of the second camera actuator 1200 and disposed to surround the rotating part 1240, which will be described below, and the driving part 1250.

The shield can 1210 may block or reduce electromagnetic waves generated from the outside. That is, the shield can 1210 may reduce the occurrence of malfunctions in the rotating part 1240 or the driving part 1250.

The housing 1220 may be disposed inside the shield can 1210. Also, the housing 1220 may be disposed at an inner side of the substrate part 1254 which will be described below. The housing 1220 may be fastened to be fitted to the shield can 1210.

The housing 1220 may include a first housing side part 1221, a second housing side part 1222, a third housing side part 1223, and a fourth housing side part 1224.

The first housing side part 1221 and the second housing side part 1222 may be disposed to face each other. Also, the third housing side part 1223 and the fourth housing side part 1224 may be disposed to face each other.

Also, the third housing side part 1223 and the fourth housing side part 1224 may be disposed between the first housing side part 1221 and the second housing side part 1222. The third housing side part 1223 may come in contact with the first housing side part 1221, the second housing side part 1222, and the fourth housing side part 1224. The third housing side part 1223 may be a bottom surface in the housing 1220.

Here, the bottom surface refers to one side in a first direction. Also, the first direction is the X-axis direction in the drawings, and the term "first direction" may be interchangeably used with the term "second-axis direction" or the like. A second direction is the Y-axis direction in the drawings, and the term "second direction may be interchangeably used with the term "first-axis direction" or the like. The second direction is a direction perpendicular to the first direction. Also, a third direction is the Z-axis direction in the drawings, and the term "third direction" may be interchangeably used with the term "third-axis direction" or the like. The third direction is a direction perpendicular to both the first direction and the second direction. Here, the third direction (Z-axis direction) may correspond to a direction of an optical axis, and the first direction (X-axis direction) and the second direction (Y-axis direction) may be directions perpendicular to the optical axis and may be tilted by the second camera actuator. This will be described in detail below.

Also, the first housing side part 1221 may include a first housing hole 1221*a*. A first coil 1252*a*, which will be described below, may be disposed in the first housing hole 1221*a*.

Also, the second housing side part 1222 may include a second housing hole 1222*a*. Also, a second coil 1252*b*, which will be described below, may be disposed in the second housing hole 1222*a*.

The first coil 1252*a* and the second coil 1252*b* may be coupled to the substrate part 1254. In an embodiment, the first coil 1252*a* and the second coil 1252*b* may be electrically connected to the substrate part 1254 and current may flow therein. The current is a factor of an electromagnetic force that allows the second camera actuator to tilt about the X-axis.

Also, the third housing side part 1223 may include a third-first housing hole 1223*a* and a third-second housing hole 1223*b*.

A third coil 1252*c*, which will be described below, may be disposed in the third-first housing hole 1223*a*. The third coil 1252*c* may be coupled to the substrate part 1254. Also, the third coil 1252*c* may be electrically connected to the substrate part 1254 and current may flow therein. The current is a factor of an electromagnetic force that allows the second camera actuator to tilt about the Y-axis.

The first member 1231*a*, which will be described below, may be seated in the third-second housing hole 1223*b*. Accordingly, the first member 1231*a* may be coupled to the third housing side part 1223. The first member 1231*a* may be disposed to pass through the third-second housing hole 1223*b*. Accordingly, the first member 1231*a* may overlap at least a portion of the third-second housing hole 1223*b* in the third direction (X-axis direction).

Also, the prism holder 1231 may include a protruding part due to a fourth seating groove 1231S4*a*. Here, the protruding part may extend toward the fourth housing side part 1224. Also, the protruding part may be disposed at an upper portion, a lower portion, or a side surface of the mover 1230. In an embodiment, the protruding part may be disposed at the upper portion of the mover 1230 and improve a coupling force between the mover 1230, the housing 1220, and the tilting guide part 1241. Also, an end portion of the protruding part may come in contact with the first member 1231*a*. That is, the protruding part may be coupled to the first member 1231*a*. Due to such a configuration, as will be described below, repulsive force generated by the first magnetic body and the second magnetic body may be transmitted from the prism holder 1231 to the first member

1231*a* or transmitted from the first member 1231*a* to the prism holder 1231. The above description may be applied to the present embodiment and also to another embodiment which will be described below.

The fourth housing side part 1224 may be disposed between the first housing side part 1221 and the second housing side part 1222 and may come in contact with the first housing side part 1221, the second housing side part 1222, and the third housing side part 1223.

Also, the housing 1220 may include an accommodating part 1225 formed by the first housing side part 1221 to the fourth housing side part 1224. The second member 1226, the first member 1231*a*, and the mover 1230 may be disposed as elements in the accommodating part 1225.

The second member 1226 may be disposed in the housing 1220. The second member 1226 may be disposed or included in the housing. Also, the second member 1226 may be coupled to the housing 1220. In an embodiment, the second member 1226 may be disposed between the third-first housing hole 1223*a* and the fourth housing side part 1224. Also, the second member 1226 may pass through the third-second housing hole 1223*b* formed in the third housing side part 1223 and be coupled to the third housing side part 1223. Thus, the second member 1226 may be coupled to the housing 1220 and may remain fixed even during a tilt of the mover 1230 which will be described below. Also, the second member 1226 includes a second groove gr2 on which the second magnetic body 1243 is seated. Accordingly, the second member 1226 may fix the position of the second magnetic body 1243 and prevent a change in a support force due to the repulsive force. Also, the second member 1226 may be integrally formed with the housing 1220 or separated therefrom. In a case in which the second member 1226 is integrally formed with the housing 1220, a coupling force between the second member 1226 and the housing 1220 may be improved and the reliability of the camera actuator may be improved. Also, in a case in which the second member 1226 is separated from the housing 1220, ease of assembly and manufacture of the second member 1226 and the housing 1220 may be improved. Hereinafter, description will be given on the basis of the case in which the second member 1226 is separated from the housing 1220. Also, in the present specification, the second member 1226 should be understood as a support member in which the second magnetic body is disposed in the housing 1220.

The mover 1230 includes the prism holder 1231 and the prism 1232 seated on the prism holder 1231.

First, the prism holder 1231 may be seated on the accommodating part 1225 of the housing 1220. The prism holder 1231 may include a first prism outer side surface to a fourth prism outer side surface that correspond to the first housing side part 1221, the second housing side part 1222, the third housing side part 1223, and the fourth housing side part 1224, respectively. Also, the prism holder 1231 may include the first member 1231*a* disposed on the fourth seating groove of the fourth prism outer side surface. This will be described in detail below. The first member 1231*a* may include a second protrusion groove PH2 formed in a surface that faces the fourth seating groove of the prism holder 1231. The second protruding part of the tilting guide part 1241, which will be described below, may be seated on the second protrusion groove PH2.

The prism 1232 may be seated on the prism holder 1231. To this end, the prism holder 1231 may have a seating surface, and the seating surface may be formed by an accommodation groove. The prism 1232 may include a reflecting part disposed therein. However, the present invention is not limited thereto. Also, the prism 1232 may reflect light reflected from the outside (for example, from an object) toward the inside of the camera module. In other words, the prism 1232 may change a path of the reflected light and improve a spatial limitation of the first camera actuator and the second camera actuator. It should be understood that, in this way, the camera module may expand an optical path and provide a high magnification range while a thickness of the camera module is minimized.

In addition, the first member 1231*a* may be coupled to the prism holder 1231. The first member 1231*a* may come in contact with a protruding part disposed in an area other than the fourth seating groove in the fourth prism outer side surface of the prism holder 1231. The first member 1231*a* may be integrally formed with the prism holder 1231. Alternatively, the first member 1231*a* may be formed of a structure separated from the prism holder 1231.

The rotating part 1240 includes the tilting guide part 1241, and the first magnetic body 1242 and the second magnetic body 1243 that have different polarities so as to press the tilting guide part 1241.

The tilting guide part 1241 may be coupled to the mover 1230 and the housing 1220. Specifically, in the first embodiment, the tilting guide part 1241 may be disposed between the first member 1231*a* and the second member 1226 and be coupled to the mover 1230 and the housing 1220. Accordingly, in the third direction (Z-axis direction), the fourth housing side part 1224, the first member 1231*a*, the tilting guide part 1241, the second member 1226, and the prism holder 1231 may be disposed in this order.

Also, the tilting guide part 1241 may be disposed to be adjacent to the optical axis. In this way, an actuator according to an embodiment may easily change an optical path according to tilts about the first and second axes which will be described below.

Also, the tilting guide part 1241 may include a base, first protruding parts disposed to be spaced apart in the first direction (X-axis direction) on the base, and second protruding parts disposed to be spaced apart in the second direction (Y-axis direction) on the base. Also, the first protruding part and the second protruding part may protrude in opposite directions. It should be understood that the tilting guide part 1241 may also be referred to by various terms such as "rotary plate," "guide part," "rotary guide part," "tilting part," and "tilting plate". This will be described in detail below.

The first magnetic body 1242 may be seated on the fourth seating groove 1231S4*a* of the prism holder 1231. Specifically, the first magnetic body 1242 may be seated on a first groove of the fourth seating groove.

The second magnetic body 1243 may be seated in the second member 1226. In an embodiment, the second magnetic body 1243 may be seated in the second groove gr2 of the second member 1226.

Also, the first magnetic body 1242 and the second magnetic body 1243 may have the same polarity. For example, the first magnetic body 1242 may be a magnet having an N-pole, and the second magnetic body 1243 may be a magnet having an N-pole. Alternatively, conversely, the first magnetic body 1242 may be a magnet having an S-pole, and the second magnetic body 1243 may be a magnet having an S-pole.

Also, the first magnetic body 1242 and the second magnetic body 1243 may generate repulsive force therebetween due to having the same polarity as described above. Due to such a configuration, the repulsive force may be applied to the prism holder 1231 coupled to the first magnetic body

1242 and the second member 1226 or the housing 1220 coupled to the second magnetic body 1243. The repulsive force applied to the prism holder 1231 may also be transmitted to the first member 1231*a*. In this way, the tilting guide part 1241 disposed between the first member 1231*a* and the second member 1226 may be pressed due to the repulsive force. That is, the repulsive force may maintain a force that allows the tilting guide part 1241 to be disposed between the first member 1231*a* and the second member 1226. This will be described in detail below.

Also, the first magnetic body 1242 and the second magnetic body 1243 may be provided as a plurality of first magnetic bodies 1242 and a plurality of second magnetic bodies 1243. In this way, the repulsive force generated between the first magnetic body 1242 and the second magnetic body 1243 may be concentrated to a predetermined point to prevent spread of the repulsive force. For example, the repulsive force may be concentrated to the center of the tilting guide part to minimize a factor that may act as resistance to rotation.

The driving part 1250 includes the driving magnet 1251, the driving coil 1252, the Hall sensor part 1253, and the substrate part 1254.

The driving magnet 1251 may include a plurality of magnets. In an embodiment, the driving magnet 1251 may include a first magnet 1251*a*, a second magnet 1251*b*, and a third magnet 1251*c*.

The first magnet 1251*a*, the second magnet 1251*b*, and the third magnet 1251*c* may each be disposed at an outer side surface of the prism holder 1231. Also, the first magnet 1251*a* and the second magnet 1251*b* may be disposed to face each other. Also, the third magnet 1251*c* may be disposed on a bottom surface among the outer side surfaces of the prism holder 1231. This will be described in detail below.

The driving coil 1252 may include a plurality of coils. In an embodiment, the driving coil 1252 may include a first coil 1252*a*, a second coil 1252*b*, and a third coil 1252*c*.

The first coil 1252*a* may be disposed opposite to the first magnet 1251*a*. The first coil 1252*a* may be disposed in the first housing hole 1221*a* of the first housing side part 1221 as described above. Also, when current flows in the first coil 1252*a*, the first magnet 1251*a* may generate a force to which a magnetic field generated in the first coil 1252*a* is reflected.

Also, the second coil 1252*b* may be disposed opposite to the second magnet 1251*b*. The second coil 1252*b* may be disposed in the second housing hole 1222*a* of the second housing side part 1222 as described above. Also, when current flows in the second coil 1252*b*, the second magnet 1251*b* may generate a force to which a magnetic field generated in the second coil 1252*b* is reflected.

The first coil 1252*a* may be disposed to face the second coil 1252*b*. That is, the first coil 1252*a* may be disposed to be symmetrical to the second coil 1252*b* with respect to the first direction (X-axis direction). This may also apply to the first magnet 1251*a* and the second magnet 1251*b*. That is, the first magnet 1251*a* and the second magnet 1251*b* may be disposed to be symmetrical with respect to the first direction (X-axis direction). Also, the first coil 1252*a*, the second coil 1252*b*, the first magnet 1251*a*, and the second magnet 1251*b* may be disposed to at least partially overlap in the second direction (Y-axis direction). Due to such a configuration, an electromagnetic force between the first coil 1252*a* and the first magnet 1251*a* and an electromagnetic force between the second coil 1252*b* and the second magnet 1251*b* may allow X-axis tilting to be accurately performed without tilting to one side.

The third coil 1252c may be disposed opposite to the third magnet 1251c. Thus, the third coil 1252c may be disposed in the third-first housing hole 1223a of the third housing side part 1223 as described above. The third coil 1252c may generate an electromagnetic force with the third magnet 1251c and perform Y-axis tilting of the mover 1230 and the rotating part 1240 with respect to the housing 1220.

Here, the X-axis tilting refers to tilting about the X-axis, and the Y-axis tilting refers to tilting about the Y-axis.

The Hall sensor part 1253 may include a plurality of Hall sensors. In an embodiment, the Hall sensor part 1253 may include a first Hall sensor 1253a and a second Hall sensor 1253b. The first Hall sensor 1253a may be disposed at an inner side of the first coil 1252a or the second coil 1252b. The first Hall sensor 1253a may detect a change in a magnetic flux at the inner side of the first coil 1252a or the second coil 1252b. In this way, position sensing may be performed between the first and second magnets 1251a and 1251b and the first Hall sensor 1253a. In this way, the second camera actuator according to an embodiment may control the X-axis tilt. Also, the first Hall sensor 1253a may be provided as a plurality of first Hall sensors 1253a.

The second Hall sensor 1253b may be disposed at an inner side of the third coil 1252c. The second Hall sensor 1253b may detect a change in a magnetic flux at the inner side of the third coil 1252c. In this way, position sensing may be performed between the third magnet 1251c and the second Hall sensor 1253b. In this way, the second camera actuator according to an embodiment may control the Y-axis tilt.

The substrate part 1254 may be disposed at a lower portion of the driving part 1250. The substrate part 1254 may be electrically connected to the driving coil 1252 and the Hall sensor part 1253. For example, the substrate part 1254 may be coupled to the driving coil 1252 and the Hall sensor part 1253 using surface-mount technology (SMT). However, the method of coupling is not limited thereto. Also, the substrate part 1254 may be formed in various shapes for electrical connection with another camera actuator that is coupled to the second camera actuator described herein. Further, the substrate part 1254 may include various grooves or holes for easy coupling with the housing 1220.

In an embodiment, the substrate part 1254 may be disposed between the shield can 1210 and the housing 1220 and coupled to the shield can 1210 and the housing 1220. The coupling may be performed using various methods as described above. Also, through the coupling, the driving coil 1252 and the Hall sensor part 1253 may be disposed in an outer side surface of the housing 1220.

The substrate part 1254 may include a circuit board with wiring patterns that may be electrically connected, such as a rigid printed circuit board (PCB), a flexible PCB, and a rigid-flexible PCB. However, types of the circuit board are not limited thereto.

FIG. 5A is a perspective view of a mover according to an embodiment, FIG. 5B is a perspective view of the mover in a direction different from FIG. 5A, FIG. 6A is a perspective view of a prism holder according to an embodiment, FIG. 6B is a bottom view of the prism holder according to an embodiment, FIG. 6C is a lateral view of the prism holder according to an embodiment, and FIG. 6D is another lateral view of the prism holder according to an embodiment.

Referring to FIGS. 5A and 5B, the prism 1232 may be seated on the prism holder. The prism 1232 may be a right-angled prism that serves as a reflecting part, but the present invention is not limited thereto.

In an embodiment, the prism 1232 may have a protruding part 1232a formed at a portion of an outer side surface. The prism 1232 may be easily coupled to the prism holder through the protruding part 1232a. Also, the prism 1232 may be seated on the seating surface of the prism holder through a bottom surface 1232b. Thus, the bottom surface 1232b of the prism 1232 may correspond to the seating surface of the prism holder. In an embodiment, the bottom surface 1232b may be formed as an inclined surface as the seating surface of the prism holder. Accordingly, it is possible to prevent a case where, while the prism moves according to movement of the prism holder, the prism 1232 is separated from the prism holder due to the movement.

Also, as described above, the prism 1232 may be formed of a structure that may reflect light reflected from the outside (for example, an object) toward the inside of the camera module. In an embodiment, the prism 1232 may be formed of a single mirror. Also, the prism 1232 may change a path of reflected light and improve a spatial limitation of the first camera actuator and the second camera actuator. It should be understood that, in this way, the camera module may expand an optical path and provide a high magnification range while the thickness of the camera module is minimized. Also, it should be understood that the camera module including the camera actuator according to an embodiment may expand an optical path and provide a high magnification range while the thickness of the camera module is minimized.

Referring to FIGS. 6A to 6D, the prism holder 1231 may include a seating surface 1231k on which the prism 1232 is seated. The seating surface 1231k may be an inclined surface. Also, the prism holder 1231 may include a stepped part 1231b disposed at an upper portion of the seating surface 1231k. Also, in the prism holder 1231, the stepped part 1231b may be coupled to the protruding part 1232a of the prism 1232.

Also, the prism holder 1231 may include a plurality of outer side surfaces. The prism holder 1231 may include a first prism outer side surface 1231S1, a second prism outer side surface 1231S2, a third prism outer side surface 1231S3, and a fourth prism outer side surface 1231S4.

The first prism outer side surface 1231S1 may be disposed to face the second prism outer side surface 1231S2. That is, the first prism outer side surface 1231S1 may be disposed to be symmetrical to the second prism outer side surface 1231S2 with respect to the first direction (X-axis direction).

The first prism outer side surface 1231S1 may be disposed to correspond to the first housing side part. That is, the first prism outer side surface 1231S1 may be disposed to face the first housing side part. Also, the second prism outer side surface 1231S2 may be disposed to face the second housing side part.

Also, the first prism outer side surface 1231S1 may include a first seating groove 1231S1a. In addition, the second prism outer side surface 1231S2 may include a second seating groove 1231S2a. The first seating groove 1231S1a and the second seating groove 1231S2a may be disposed to be symmetrical to each other with respect to the first direction (X-axis direction).

Also, the first seating groove 1231S1a and the second seating groove 1231S2a may be disposed to overlap in the second direction (Y-axis direction). In addition, the first magnet 1251a may be disposed in the first seating groove 1231S1a, and the second magnet 1251b may be disposed in the second seating groove 1231S2a. The first magnet 1251a and the second magnet 1251b may also be disposed to be symmetrical to each other with respect to the first direction (X-axis direction).

As described above, due to the positions of the first and second seating grooves and the first and second magnets, the electromagnetic force caused by each magnet may be coaxially provided to the first prism outer side surface 1231S1 and the second prism outer side surface 1231S2. For example, an area in which the electromagnetic force is applied to the first prism outer side surface 1231S1 (for example, a portion where the electromagnetic force is the strongest) and an area in which the electromagnetic force is applied to the second prism outer side surface 1231S2 (for example, a portion where the electromagnetic force is the strongest) may be disposed on an axis parallel to the second direction (Y-axis direction). In this way, the X-axis tilting may be accurately performed.

The first magnet 1251a may be disposed in the first seating groove 1231S1a, and the second magnet 1251b may be disposed in the second seating groove 1231S2a.

The third prism outer side surface 1231S3 may be an outer side surface that comes in contact with the first prism outer side surface 1231S1 and the second prism outer side surface 1231S2 and extends in the second direction (Y-axis direction) from one side of the first prism outer side surface 1231S1 and one side of the second prism outer side surface 1231S2. Also, the third prism outer side surface 1231S3 may be disposed between the first prism outer side surface 1231S1 and the second prism outer side surface 1231S2. The third prism outer side surface 1231S3 may be a bottom surface in the prism holder 1231.

Also, the third prism outer side surface 1231S3 may include a third seating groove 1231S3a. The third magnet 1251c may be disposed in the third seating groove 1231S3a. The third prism outer side surface 1231S3 may be disposed to face the third housing side part 1223. Also, the third-first housing hole 1223a may at least partially overlap the third seating groove 1231S3a in the first direction (X-axis direction). Accordingly, the third magnet 1251c in the third seating groove 1231S3a and the third coil 1252c in the third-first housing hole 1223a may be disposed to face each other. Also, the third magnet 1251c and the third coil 1252c may generate an electromagnetic force to allow the second camera actuator to tilt about the Y-axis.

Also, while the X-axis tilt is performed by the plurality of magnets (the first and second magnets 1251a and 1251b), the Y-axis tilt may be performed only by the third magnet 1251c. In an embodiment, an area of the third seating groove 1231S3a may be larger than an area of the first seating groove 1231S1a or second seating groove 1231S2a. Due to such a configuration, the Y-axis tilt may be performed with similar current control to the X-axis tilt.

The fourth prism outer side surface 1231S4 may be an outer side surface that comes in contact with the first prism outer side surface 1231S1 and the second prism outer side surface 1231S2 and extends in the first direction (X-axis direction) from the first prism outer side surface 1231S1 and the second prism outer side surface 1231S2. Also, the fourth prism outer side surface 1231S4 may be disposed between the first prism outer side surface 1231S1 and the second prism outer side surface 1231S2.

The fourth prism outer side surface 1231S4 may include the fourth seating groove 1231S4a. The tilting guide part 1241 may be disposed in the fourth seating groove 1231S4a. Also, the first member 1231a and the second member 1226 may be disposed in the fourth seating groove 1231S4a. In addition, the fourth seating groove 1231S4a may include a plurality of areas, e.g., a first area AR1, a second area AR2, and a third area AR3.

The first member 1231a may be disposed in the first area AR1. That is, the first area AR1 may overlap the first member 1231a in the first direction (X-axis direction).

The second member 1226 may be disposed in the second area AR2. That is, the second area AR2 may overlap the second member 1226 in the first direction (X-axis-direction).

The tilting guide part 1241 may be disposed in the third area AR3. That is, the third area AR3 may overlap the tilting guide part 1241 in the first direction (X-axis direction). Also, the third area AR3 may be disposed between the first area AR1 and the second area AR2. Also, in the present embodiment, the first area AR1 includes an area that overlaps both the first member 1231a and the protruding part of the tilting guide part 1241 in the first direction (X-axis direction). The second area AR2 includes an area that overlaps both the protruding part of the tilting guide part 1241 and the second member 1226 in the first direction (X-axis direction). The third area AR3 will be described on the basis of an area that overlaps the tilting guide part 1241 in the third direction (Z-axis direction) and does not overlap the first member 1231a and the second member 1226 in the first direction (X-axis direction).

Also, the fourth seating groove 1231S4a may include a first groove gr1. The first magnetic body 1242 described above may be seated in the first groove gr1. Also, the first groove gr1 may be provided as a plurality of first grooves gr1 according to the number of first magnetic bodies 1242. That is, the number of first grooves gr1 may correspond to the number of first magnetic bodies 1242.

Also, in an embodiment, the second area AR2 may be disposed to be spaced apart from the first area AR1 in the third direction (Z-axis direction) with the third area AR3 disposed therebetween.

Also, in the fourth seating groove 1231S4a, the first groove gr1 and the second area AR2 may overlap the prism in the first direction (X-axis direction). In other words, a length of the fourth seating groove 1231S4a in the third direction (Z-axis direction) may be larger than a length of the tilting guide part 1241 in the third direction (Z-axis direction). Thus, the bottom surface of the fourth seating groove 1231S4a may be disposed adjacent to the third seating groove 1231S3a. Due to such a configuration, the tilting guide part may be disposed adjacent to the center of mass of the mover. Accordingly, a moment value tilting the mover may be minimized. Also, the consumption of current applied to a coil part or the like to tilt the mover may be minimized.

In an embodiment, the first area AR1, the second area AR2, and the third area AR3 may have different heights in the first direction (X-axis direction) in the fourth prism outer side surface 1231S4.

FIG. 7A is a perspective view of a tilting guide part according to an embodiment, FIG. 7B is a perspective view of the tilting guide part in a direction different from FIG. 7A, and FIG. 7C is a cross-sectional view of the tilting guide part taken along line AA' in FIG. 7A.

Referring to FIGS. 7A to 7C, the tilting guide part 1241 according to an embodiment may include a base BS, a first protruding part PR1 protruding from a first surface 1241a of the base BS, and a second protruding part PR2 protruding from a second surface 1241b of the base BS. According to structures, the surfaces on which the first protruding part and the second protruding part are formed may be reversed, but in the present specification, description will be given on the basis of the above content.

First, the base BS may include the first surface 1241a and the second surface 1241b opposite to the first surface 1241a. That is, the first surface 1241a may be spaced apart from the second surface 1241b in the third direction (Z-axis direction), and the first surface 1241*a* and the second surface 1241*b* may be outer side surfaces that are opposite to each other or face each other in the tilting guide part 1241.

The tilting guide part 1241 may include the first protruding part PR1 extending toward one side from the first surface 1241*a*. According to an embodiment, the first protruding part PR1 may protrude from the first surface 1241*a* toward the mover. The first protruding part PR1 may be provided as a plurality of first protruding parts PR1 and include a first-first protruding part PR1*a* and a first-second protruding part PR1*b*.

The first-first protruding part PR1*a* and the first-second protruding part PR1*b* may be disposed to be parallel in the first direction (X-axis direction). In other words, the first-first protruding part PR1*a* and the first-second protruding part PR1*b* may overlap in the first direction (X-axis direction). Also, in an embodiment, the first-first protruding part PR1*a* and the first-second protruding part PR1*b* may be divided into two parts by a virtual line extending in the first direction (X-axis direction).

Also, the first-first protruding part PR1*a* and the first-second protruding part PR1*b* may each have a curvature, e.g., a semi-spherical shape. In addition, the first-first protruding part PR1*a* and the first-second protruding part PR1*b* may come in contact with the first groove of the housing at a point that is the most spaced apart from the first surface 1241*a* of the base BS.

Also, the tilting guide part 1241 may include a second protruding part PR2 extending toward one side from the second surface 1241*b*. According to an embodiment, the second protruding part PR2 may protrude from the second surface 1241*b* toward the housing. In addition, the second protruding part PR2 may be provided as a plurality of second protruding parts PR2 and include a second-first protruding part PR2*a* and a second-second protruding part PR2*b* in an embodiment.

The second-first protruding part PR2*a* and the second-second protruding part PR2*b* may be disposed to be parallel in the second direction (Y-axis direction). That is, the second-first protruding part PR2*a* and the second-second protruding part PR2*b* may overlap in the second direction (Y-axis direction). Also, in an embodiment, the second-first protruding part PR2*a* and the second-second protruding part PR2*b* may be divided into two parts by a virtual line extending in the second direction (Y-axis direction).

The second-first protruding part PR2*a* and the second-second protruding part PR2*b* may each have a curvature, e.g., a semi-spherical shape. In addition, the second-first protruding part PR2*a* and the second-second protruding part PR2*b* may come in contact with the first member 1231*a* at a point that is spaced apart from the second surface 1241*b* of the base BS.

The first-first protruding part PR1*a* and the first-second protruding part PR1*b* may be disposed in an area between the second-first protruding part PR2*a* and the second-second protruding part PR2*b* in the second direction. According to an embodiment, the first-first protruding part PR1*a* and the first-second protruding part PR1*b* may be disposed at the center of a separation space between the second-first protruding part PR2*a* and the second-second protruding part PR2*b* in the second direction. Due to such a configuration, an actuator according to an embodiment may allow an angle of the X-axis tilt to have the same range with respect to the X-axis. In other words, the tilting guide part 1241 may provide a range (for example, positive/negative range), in which the X-axis tilt of the mover is possible with respect to the first-first protruding part PR1*a* and the first-second protruding part PR1*b*, to be the same with respect to the X-axis.

Also, the second-first protruding part PR2*a* and the second-second protruding part PR2*b* may be disposed in an area between the first-first protruding part PR1*a* and the first-second protruding part PR1*b* in the first direction. According to an embodiment, the second-first protruding part PR2*a* and the second-second protruding part PR2*b* may be disposed at the center of a separation space between the first-first protruding part PR1*a* and the first-second protruding part PR1*b* in the first direction. Due to such a configuration, an actuator according to an embodiment may allow an angle of the Y-axis tilt to have the same range with respect to the Y-axis. In other words, with respect to the second-first protruding part PR2*a* and the second-second protruding part PR2*b*, the tilting guide part 1241 and the mover may provide a range (for example, positive/negative range), in which the Y-axis tilt is possible, to be the same with respect to the Y-axis.

Specifically, the first surface 1241*a* may include a first outer side line M1, a second outer side line M2, a third outer side line M3, and a fourth outer side line M4. The first outer side line M1 and the second outer side line M2 may face each other, and the third outer side line M3 and the fourth outer side line M4 may face each other. Also, the third outer side line M3 and the fourth outer side line M4 may be disposed between the first outer side line M1 and the second outer side line M2. In addition, although the first outer side line M1 and the second outer side line M2 are perpendicular to the first direction (X-axis direction), the third outer side line M3 and the fourth outer side line M4 may be parallel to the first direction (X-axis direction).

Here, the first protruding part PR1 may be disposed on a first virtual line VL1. Here, the first virtual line VL1 is a line that divides the each of the first outer side line M1 and the second outer side line M2 into two parts. Accordingly, the tilting guide part 1241 may easily perform the X-axis tilt through the first protruding part PR1. Further, since the tilting guide part 1241 performs the X-axis tilt with respect to the first virtual line VL1, a rotational force may be uniformly applied to the tilting guide part 1241. Thus, the X-axis tilt may be precisely performed, and device reliability may be improved.

Also, the first-first protruding part PR1*a* and the first-second protruding part PR1*b* may be disposed to be symmetrical with respect to the first virtual line VL1 and a second virtual line VL2. Alternatively, the first-first protruding part PR1*a* and the first-second protruding part PR1*b* may be disposed to be symmetrical with respect to a first center point C1. Due to such a configuration, a support force due to support by the first protruding part PR1 during the X-axis tilt may be evenly applied to an upper side and a lower side of the tilting guide part with respect to the second virtual line VL2. Thus, the reliability of the tilting guide part may be improved. Here, the second virtual line VL2 is a line that divides each of the third outer side line M3 and the fourth outer side line M4 into two parts. Also, the first center point C1 may be an intersection point between the first virtual line VL1 and the second virtual line VL2. Alternatively, the first center point C1 may be a point that corresponds to the center of mass according to shapes of the tilting guide part 1241.

Also, the second surface 1241*b* may include a fifth outer side line M1', a sixth outer side line M2', a seventh outer side line M3', and an eighth outer side line M4'. The fifth outer side line M1' and the sixth outer side line M2' may face each other, and the seventh outer side line M3' and the eighth outer side line M4' may face each other. Also, the seventh outer side line M3' and the eighth outer side line M4' may be disposed between the fifth outer side line M1' and the sixth outer side line M2'. In addition, although the fifth outer side line M1' and the sixth outer side line M2' are perpendicular to the first direction (X-axis direction), the seventh outer side line M3' and the eighth outer side line M4' may be parallel to the first direction (X-axis direction).

Further, since the tilting guide part 1241 performs the Y-axis tilt with respect to a fourth virtual line VL2', a rotational force may be uniformly applied to the tilting guide part 1241. Thus, the Y-axis tilt may be precisely performed, and device reliability may be improved.

Also, the second-first protruding part PR2a and the second-second protruding part PR2b may be disposed to be symmetrical with respect to a third virtual line VL1' on the fourth virtual line VL2'. Alternatively, the second-first protruding part PR2a and the second-second protruding part PR2b may be disposed to be symmetrical with respect to a second center point Cr. Due to such a configuration, a support force due to support by the second protruding part PR2 during the Y-axis tilt may be evenly applied to an upper side and a lower side of the tilting guide part with respect to the fourth virtual line VL2'. Thus, the reliability of the tilting guide part may be improved. Here, the third virtual line VL1' is a line that divides each of the fifth outer side line M1' and the sixth outer side line M2' into two parts. Also, the second center point C1' may be an intersection point between the third virtual line VL1' and the fourth virtual line VL2'. Alternatively, the second center point Cr may be a point that corresponds to the center of mass according to shapes of the tilting guide part 1241.

Also, a gap DR2 between the first-first protruding part PR1a and the first-second protruding part PR1b in the first direction (X-axis direction) may be larger than a length of the second protruding part PR2 in the first direction (X-axis direction). Thus, resistance due to the second protruding part PR2 may be minimized while the X-axis tilt is performed with respect to the first-first protruding part PR1a and the first-second protruding part PR1b.

Corresponding to the above, a gap ML2 between the second-first protruding part PR2a and the second-second protruding part PR2b in the second direction (Y-axis direction) may be larger than a length of the first protruding part PR1 in the second direction (Y-axis direction). Thus, resistance due to the first protruding part PR1 may be minimized while the Y-axis tilt is performed with respect to the second-first protruding part PR2a and the second-second protruding part PR2b.

FIG. 8A is a perspective view of the second camera actuator from which the shield can and the substrate are removed according to an embodiment, FIG. 8B is a cross-sectional view taken along line BB' in FIG. 8A, and FIG. 8C is a cross-sectional view taken along line CC' in FIG. 8A.

Referring to FIGS. 8A to 8C, the first coil 1252a may be disposed at the first housing side part 1221, and the first magnet 1251a may be disposed at the first prism outer side surface 1231S1 of the prism holder 1231. Thus, the first coil 1252a and the first magnet 1251a may be disposed opposite to each other. The first magnet 1251a may at least partially overlap the first coil 1252a in the second direction (Y-axis direction).

Also, the second coil 1252b may be disposed at the second housing side part 1222, and the second magnet 1251b may be disposed at the second prism outer side surface 1231S2 of the prism holder 1231. Thus, the second coil 1252b and the second magnet 1251b may be disposed opposite to each other. The second magnet 1251b may at least partially overlap the second coil 1252b in the second direction (Y-axis direction).

Also, the first coil 1252a and the second coil 1252b may overlap in the second direction (Y-axis direction), and the first magnet 1251a and the second magnet 1251b may overlap in the second direction (Y-axis direction).

Due to such a configuration, as described above, an electromagnetic force applied to outer side surfaces of the prism holder (the first prism outer side surface and the second prism outer side surface) may be disposed on an axis parallel to the second direction (Y-axis direction), and the X-axis tilt may be performed accurately and precisely.

Also, the second protruding parts PR2a and PR2b of the tilting guide part 1241 may come in contact with the housing 1220. In addition, in a case in which the X-axis tilt is performed, the second protruding parts PR2a and PR2b may be a reference axis (or an axis of rotation) of the tilt. Thus, the tilting guide part 1241 and the mover 1230 may move vertically.

Also, as described above, the first Hall sensor 1253a may be disposed at an outer side to be electrically connected and coupled to the substrate part 1254. However, the position of the first Hall sensor 1253a is not limited thereto.

Also, the third coil 1252c may be disposed at the third housing side part 1223, and the third magnet 1251c may be disposed at the third prism outer side surface 1231S3 of the prism holder 1231. The third coil 1252c and the third magnet 1251c may at least partially overlap in the first direction (X-axis direction). Accordingly, a strength of an electromagnetic force between the third coil 1252c and the third magnet 1251c may be easily controlled.

As described above, the tilting guide part 1241 may be disposed on the fourth prism outer side surface 1231S4 of the prism holder 1231. Also, the tilting guide part 1241 may be seated in the fourth seating groove 1231S4a of the fourth prism outer side surface. As described above, the fourth seating groove 1231S4a may include the first area AR1, the second area AR2, and the third area AR3.

The first member 1231a may be disposed in the first area AR1, and the first member 1231a may include the second protrusion groove PH2. The second protrusion groove PH2 may be disposed on a surface of the first member 1231a in a direction toward the tilting guide part 1241, that is, on a surface of the first member 1231a that faces the tilting guide part 1241.

Also, a length of the first member 1231a may be larger than a length of the tilting guide part 1241 in the second direction (Y-axis direction). In addition, the first member 1231a may be seated in the first area AR1. Also, the first member 1231a may be seated in the first area AR1, coupled to the mover 1230, and rotate. The first member 1231a may be integrally formed with the mover 1230 or separated therefrom. Due to such a configuration, a repulsive force RF2 generated in the first magnetic body 1242 may be transmitted to the first member 1231a of the mover 1230 (RF2'). Thus, the first member 1231a may apply force to the tilting guide part 1241 in the same direction as the repulsive force RF2 generated in the first magnetic body 1242. Also, the second protruding part PR2 of the tilting guide part 1241 may be accommodated in the second protrusion groove PH2. The second member 1226 may be disposed in the second area AR2. The second member 1226 may include the second groove gr2 that faces the first groove gr1. Also, the second member 1226 may include a first protrusion groove PH1 disposed at a surface opposite to the second groove gr2. The first protrusion groove PH1 and the first groove gr1 may overlap in the third direction (Z-axis direction). Accordingly, the X-axis tilt may be accurately performed with respect to the first protruding part PR1 accommodated in the first protrusion groove PH1.

Also, the first protruding part PR1 of the tilting guide part 1241 may be accommodated in the first protrusion groove PH1. Thus, the first protruding part PR1 may come in contact with the first protrusion groove PH1. The maximum diameter of the first protrusion groove PH1 may correspond to the maximum diameter of the first protruding part PR1. This may also apply to the second protrusion groove PH2 and the second protruding part PR2. That is, the maximum diameter of the second protrusion groove PH2 may correspond to the maximum diameter of the second protruding part PR2. Also, thus, the second protruding part PR2 may come in contact with the second protrusion groove PH2. Due to such a configuration, the first-axis tilt with respect to the first protruding part PR1 and the second-axis tilt with respect to the second protruding part PR2 may easily occur, and a tilt radius may be improved.

The tilting guide part 1241 may be disposed in the third area AR3. As described above, the tilting guide part 1241 may include the first protruding part PR1 and the second protruding part PR2. Here, the first protruding part PR1 and the second protruding part PR2 may be disposed on the second surface 1241b and the first surface 1241a, respectively, of the base BS. In this way, even in another embodiment that will be described below, the first protruding part PR1 and the second protruding part PR2 may be disposed in various ways on surfaces of the base BS that face each other. Also, it should be understood that the first protrusion groove PH1 and the second protrusion groove PH2, in which the first protruding part PR1 and the second protruding part PR2 are accommodated, respectively, may also be changed to correspond to the shapes and positions of the first protruding part PR1 and the second protruding part PR2.

Also, the prism 1232 may at least partially overlap the tilting guide part 1241 in the first direction (X-axis direction). Also, the prism 1232 may overlap the first magnetic body 1242 and the second magnetic body 1243 in the first direction (X-axis direction). In other words, in an embodiment, the fourth seating groove 1231S4a may overlap the prism 1232 in the first direction (X-axis direction). In this way, a camera actuator according to an embodiment may minimize the length of the fourth seating groove 1231S4a in the third direction (Z-axis direction) and provide a structure suitable for miniaturization. Accordingly, the camera module including the camera actuator according to an embodiment may also be miniaturized. Also, the prism 1232 and the tilting guide part 1241 may be disposed to be adjacent. In other words, the tilting guide part may be disposed to be adjacent to the center of mass of the mover. In this way, the camera actuator according to an embodiment may minimize a moment value tilting the mover and minimize the consumption of current applied to a coil part or the like to tilt the mover. Thus, power consumption may be reduced and device reliability may be improved.

FIG. 9 is a view illustrating a driving part according to an embodiment.

Referring to FIG. 9, as described above, the driving part 1250 includes the driving magnet 1251, the driving coil 1252, the Hall sensor part 1253, and the substrate part 1254.

Also, as described above, the driving magnet 1251 may include the first magnet 1251a, the second magnet 1251b, and the third magnet 1251c that provide a driving force due to an electromagnetic force. The first magnet 1251a, the second magnet 1251b, and the third magnet 1251c may each be disposed at an outer side surface of the prism holder 1231.

Also, the driving coil 1252 may include a plurality of coils. In an embodiment, the driving coil 1252 may include the first coil 1252a, the second coil 1252b, and the third coil 1252c.

The first coil 1252a may be disposed opposite to the first magnet 1251a. Thus, the first coil 1252a may be disposed in the first housing hole 1221a of the first housing side part 1221 as described above. Also, the second coil 1252b may be disposed opposite to the second magnet 1251b. Thus, the second coil 1252b may be disposed in the second housing hole 1222a of the second housing side part 1222 as described above.

The second camera actuator according to an embodiment may control the mover 1230 to rotate about the first axis (in the X-axis direction) or about the second axis (in the Y-axis direction) due to the electromagnetic force between the driving magnet 1251 and the driving coil 1252. In this way, during OIS implementation, an occurrence of the decentering or tilting phenomenon may be minimized, and optimal optical characteristics may be provided.

Also, according to an embodiment, through the tilting guide part 1241 of the rotating part 1240 disposed between the housing 1220 and the mover 1230, OIS may be implemented to address a limitation in the size of an actuator, and an ultra-slim, ultra-small camera actuator and a camera module including the same may be provided.

The substrate part 1254 may include a first substrate side part 1254a, a second substrate side part 1254b, and a third substrate side part 1254c.

The first substrate side part 1254a and the second substrate side part 1254b may be disposed to face each other. Also, the third substrate side part 1254c may be disposed between the first substrate side part 1254a and the second substrate side part 1254b.

Also, the first substrate side part 1254a may be disposed between the first housing side part and the shield can, and the second substrate side part 1254b may be disposed between the second housing side part and the shield can. Also, the third substrate side part 1254c may be disposed between the third housing side part and the shield can and may be a bottom surface of the substrate part 1254.

The first substrate side part 1254a may be coupled and electrically connected to the first coil 1252a. Also, the first substrate side part 1254a may be coupled and electrically connected to the first Hall sensor 1253a.

The second substrate side part 1254b may be coupled and electrically connected to the second coil 1252b. Also, it should be understood that the second substrate side part 1254b may be coupled and electrically connected to the first Hall sensor.

The third substrate side part 1254c may be coupled and electrically connected to the third coil 1252c. Also, the third substrate side part 1254c may be coupled and electrically connected to the second Hall sensor 1253b.

FIG. 10A is a perspective view of the second camera actuator according to an embodiment, FIG. 10B is a cross-sectional view taken along line DD' in FIG. 10A, and FIG. 10C is an exemplary view of movement of the second camera actuator illustrated in FIG. 10B.

Referring to FIGS. 10A to 10C, the Y-axis tilt may be performed. That is, rotation may occur in the first direction (X-axis direction) and OIS may be implemented.

In an embodiment, the third magnet 1251c disposed at the lower portion of the prism holder 1231 may form an electromagnetic force with the third coil 1252c and tilt or rotate the mover 1230 with respect to the second direction (Y-axis direction).

Specifically, a repulsive force between the first magnetic body 1242 and the second magnetic body 1243 may be transmitted to the first member 1231a and the second member 1226 and transmitted to the tilting guide part 1241 disposed between the first member 1231a and the second member 1226. Accordingly, the tilting guide part 1241 may be coupled to the mover 1230 and the housing 1220 due to the repulsive force.

Also, the second protruding part PR2 may be supported by the first member 1231a. Here, in an embodiment, the tilting guide part 1241 may rotate or tilt with the second protruding part PR2, which protrudes toward the first member 1231a, as a reference axis (or an axis of rotation), that is, with respect to the second direction (Y-axis direction). In other words, the tilting guide part 1241 may rotate or tilt in the first direction (X-axis direction) with the second protruding part PR2 protruding toward the first member 1231a as the reference axis (or axis of rotation).

For example, due to first electromagnetic forces F1A and F1B between the third magnet 1251c disposed in the third seating groove and the third coil 1252c disposed on the third substrate side part, the mover 1230 may rotate by a first angle θ1 (X1 to X1a) in the X-axis direction and OIS may be implemented. Also, due to the first electromagnetic forces F1A and F1B between the third magnet 1251c disposed in the third seating groove and the third coil 1252c disposed on the third substrate side part, the mover 1230 may rotate by the first angle θ1 (X1 to X1b) in the X-axis direction and OIS may be implemented. The first angle θ1 may be in a range of ±1° to 3° but is not limited thereto.

FIG. 11A is a perspective view of the second camera actuator according to an embodiment, FIG. 11B is a cross-sectional view taken along line EE' in FIG. 11A, and FIG. 11C is an exemplary view of movement of the second camera actuator illustrated in FIG. 11B.

Referring to FIGS. 11A to 11C, the X-axis tilt may be performed. That is, the mover 1230 may tilt or rotate in the Y-axis direction and OIS may be implemented.

In an embodiment, the first magnet 1251a and the second magnet 1251b disposed in the prism holder 1231 may form an electromagnetic force with the first coil 1252a and the second coil 1252b, respectively, and tilt or rotate the tilting guide part 1241 and the mover 1230 with respect to the first direction (X-axis direction).

Specifically, a repulsive force between the first magnetic body 1242 and the second magnetic body 1243 may be transmitted to the first member 1231a and the second member 1226 and transmitted to the tilting guide part 1241 disposed between the first member 1231a and the second member 1226. Accordingly, the tilting guide part 1241 may be coupled to the mover 1230 and the housing 1220 due to the repulsive force.

Also, the first-first protruding part PR1a and the first-second protruding part PR1b may be spaced apart in the first direction (X-axis direction) and supported by the second member 1226. Also, in an embodiment, the tilting guide part 1241 may rotate or tilt with the first protruding part PR1, which protrudes toward the second member 1226, as a reference axis (or an axis of rotation), that is, with respect to the first direction (X-axis direction).

In other words, the tilting guide part 1241 may rotate or tilt in the second direction (Y-axis direction) with the first protruding part PR1 protruding toward the second member 1226 as the reference axis (or axis of rotation).

For example, due to second electromagnetic forces F2A and F2B between the first and second magnets 1251a and 1251b disposed in the first seating groove and the first and second coils 1252a and 1252b disposed on the first and second substrate side parts, the mover 1230 may rotate by a second angle θ2 (Y1 to Y1a) in the Y-axis direction and OIS may be implemented. Also, due to the second electromagnetic forces F2A and F2B between the first and second magnets 1251a and 1251b disposed in the first seating groove and the first and second coils 1252a and 1252b disposed on the first and second substrate side parts, the mover 1230 may rotate by the second angle θ2 (Y1 to Y1b) in the Y-axis direction and OIS may be implemented. The second angle θ2 may be in a range of ±1° to 3° but is not limited thereto.

The second camera actuator according to an embodiment may control the mover 1230 to rotate in the first direction (X-axis direction) or the second direction (Y-axis direction) due to the electromagnetic force between the driving magnet in the prism holder and the driving coil disposed in the housing. In this way, during OIS implementation, an occurrence of the decentering or tilting phenomenon may be minimized, and optimal optical characteristics may be provided. Also, as described above, "Y-axis tilt" refers to rotating or tilting in the first direction (X-axis direction), and "X-axis tilt" refers to rotating or tilting in the second direction (Y-axis direction).

Further, as described above, since, in an embodiment, the prism 1232 and the tilting guide part 1241 are disposed to be adjacent, the tilting guide part may be disposed to be adjacent to the center of mass of the mover. Accordingly, the camera actuator according to an embodiment may minimize a moment value tilting the mover and minimize the consumption of current applied to a coil part or the like to tilt the mover. Thus, power consumption may be reduced and device reliability may be improved.

FIG. 12A is an exploded perspective view of a second camera actuator according to a second embodiment, and FIG. 12B is a perspective view of a housing according to the second embodiment.

Referring to FIGS. 12A and 12B, a second camera actuator 1200 according to an embodiment includes a shield can 1210, a housing 1220, a mover 1230, a rotating part 1240, a driving part 1250, a first member 1231a, and a second member 1226.

The mover 1230 may include a prism holder 1231 and a prism 1232 seated on the prism holder 1231. Also, the rotating part 1240 may include a tilting guide part 1241, and a first magnetic body 1242 and a second magnetic body 1243 that have different polarities to press the tilting guide part 1241. Also, the driving part 1250 includes a driving magnet 1251, a driving coil 1252, a Hall sensor part 1253, a substrate part 1254, and a yoke part 1255.

First, the shield can 1210 may be disposed at the outermost side of the second camera actuator 1200 and disposed to surround the rotating part 1240, which will be described below, and the driving part 1250.

The shield can 1210 may block or reduce electromagnetic waves generated from the outside. That is, the shield can 1210 may reduce the occurrence of malfunctions in the rotating part 1240 or the driving part 1250.

The housing 1220 may be disposed inside the shield can 1210. Also, the housing 1220 may be disposed at an inner side of the substrate part 1254 which will be described below. The housing 1220 may be fastened to be fitted to the shield can 1210.

The housing 1220 may include a first housing side part 1221, a second housing side part 1222, a third housing side part 1223, and a fourth housing side part 1224.

The second member 1226 may be disposed in the housing 1220. The second member 1226 may be disposed or included in the housing. Also, the second member 1226 may be coupled to the housing 1220. In an embodiment, the second member 1226 may be disposed between a third housing hole 1223a and a fourth housing side part 1224. Also, the second member 1226 may pass through a housing groove 1223b' formed in the third housing side part 1223 and be coupled to the third housing side part 1223.

Thus, the second member 1226 may be coupled to the housing 1220 and may remain fixed even during a tilt of the mover 1230 which will be described below. Also, the second member 1226 includes a second groove gr2 on which the second magnetic body 1243 is seated. Accordingly, the second member 1226 may fix the position of the second magnetic body 1243 and prevent a change in a support force due to repulsive force. Also, the second member 1226 may be integrally formed with the housing 1220 or separated therefrom. In a case in which the second member 1226 is integrally formed with the housing 1220, a coupling force between the second member 1226 and the housing 1220 may be improved and the reliability of the camera actuator may be improved. Also, in a case in which the second member 1226 is separated from the housing 1220, ease of assembly and manufacture of the second member 1226 and the housing 1220 may be improved. Hereinafter, description will be given on the basis of the case in which the second member 1226 is separated from the housing 1220. The first housing side part 1221 and the second housing side part 1222 may be disposed to face each other. Also, the third housing side part 1223 and the fourth housing side part 1224 may be disposed to face each other.

Also, the third housing side part 1223 and the fourth housing side part 1224 may be disposed between the first housing side part 1221 and the second housing side part 1222.

The third housing side part 1223 may come in contact with the first housing side part 1221, the second housing side part 1222, and the fourth housing side part 1224. The third housing side part 1223 may be a bottom surface in the housing 1220. The above-given description on directions may apply identically.

Also, the first housing side part 1221 may include a first housing hole 1221a. A first coil 1252a, which will be described below, may be disposed in the first housing hole 1221a.

Also, the second housing side part 1222 may include a second housing hole 1222a. Also, a second coil 1252b, which will be described below, may be disposed in the second housing hole 1222a.

The first coil 1252a and the second coil 1252b may be coupled to the substrate part 1254. In an embodiment, the first coil 1252a and the second coil 1252b may be electrically connected to the substrate part 1254 and current may flow therein. The current is a factor of an electromagnetic force that allows the second camera actuator to tilt about the X-axis.

Also, the third housing side part 1223 may include the third housing hole 1223a and the housing groove 1223b'.

A third coil 1252c, which will be described below, may be disposed in the third housing hole 1223a. The third coil 1252c may be coupled to the substrate part 1254. Also, the third coil 1252c may be electrically connected to the substrate part 1254 and current may flow therein. The current is a factor of an electromagnetic force that allows the second camera actuator to tilt about the Y-axis.

The first member 1231a, which will be described below, may be seated in the housing groove 1223b'. Accordingly, the first member 1231a may be coupled to the third housing side part 1223. Although the first member 1231a has been described as being easily coupled to the housing 1220 through the third-second housing hole in the first embodiment, hereinafter, the first member 1231a may be seated in the housing groove via a protrusion or the like and coupled to the housing 1220.

The fourth housing side part 1224 may be disposed between the first housing side part 1221 and the second housing side part 1222 and may come in contact with the first housing side part 1221, the second housing side part 1222, and the third housing side part 1223.

Also, the housing 1220 may include an accommodating part 1225 formed by the first housing side part 1221 to the fourth housing side part 1224. The second member 1226, the first member 1231a, and the prism holder 1231 may be disposed as elements in the accommodating part 1225. Also, the housing 1220 may further include a fifth housing side part that faces the fourth housing side part 1224. In addition, the fifth housing side part may be disposed between the first housing side part 1221 and the second housing side part 1222 and may come in contact with the first housing side part 1221, the second housing side part 1222, and the third housing side part 1223. Also, the fifth housing side part may include an opening area and provide a path in which light reflected from the prism 1232 moves. Also, the fifth housing side part may include a protrusion, a groove, or the like and be easily coupled to another camera actuator adjacent thereto. Due to such a configuration, by simultaneously providing an optical path and improving a coupling force between the fifth housing side part, in which the opening that provides the optical path is formed, and another element, movement of the opening due to separation or the like may be suppressed and a change in the optical path may be minimized.

The mover 1230 includes the prism holder 1231 and the prism 1232 seated on the prism holder 1231. First, the prism holder 1231 may be seated on the accommodating part 1225 of the housing 1220. The prism holder 1231 may include a first prism outer side surface to a fourth prism outer side surface that correspond to the first housing side part 1221, the second housing side part 1222, the third housing side part 1223, and the fourth housing side part 1224, respectively. Also, the prism holder 1231 may include the first member 1231a disposed on the fourth seating groove of the fourth prism outer side surface. This will be described in detail below. The first member 1231a may include a second protrusion groove PH2 formed in a surface that faces the fourth seating groove of the prism holder 1231. The second protruding part of the tilting guide part 1241, which will be described below, may be seated on the second protrusion groove PH2.

The prism 1232 may be seated on the prism holder 1231. To this end, the prism holder 1231 may have a seating surface, and the seating surface may be formed by an accommodation groove. In an embodiment, the prism 1232 may be formed of a mirror. Hereinafter, description will be given on the basis of the case in which the prism 1232 is formed as a mirror, but the prism 1232 may also be formed as a plurality of lenses as in the previous embodiment. For example, the prism 1232 may include a reflecting part disposed therein. However, the present invention is not limited thereto. Also, the prism 1232 may reflect light reflected from the outside (for example, an object) toward the inside of the camera module. In other words, the prism 1232 may change a path of the reflected light and improve a spatial limitation of the first camera actuator and the second camera actuator. It should be understood that, in this way, the camera module may expand an optical path and provide a high magnification range while a thickness of the camera module is minimized.

In addition, the first member 1231*a* may be coupled to the prism holder 1231. The first member 1231*a* may come in contact with a protruding part disposed in an area other than the fourth seating groove in the fourth prism outer side surface of the prism holder 1231. The first member 1231*a* may be integrally formed with the prism holder 1231. Alternatively, the first member 1231*a* may be formed of a structure separated from the prism holder 1231.

The rotating part 1240 includes the tilting guide part 1241, and the first magnetic body 1242 and the second magnetic body 1243 that have different polarities to press the tilting guide part 1241.

The tilting guide part 1241 may be coupled to the mover 1230 and the housing 1220. Specifically, the tilting guide part 1241 may be disposed between the first member 1231*a* and the second member 1226 and be coupled to the mover 1230 and the housing 1220. Accordingly, in the third direction (Z-axis direction), the fourth housing side part 1224, the first member 1231*a*, the tilting guide part 1241, the second member 1226, and the prism holder 1231 may be disposed in this order.

The tilting guide part 1241 may be disposed to be adjacent to the optical axis. In this way, an actuator according to an embodiment may easily change an optical path according to tilts about the first and second axes which will be described below.

Also, the tilting guide part 1241 may include a base, first protruding parts disposed to be spaced apart in the first direction (X-axis direction) on the base, and second protruding parts disposed to be spaced apart in the second direction (Y-axis direction) on the base. Also, the first protruding part and the second protruding part may protrude in opposite directions. This will be described in detail below.

The first magnetic body 1242 may be seated on the fourth seating groove 1231S4*a* of the prism holder 1231. Specifically, the first magnetic body 1242 may be seated on a first groove of the fourth seating groove.

The second magnetic body 1243 may be seated in the second member 1226. In an embodiment, the second magnetic body 1243 may be seated in the second groove gr2 of the second member 1226.

Also, the first magnetic body 1242 and the second magnetic body 1243 may have the same polarity. For example, the first magnetic body 1242 may be a magnet having an N-pole, and the second magnetic body 1243 may be a magnet having an N-pole. Alternatively, conversely, the first magnetic body 1242 may be a magnet having an S-pole, and the second magnetic body 1243 may be a magnet having an S-pole.

Also, the first magnetic body 1242 and the second magnetic body 1243 may generate repulsive force therebetween due to having the same polarity as described above. Due to such a configuration, the repulsive force may be applied to the prism holder 1231 coupled to the first magnetic body 1242 and the second member 1226 or the housing 1220 coupled to the second magnetic body 1243. The repulsive force applied to the prism holder 1231 may also be transmitted to the first member 1231*a*. In this way, the tilting guide part 1241 disposed between the first member 1231*a* and the second member 1226 may be pressed due to the repulsive force. That is, the repulsive force may maintain a force that allows the tilting guide part 1241 to be disposed between the first member 1231*a* and the second member 1226. This will be described in detail below.

Also, the second member 1226 may include extending parts that extend in the first direction from both sides in the second direction (Y-axis direction). The extending part may be coupled to the first housing side part 1221 and the second housing side part 1222. The coupling may be performed by fastening using a protrusion and a groove as described above. Also, the second member 1226 may, in addition to being seated in the housing groove 1223*b'* and coupled to the housing 1220, be coupled to the first member 1231*a* and the mover 1230 that at least partially overlap the second member 1226 in the first direction. Thus, the coupling force between the elements may be improved and the reliability of the camera actuator may be improved.

The driving part 1250 includes the driving magnet 1251, the driving coil 1252, the Hall sensor part 1253, the yoke part 1255, and the substrate part 1254.

The driving magnet 1251 may include a plurality of magnets. In an embodiment, the driving magnet 1251 may include a first magnet 1251*a*, a second magnet 1251*b*, and a third magnet 1251*c*.

The first magnet 1251*a*, the second magnet 1251*b*, and the third magnet 1251*c* may each be disposed at an outer side surface of the prism holder 1231. Also, the first magnet 1251*a* and the second magnet 1251*b* may be disposed to face each other. Also, the third magnet 1251*c* may be disposed on a bottom surface among the outer side surfaces of the prism holder 1231. This will be described in detail below.

The driving coil 1252 may include a plurality of coils. In an embodiment, the driving coil 1252 may include a first coil 1252*a*, a second coil 1252*b*, and a third coil 1252*c*.

The first coil 1252*a* may be disposed opposite to the first magnet 1251*a*. Thus, the first coil 1252*a* may be disposed in the first housing hole 1221*a* of the first housing side part 1221 as described above. Also, when current flows in the first coil 1252*a*, the first magnet 1251*a* may generate a force to which a magnetic field generated in the first coil 1252*a* is reflected.

Also, the second coil 1252*b* may be disposed opposite to the second magnet 1251*b*. Thus, the second coil 1252*b* may be disposed in the second housing hole 1222*a* of the second housing side part 1222 as described above. Also, when current flows in the second coil 1252*b*, the second magnet 1251*b* may generate a force to which a magnetic field generated in the second coil 1252*b* is reflected.

The first coil 1252*a* may be disposed to face the second coil 1252*b*. That is, the first coil 1252*a* may be disposed to be symmetrical to the second coil 1252*b* with respect to the first direction (X-axis direction). This may also apply to the first magnet 1251*a* and the second magnet 1251*b*. That is, the first magnet 1251*a* and the second magnet 1251*b* may be disposed to be symmetrical with respect to the first direction (X-axis direction). Also, the first coil 1252*a*, the second coil 1252*b*, the first magnet 1251*a*, and the second magnet 1251*b* may be disposed to at least partially overlap in the second direction (Y-axis direction). Due to such a configuration, an electromagnetic force between the first coil 1252*a* and the first magnet 1251*a* and an electromagnetic force between the second coil 1252*b* and the second magnet 1251*b* may allow X-axis tilting to be accurately performed without tilting to one side.

The third coil 1252*c* may be disposed opposite to the third magnet 1251*c*. Thus, the third coil 1252*c* may be disposed in the third housing hole 1223a of the third housing side part 1223 as described above. The third coil 1252c may generate an electromagnetic force with the third magnet 1251c and perform Y-axis tilting of the mover 1230 and the rotating part 1240 with respect to the housing 1220.

The Hall sensor part 1253 may include a plurality of Hall sensors. In an embodiment, the Hall sensor part 1253 may include a first Hall sensor 1253a and a second Hall sensor 1253b. The first Hall sensor 1253a may be disposed at an inner side of the first coil 1252a or the second coil 1252b. The first Hall sensor 1253a may detect a change in a magnetic flux at the inner side of the first coil 1252a or the second coil 1252b. In this way, position sensing may be performed between the first and second magnets 1251a and 1251b and the first Hall sensor 1253a. In this way, the second camera actuator according to an embodiment may control the X-axis tilt. Also, the first Hall sensor 1253a may be provided as a plurality of first Hall sensors 1253a.

Also, the second Hall sensor 1253b may be disposed at an inner side of the third coil 1252c. The second Hall sensor 1253b may detect a change in a magnetic flux at the inner side of the third coil 1252c. In this way, position sensing may be performed between the third magnet 1251c and the second Hall sensor 1253b. In this way, the second camera actuator according to an embodiment may control the Y-axis tilt.

The substrate part 1254 may be disposed at a lower portion of the driving part 1250. The substrate part 1254 may be electrically connected to the driving coil 1252 and the Hall sensor part 1253. For example, the substrate part 1254 may be coupled to the driving coil 1252 and the Hall sensor part 1253 using SMT. However, the method of coupling is not limited thereto.

The substrate part 1254 may be disposed between the shield can 1210 and the housing 1220 and coupled to the shield can 1210 and the housing 1220. The coupling may be performed using various methods as described above.

Also, the substrate part 1254 may be formed in various shapes for electrical connection with another camera actuator that is coupled to the second camera actuator described herein. For example, the substrate part 1254 may include a substrate hole 1254h and may be coupled to a side part of the housing (for example, the first housing side part or the second housing side part) through the substrate hole 1254h. In addition, through the coupling, the driving coil 1252 and the Hall sensor part 1253 may be disposed in an outer side surface of the housing 1220.

The substrate part 1254 may include a circuit board with wiring patterns that may be electrically connected, such as a rigid PCB, a flexible PCB, and a rigid-flexible PCB. However, types of the circuit board are not limited thereto.

The yoke part 1255 may include a first yoke 1255a, a second yoke 1255b, and a third yoke 1255c.

The first yoke 1255a may be disposed on the first magnet 1251a. Also, the first yoke 1255a may be seated in the first seating groove 1231S1a. The first yoke 1255a may be coupled to the first magnet 1251a, and the first magnet 1251a may be easily seated in the first seating groove 1231S1a. Accordingly, a coupling force between the first magnet 1251a and the prism holder 1231 may be improved and the reliability of the camera actuator may be improved.

Likewise, the second yoke 1255b may be disposed on the second magnet 1251b. Also, the second yoke 1255b may be seated in the second seating groove 1231S2a. In addition, the second yoke 1255b may be coupled to the second magnet 1251b, and the second magnet 1251b may be easily seated in the second seating groove 1231S2a. Accordingly, a coupling force between the second magnet 1251b and the prism holder 1231 may be improved and the reliability of the camera actuator may be improved.

The third yoke 1255c may be disposed on the third magnet 1251c. Also, the third yoke 1255c may be seated in the third seating groove 1231S3a and coupled to the third magnet 1251c. Accordingly, a coupling force between the third magnet 1251c and the prism holder 1231 may be improved and the reliability of the camera actuator may be improved.

FIG. 13A is a perspective view of a prism holder according to an embodiment, FIG. 13B is a bottom view of the prism holder according to an embodiment, and FIG. 13C is a lateral view of the prism holder according to an embodiment.

Referring to FIGS. 13A to 13C, the prism holder 1231 may include a seating surface 1231k on which the prism 1232 is seated. The seating surface 1231k may be an inclined surface. Also, the prism holder 1231 may include a stepped part 1231b disposed at an upper portion of the seating surface 1231k. Also, in the prism holder 1231, the stepped part 1231b may be coupled to the protruding part 1232a of the prism 1232.

Also, the prism holder 1231 may include a plurality of outer side surfaces. The prism holder 1231 may include a first prism outer side surface 1231S1, a second prism outer side surface 1231S2, a third prism outer side surface 1231S3, and a fourth prism outer side surface 1231S4.

The first prism outer side surface 1231S1 may be disposed to face the second prism outer side surface 1231S2. That is, the first prism outer side surface 1231S1 may be disposed to be symmetrical to the second prism outer side surface 1231S2 with respect to the first direction (X-axis direction).

The first prism outer side surface 1231S1 may be disposed to correspond to the first housing side part 1221. That is, the first prism outer side surface 1231S1 may be disposed to face the first housing side part. Also, the second prism outer side surface 1231S2 may be disposed to face the second housing side part 1222.

Also, the first prism outer side surface 1231S1 may include a first seating groove 1231S1a. In addition, the second prism outer side surface 1231S2 may include a second seating groove 1231S2a. The first seating groove 1231S1a and the second seating groove 1231S2a may be disposed to be symmetrical to each other with respect to the first direction (X-axis direction).

Also, the first seating groove 1231S1a and the second seating groove 1231S2a may be disposed to overlap in the second direction (Y-axis direction). In addition, the first magnet 1251a may be disposed in the first seating groove 1231S1a, and the second magnet 1251b may be disposed in the second seating groove 1231S2a. The first magnet 1251a and the second magnet 1251b may also be disposed to be symmetrical to each other with respect to the first direction (X-axis direction).

As described above, due to the positions of the first and second seating grooves and the first and second magnets, the electromagnetic force caused by each magnet may be coaxially provided to the first prism outer side surface 1231S1 and the second prism outer side surface 1231S2. For example, an area in which the electromagnetic force is applied to the first prism outer side surface 1231S1 (for example, a portion where the electromagnetic force is the strongest) and an area in which the electromagnetic force is applied to the second prism outer side surface 1231S2 (for example, a portion where the electromagnetic force is the strongest) may be disposed on an axis parallel to the second direction (Y-axis direction). In this way, the X-axis tilting may be accurately performed.

The first magnet 1251*a* may be disposed in the first seating groove 1231S1*a*, and the second magnet 1251*b* may be disposed in the second seating groove 1231S2*a*.

The third prism outer side surface 1231S3 may be an outer side surface that comes in contact with the first prism outer side surface 1231S1 and the second prism outer side surface 1231S2 and extends in the second direction (Y-axis direction) from one side of the first prism outer side surface 1231S1 and one side of the second prism outer side surface 1231S2. Also, the third prism outer side surface 1231S3 may be disposed between the first prism outer side surface 1231S1 and the second prism outer side surface 1231S2. The third prism outer side surface 1231S3 may be a bottom surface in the prism holder 1231.

Also, the third prism outer side surface 1231S3 may include a third seating groove 1231S3*a*. The third magnet 1251*c* may be disposed in the third seating groove 1231S3*a*. The third prism outer side surface 1231S3 may be disposed to face the third housing side part 1223. Also, the third housing hole 1223*a* may at least partially overlap the third seating groove 1231S3*a* in the first direction (X-axis direction). Accordingly, the third magnet 1251*c* in the third seating groove 1231S3*a* and the third coil 1252*c* in the third housing hole 1223*a* may be disposed to face each other. Also, the third magnet 1251*c* and the third coil 1252*c* may generate an electromagnetic force to allow the second camera actuator to tilt about the Y-axis.

Also, while the X-axis tilt is performed by the plurality of magnets (the first and second magnets 1251*a* and 1251*b*), the Y-axis tilt may be performed only by the third magnet 1251*c*. In an embodiment, an area of the third seating groove 1231S3*a* may be larger than an area of the first seating groove 1231S1*a* or second seating groove 1231S2*a*. Due to such a configuration, the Y-axis tilt may be performed with similar current control to the X-axis tilt.

The fourth prism outer side surface 1231S4 may be an outer side surface that comes in contact with the first prism outer side surface 1231S1 and the second prism outer side surface 1231S2 and extends in the first direction (X-axis direction) from the first prism outer side surface 1231S1 and the second prism outer side surface 1231S2. Also, the fourth prism outer side surface 1231S4 may be disposed between the first prism outer side surface 1231S1 and the second prism outer side surface 1231S2.

The fourth prism outer side surface 1231S4 may include the fourth seating groove 1231S4*a*. The tilting guide part 1241 may be disposed in the fourth seating groove 1231S4*a*. Also, the first member 1231*a* and the second member 1226 may be disposed in the fourth seating groove 1231S4*a*. In addition, the fourth seating groove 1231S4*a* may include a plurality of areas, e.g., a first area AR1, a second area AR2, and a third area AR3.

The first member 1231*a* may be disposed in the first area AR1. That is, the first area AR1 may overlap the first member 1231*a* in the first direction (X-axis direction).

The second member 1226 may be disposed in the second area AR2. That is, the second area AR2 may overlap the second member 1226 in the first direction (X-axis-direction).

The tilting guide part 1241 may be disposed in the third area AR3. That is, the third area AR3 may overlap the tilting guide part 1241 in the first direction (X-axis direction). Also, the third area AR3 may be disposed between the first area AR1 and the second area AR2.

In the present embodiment, heights of the first area AR1, the second area AR2, and the third area AR3 may be different in the first direction (X-axis direction). In an embodiment, the height may be smaller in the order of the first area AR1>the third area AR3>the second area AR2 in the first direction (X-axis direction). Thus, a step may be formed between the first area AR1 and the third area AR3 and between the third area AR3 and the second area AR2.

Also, the height may be the largest in the first direction at the first member 1231*a* seated in the first area AR1, and the first member 1231*a* may be supported by the step between the first area AR1 and the third area AR3 and may move while being integrally coupled to the mover 1230.

Also, the fourth seating groove 1231S4*a* may include a first groove gr1. The first magnetic body 1242 described above may be seated in the first groove gr1. Also, the first groove gr1 may be provided as a plurality of first grooves gr1 according to the number of first magnetic bodies 1242. That is, the number of first grooves gr1 may correspond to the number of first magnetic bodies 1242.

Also, in an embodiment, the second area AR2 may be disposed to be spaced apart from the first area AR1 in the third direction (Z-axis direction) with the third area AR3 disposed therebetween.

FIG. 14A is a perspective view of a tilting guide part according to an embodiment, FIG. 14B is a perspective view of the tilting guide part in a direction different from FIG. 14A, and FIG. 14C is a cross-sectional view of the tilting guide part taken along line FF' in FIG. 14A.

Referring to FIGS. 14A to 14C, the tilting guide part 1241 according to an embodiment may include a base BS, a first protruding part PR1 protruding from a first surface 1241*a* of the base BS, and a second protruding part PR2 protruding from a second surface 1241*b* of the base BS. Also, as described above, according to structures, the surfaces on which the first protruding part and the second protruding part are formed may be reversed, but description will be given on the basis of the above content.

First, the base BS may include the first surface 1241*a* and the second surface 1241*b* opposite to the first surface 1241*a*. That is, the first surface 1241*a* may be spaced apart from the second surface 1241*b* in the third direction (Z-axis direction), and the first surface 1241*a* and the second surface 1241*b* may be outer side surfaces that are opposite to each other or face each other in the tilting guide part 1241. The tilting guide part 1241 may include the first protruding part PR1 extending toward one side from the first surface 1241*a*. According to an embodiment, the first protruding part PR1 may protrude from the first surface 1241*a* toward the mover. The first protruding part PR1 may be provided as a plurality of first protruding parts PR1 and include a first-first protruding part PR1*a* and a first-second protruding part PR1*b*.

The first-first protruding part PR1*a* and the first-second protruding part PR1*b* may be disposed to be parallel in the first direction (X-axis direction). In other words, the first-first protruding part PR1*a* and the first-second protruding part PR1*b* may overlap in the first direction (X-axis direction). Also, in an embodiment, the first-first protruding part PR1*a* and the first-second protruding part PR1*b* may be divided into two parts by a virtual line extending in the first direction (X-axis direction).

Also, the first-first protruding part PR1*a* and the first-second protruding part PR1*b* may each have a curvature, e.g., a semi-spherical shape. In addition, the first-first protruding part PR1*a* and the first-second protruding part PR1*b* may come in contact with the first groove gr1 of the housing at a point that is the most spaced apart from the first surface 1241a of the base BS.

Also, the tilting guide part 1241 may include a second protruding part PR2 extending toward one side from the second surface 1241b. According to an embodiment, the second protruding part PR2 may protrude from the second surface 1241b toward the housing. In addition, the second protruding part PR2 may be provided as a plurality of second protruding parts PR2 and include a second-first protruding part PR2a and a second-second protruding part PR2b in an embodiment.

The second-first protruding part PR2a and the second-second protruding part PR2b may be disposed to be parallel in the second direction (Y-axis direction). That is, the second-first protruding part PR2a and the second-second protruding part PR2b may overlap in the second direction (Y-axis direction). Also, in an embodiment, the second-first protruding part PR2a and the second-second protruding part PR2b may be divided into two parts by a fourth virtual line VL2' extending in the second direction (Y-axis direction).

The second-first protruding part PR2a and the second-second protruding part PR2b may each have a curvature, e.g., a semi-spherical shape. In addition, the second-first protruding part PR2a and the second-second protruding part PR2b may come in contact with the first member 1231a at a point that is spaced apart from the second surface 1241b of the base BS.

The first-first protruding part PR1a and the first-second protruding part PR1b may be disposed in an area between the second-first protruding part PR2a and the second-second protruding part PR2b in the second direction. According to an embodiment, the first-first protruding part PR1a and the first-second protruding part PR1b may be disposed at the center of a separation space between the second-first protruding part PR2a and the second-second protruding part PR2b in the second direction. Due to such a configuration, an actuator according to an embodiment may allow an angle of the X-axis tilt to have the same range with respect to the X-axis. In other words, the tilting guide part 1241 may provide a range (for example, positive/negative range), in which the X-axis tilt of the mover is possible with respect to the first-first protruding part PR1a and the first-second protruding part PR1b, to be the same with respect to the X-axis.

Also, the second-first protruding part PR2a and the second-second protruding part PR2b may be disposed in an area between the first-first protruding part PR1a and the first-second protruding part PR1b in the first direction. According to an embodiment, the second-first protruding part PR2a and the second-second protruding part PR2b may be disposed at the center of a separation space between the first-first protruding part PR1a and the first-second protruding part PR1b in the first direction. Due to such a configuration, an actuator according to an embodiment may allow an angle of the Y-axis tilt to have the same range with respect to the Y-axis. In other words, with respect to the second-first protruding part PR2a and the second-second protruding part PR2b, the tilting guide part 1241 and the mover may provide a range (for example, positive/negative range), in which the Y-axis tilt is possible, to be the same with respect to the Y-axis.

The first protruding part PR1 may be disposed on a first virtual line VL1. Here, the first virtual line VL1 is a line that divides the first surface 1241a into two parts in the second direction (Y-axis direction). Accordingly, the tilting guide part 1241 may easily perform the X-axis tilt through the first protruding part PR1. Further, since the tilting guide part 1241 performs the X-axis tilt with respect to the first virtual line VL1, a rotational force may be uniformly applied to the tilting guide part 1241. Thus, the X-axis tilt may be precisely performed, and device reliability may be improved.

Also, the first-first protruding part PR1a and the first-second protruding part PR1b may be disposed to be symmetrical with respect to the first virtual line VL1 and a second virtual line VL2. Alternatively, the first-first protruding part PR1a and the first-second protruding part PR1b may be disposed to be symmetrical with respect to a first center point C1. Due to such a configuration, a support force due to support by the first protruding part PR1 during the X-axis tilt may be evenly applied to an upper side and a lower side of the tilting guide part with respect to the second virtual line VL2. Thus, the reliability of the tilting guide part may be improved. Here, the second virtual line VL2 is a line that divides the first surface 1241a into two parts in the first direction (X-axis direction). Also, the first center point C1 may be an intersection point between the first virtual line VL1 and the second virtual line VL2. Alternatively, the first center point C1 may be a point that corresponds to the center of mass according to shapes of the tilting guide part 1241.

Further, since the tilting guide part 1241 performs the Y-axis tilt with respect to the fourth virtual line VL2', a rotational force may be uniformly applied to the tilting guide part 1241. Thus, the Y-axis tilt may be precisely performed, and device reliability may be improved.

Also, the second-first protruding part PR2a and the second-second protruding part PR2b may be disposed to be symmetrical with respect to a third virtual line VL1' on the fourth virtual line VL2'. Alternatively, the second-first protruding part PR2a and the second-second protruding part PR2b may be disposed to be symmetrical with respect to a second center point C1'. Due to such a configuration, a support force due to support by the second protruding part PR2 during the Y-axis tilt may be evenly applied to an upper side and a lower side of the tilting guide part with respect to the fourth virtual line VL2'. Thus, the reliability of the tilting guide part may be improved. Here, the third virtual line VL1' is a line that divides the second surface 1241b into two parts in the second direction (Y-axis direction). The fourth virtual line VL2' is a line that divides the second surface 1241b in the first direction (X-axis direction). Also, the second center point Cr may be an intersection point between the third virtual line VL1' and the fourth virtual line VL2'. Alternatively, the second center point C1' may be a point that corresponds to the center of mass according to shapes of the tilting guide part 1241.

In addition, the above-given description on the first protruding part PR1 and the second protruding part PR2 may apply identically. Also, the shape of the base BS may be changed in various ways according to the weight or fastening structure of the camera actuator.

FIG. 15A is a perspective view of the second camera actuator from which a shield can and a substrate are removed according to an embodiment, FIG. 15B is a cross-sectional view taken along line GG' in FIG. 15A, and FIG. 15C is a cross-sectional view taken along line HH' in FIG. 15A.

Referring to FIGS. 15A to 15C, the first coil 1252a may be disposed at the first housing side part 1221, and the first magnet 1251a may be disposed at the first prism outer side surface 1231S1 of the prism holder 1231. Thus, the first coil 1252a and the first magnet 1251a may be disposed opposite to each other. The first magnet 1251a may at least partially overlap the first coil 1252a in the second direction (Y-axis direction).

Also, the second coil 1252b may be disposed at the second housing side part 1222, and the second magnet 1251b may be disposed at the second prism outer side surface 1231S2 of the prism holder 1231. Thus, the second coil 1252b and the second magnet 1251b may be disposed opposite to each other. The second magnet 1251b may at least partially overlap the second coil 1252b in the second direction (Y-axis direction).

Also, the first coil 1252a and the second coil 1252b may overlap in the second direction (Y-axis direction), and the first magnet 1251a and the second magnet 1251b may overlap in the second direction (Y-axis direction).

Due to such a configuration, an electromagnetic force applied to outer side surfaces of the prism holder (the first prism outer side surface and the second prism outer side surface) may be disposed on an axis parallel to the second direction (Y-axis direction), and the X-axis tilt may be performed accurately and precisely.

Also, the second protruding parts PR2a and PR2b of the tilting guide part 1241 may come in contact with the housing 1220. In addition, in a case in which the X-axis tilt is performed, the second protruding parts PR2a and PR2b may be a reference axis (or an axis of rotation) of the tilt. Thus, the tilting guide part 1241 and the mover 1230 may move vertically.

Also, as described above, the first Hall sensor 1253a may be disposed at an outer side to be electrically connected and coupled to the substrate part 1254. However, the position of the first Hall sensor 1253a is not limited thereto.

Also, the third coil 1252c may be disposed at the third housing side part 1223, and the third magnet 1251c may be disposed at the third prism outer side surface 1231S3 of the prism holder 1231. The third coil 1252c and the third magnet 1251c may at least partially overlap in the first direction (X-axis direction). Accordingly, a strength of an electromagnetic force between the third coil 1252c and the third magnet 1251c may be easily controlled.

As described above, the tilting guide part 1241 may be disposed on the fourth prism outer side surface 1231S4 of the prism holder 1231. Also, the tilting guide part 1241 may be seated in the fourth seating groove 1231S4a of the fourth prism outer side surface. As described above, the fourth seating groove 1231S4a may include the first area AR1, the second area AR2, and the third area AR3.

The first member 1231a may be disposed in the first area AR1, and the first member 1231a may include the second protrusion groove PH2. The second protrusion groove PH2 may be disposed on a surface of the first member 1231a in a direction toward the tilting guide part 1241, that is, on a surface of the first member 1231a that faces the tilting guide part 1241.

Also, a length of the first member 1231a may be larger than a length of the tilting guide part 1241 in the second direction (Y-axis direction). In addition, the first member 1231a may be seated in the first area AR1. Also, the first member 1231a may be seated in the first area AR1, coupled to the mover 1230, and rotate. The first member 1231a may be integrally formed with the mover 1230 or separated therefrom. Due to such a configuration, a repulsive force RF2 generated in the first magnetic body 1242 may be transmitted to the first member 1231a of the mover 1230 (RF2'). Thus, the first member 1231a may apply force to the tilting guide part 1241 in the same direction as the repulsive force RF2 generated in the first magnetic body 1242. Also, the second protruding part PR2 of the tilting guide part 1241 may be accommodated in the second protrusion groove PH2.

The second member 1226 may be disposed in the second area AR2. The second member 1226 may include the second groove gr2 that faces the first groove gr1. Also, the second member 1226 may include a first protrusion groove PH1 disposed at a surface opposite to the second groove gr2. The first protrusion groove PH1 and the first groove gr1 may overlap in the third direction (Z-axis direction). Accordingly, the X-axis tilt may be accurately performed with respect to the first protruding part PR1 accommodated in the first protrusion groove PH1.

Also, the first protruding part PR1 of the tilting guide part 1241 may be accommodated in the first protrusion groove PH1. Thus, the first protruding part PR1 may come in contact with the first protrusion groove PH1. The maximum diameter of the first protrusion groove PH1 may correspond to the maximum diameter of the first protruding part PR1. This may also apply to the second protrusion groove PH2 and the second protruding part PR2. That is, the maximum diameter of the second protrusion groove PH2 may correspond to the maximum diameter of the second protruding part PR2. Also, thus, the second protruding part PR2 may come in contact with the second protrusion groove PH2. Due to such a configuration, the first-axis tilt with respect to the first protruding part PR1 and the second-axis tilt with respect to the second protruding part PR2 may easily occur, and a tilt radius may be improved.

FIG. 16 is a view illustrating a driving part according to an embodiment.

Referring to FIG. 16, as described above, the driving part 1250 includes the driving magnet 1251, the driving coil 1252, the Hall sensor part 1253, the substrate part 1254, and the yoke part 1255.

Also, as described above, the driving magnet 1251 may include the first magnet 1251a, the second magnet 1251b, and the third magnet 1251c that provide a driving force due to an electromagnetic force. The first magnet 1251a, the second magnet 1251b, and the third magnet 1251c may each be disposed at an outer side surface of the prism holder 1231.

Also, the driving coil 1252 may include a plurality of coils. In an embodiment, the driving coil 1252 may include the first coil 1252a, the second coil 1252b, and the third coil 1252c.

The first coil 1252a may be disposed opposite to the first magnet 1251a. Thus, the first coil 1252a may be disposed in the first housing hole 1221a of the first housing side part 1221 as described above. Also, the second coil 1252b may be disposed opposite to the second magnet 1251b. Thus, the second coil 1252b may be disposed in the second housing hole 1222a of the second housing side part 1222 as described above.

The second camera actuator according to an embodiment may control the mover 1230 to rotate about the first axis (in the X-axis direction) or about the second axis (in the Y-axis direction) due to the electromagnetic force between the driving magnet 1251 and the driving coil 1252. In this way, during OIS implementation, an occurrence of the decentering or tilting phenomenon may be minimized, and optimal optical characteristics may be provided.

Also, according to an embodiment, through the tilting guide part 1241 of the rotating part 1240 disposed between the housing 1220 and the mover 1230, OIS may be implemented to address a limitation in the size of an actuator, and an ultra-slim, ultra-small camera actuator and a camera module including the same may be provided.

The above-given description on the yoke part 1255 and the substrate part 1254 may apply identically.

FIG. 17A is a perspective view of the second camera actuator according to an embodiment, FIG. 17B is a cross-sectional view taken along line MM' in FIG. 17A, and FIG. 17C is an exemplary view of movement of the second camera actuator illustrated in FIG. 17B.

Referring to FIGS. 17A to 17C, the Y-axis tilt may be performed. That is, rotation may occur in the first direction (X-axis direction) and OIS may be implemented.

In an embodiment, the third magnet 1251*c* disposed at the lower portion of the prism holder 1231 may form an electromagnetic force with the third coil 1252*c* and tilt or rotate the mover 1230 with respect to the second direction (Y-axis direction).

Specifically, a repulsive force between the first magnetic body 1242 and the second magnetic body 1243 may be transmitted to the first member 1231*a* and the second member 1226 and transmitted to the tilting guide part 1241 disposed between the first member 1231*a* and the second member 1226. Accordingly, the tilting guide part 1241 may be coupled to the mover 1230 and the housing 1220 due to the repulsive force.

Also, the second protruding part PR2 may be supported by the first member 1231*a*. Here, in an embodiment, the tilting guide part 1241 may rotate or tilt with the second protruding part PR2, which protrudes toward the first member 1231*a*, as a reference axis (or an axis of rotation), that is, with respect to the second direction (Y-axis direction). In other words, the tilting guide part 1241 may rotate or tilt in the first direction (X-axis direction) with the second protruding part PR2 protruding toward the first member 1231*a* as the reference axis (or axis of rotation). For example, due to first electromagnetic forces F1A and F1B between the third magnet 1251*c* disposed in the third seating groove and the third coil 1252*c* disposed on the third substrate side part, the mover 1230 may rotate by a first angle θ1 (X1 to X1*a*) in the X-axis direction and OIS may be implemented. Also, due to the first electromagnetic forces F1A and F1B between the third magnet 1251*c* disposed in the third seating groove and the third coil 1252*c* disposed on the third substrate side part, the mover 1230 may rotate by the first angle θ1 (X1 to X1*b*) in the X-axis direction and OIS may be implemented. The first angle θ1 may be in a range of ±1° to 3° but is not limited thereto.

FIG. 18A is a perspective view of the second camera actuator according to an embodiment, FIG. 18B is a cross-sectional view taken along line LL' in FIG. 18A, and FIG. 18C is an exemplary view of movement of the second camera actuator illustrated in FIG. 18B.

Referring to FIGS. 18A to 18C, the X-axis tilt may be performed. That is, the mover 1230 may tilt or rotate in the Y-axis direction and OIS may be implemented.

In an embodiment, the first magnet 1251*a* and the second magnet 1251*b* disposed in the prism holder 1231 may form an electromagnetic force with the first coil 1252*a* and the second coil 1252*b*, respectively, and tilt or rotate the tilting guide part 1241 and the mover 1230 with respect to the first direction (X-axis direction).

Specifically, a repulsive force between the first magnetic body 1242 and the second magnetic body 1243 may be transmitted to the first member 1231*a* and the second member 1226 and transmitted to the tilting guide part 1241 disposed between the first member 1231*a* and the second member 1226. Accordingly, the tilting guide part 1241 may be coupled to the mover 1230 and the housing 1220 due to the repulsive force.

Also, the first-first protruding part PR1*a* and the first-second protruding part PR1*b* may be spaced apart in the first direction (X-axis direction) and supported by the second member 1226. Also, in an embodiment, the tilting guide part 1241 may rotate or tilt with the first protruding part PR1, which protrudes toward the second member 1226, as a reference axis (or an axis of rotation), that is, with respect to the first direction (X-axis direction).

In other words, the tilting guide part 1241 may rotate or tilt in the second direction (Y-axis direction) with the first protruding part PR1 protruding toward the second member 1226 as the reference axis (or axis of rotation).

For example, due to second electromagnetic forces F2A and F2B between the first and second magnets 1251*a* and 1251*b* disposed in the first seating groove and the first and second coils 1252*a* and 1252*b* disposed on the first and second substrate side parts, the mover 1230 may rotate by a second angle θ2 (Y1 to Y1*a*) in the Y-axis direction and OIS may be implemented. Also, due to the second electromagnetic forces F2A and F2B between the first and second magnets 1251*a* and 1251*b* disposed in the first seating groove and the first and second coils 1252*a* and 1252*b* disposed on the first and second substrate side parts, the mover 1230 may rotate by the second angle θ2 (Y1 to Y1*b*) in the Y-axis direction and OIS may be implemented. The second angle θ2 may be in a range of ±1° to 3° but is not limited thereto.

The second camera actuator according to an embodiment may control the mover 1230 to rotate in the first direction (X-axis direction) or the second direction (Y-axis direction) due to the electromagnetic force between the driving magnet in the prism holder and the driving coil disposed in the housing. In this way, during OIS implementation, an occurrence of the decentering or tilting phenomenon may be minimized, and optimal optical characteristics may be provided. Also, as described above, "Y-axis tilt" refers to rotating or tilting in the first direction (X-axis direction), and "X-axis tilt" refers to rotating or tilting in the second direction (Y-axis direction).

Further, as described above, since, in an embodiment, the prism 1232 and the tilting guide part 1241 are disposed to be adjacent, the tilting guide part may be disposed to be adjacent to the center of mass of the mover. Accordingly, the camera actuator according to an embodiment may minimize a moment value tilting the mover and minimize the consumption of current applied to a coil part or the like to tilt the mover. Thus, power consumption may be reduced and device reliability may be improved.

FIG. 19A is an exploded perspective view of a second camera actuator according to a third embodiment, and FIG. 19B is a perspective view of a housing according to the third embodiment.

Referring to FIGS. 19A and 19B, a second camera actuator 1200 according to an embodiment includes a shield can 1210, a housing 1220, a mover 1230, a rotating part 1240, a driving part 1250, a first member 1231*a*, and a second member 1226.

The mover 1230 may include a prism holder 1231 and a prism 1232 seated on the prism holder 1231. Also, the rotating part 1240 may include a tilting guide part 1241, and a first magnetic body 1242 and a second magnetic body 1243 that have different polarities to press the tilting guide part 1241. Also, the driving part 1250 includes a driving magnet 1251, a driving coil 1252, a Hall sensor part 1253, a substrate part 1254, and a yoke part 1255.

First, the shield can 1210 may be disposed at the outermost side of the second camera actuator 1200 and disposed to surround the rotating part 1240, which will be described below, and the driving part 1250.

The shield can 1210 may block or reduce electromagnetic waves generated from the outside. That is, the shield can 1210 may reduce the occurrence of malfunctions in the rotating part 1240 or the driving part 1250.

The housing 1220 may be disposed inside the shield can 1210. Also, the housing 1220 may be disposed at an inner side of the substrate part 1254 which will be described below. The housing 1220 may be fastened to be fitted to the shield can 1210.

The housing 1220 may include a first housing side part 1221, a second housing side part 1222, a third housing side part 1223, and a fourth housing side part 1224.

The first housing side part 1221 and the second housing side part 1222 may be disposed to face each other. Also, the third housing side part 1223 and the fourth housing side part 1224 may be disposed to face each other.

Also, the third housing side part 1223 and the fourth housing side part 1224 may be disposed between the first housing side part 1221 and the second housing side part 1222.

The third housing side part 1223 may come in contact with the first housing side part 1221, the second housing side part 1222, and the fourth housing side part 1224. The third housing side part 1223 may be a bottom surface in the housing 1220. The above-given description on directions may apply identically.

Also, the first housing side part 1221 may include a first housing hole 1221*a*. A first coil 1252*a*, which will be described below, may be disposed in the first housing hole 1221*a*.

Also, the second housing side part 1222 may include a second housing hole 1222*a*. Also, a second coil 1252*b*, which will be described below, may be disposed in the second housing hole 1222*a*.

The first coil 1252*a* and the second coil 1252*b* may be coupled to the substrate part 1254. In an embodiment, the first coil 1252*a* and the second coil 1252*b* may be electrically connected to the substrate part 1254 and current may flow therein. The current is a factor of an electromagnetic force that allows the second camera actuator to tilt about the X-axis.

Also, the third housing side part 1223 may include the third housing hole 1223*a* and the housing groove 1223*b*'.

A third coil 1252*c*, which will be described below, may be disposed in the third housing hole 1223*a*. The third coil 1252*c* may be coupled to the substrate part 1254. Also, the third coil 1252*c* may be electrically connected to the substrate part 1254 and current may flow therein. The current is a factor of an electromagnetic force that allows the second camera actuator to tilt about the Y-axis.

The first member 1231*a*, which will be described below, may be seated in the housing groove 1223*b*'. Accordingly, the first member 1231*a* may be coupled to the third housing side part 1223. As in the second embodiment, the first member 1231*a* may be seated in the housing groove via a protrusion or the like and coupled to the housing 1220.

The fourth housing side part 1224 may be disposed between the first housing side part 1221 and the second housing side part 1222 and may come in contact with the first housing side part 1221, the second housing side part 1222, and the third housing side part 1223.

Also, the housing 1220 may include an accommodating part 1225 formed by the first housing side part 1221 to the fourth housing side part 1224. The second member 1226, the first member 1231*a*, and the mover 1230 may be disposed as elements in the accommodating part 1225.

Also, the housing 1220 may further include a fifth housing side part that faces the fourth housing side part 1224. In addition, the fifth housing side part may be disposed between the first housing side part 1221 and the second housing side part 1222 and may come in contact with the first housing side part 1221, the second housing side part 1222, and the third housing side part 1223. Also, the fifth housing side part may include an opening area and provide a path in which light reflected from the prism 1232 moves. Also, the fifth housing side part may include a protrusion, a groove, or the like and be easily coupled to another camera actuator adjacent thereto. Due to such a configuration, by simultaneously providing an optical path and improving a coupling force between the fifth housing side part, in which the opening that provides the optical path is formed, and another element, movement of the opening due to separation or the like may be suppressed and a change in the optical path may be minimized.

The second member 1226 may be disposed in the housing 1220. The second member 1226 may be disposed or included in the housing. Also, the second member 1226 may be coupled to the housing 1220. In an embodiment, the second member 1226 may be disposed between a third housing hole 1223*a* and a fourth housing side part 1224. Also, the second member 1226 may pass through a housing groove 1223*b*' formed in the third housing side part 1223 and be coupled to the third housing side part 1223.

Thus, the second member 1226 may be coupled to the housing 1220 and may remain fixed even during a tilt of the mover 1230 which will be described below. Also, the second member 1226 includes a second protrusion groove on which a second protrusion of the tilting guide part is seated. Accordingly, the second member 1226 allows the protrusion of the tilting guide part to be disposed adjacent to the prism in the fourth seating groove and allows the protrusion, which is a reference axis of a tilt, to be disposed close to the center of mass of the mover 1230. In this way, since, during the tilt, the moment moving the mover 1230 for the tilt is minimized, current consumed to drive a coil may be minimized and power consumption may be reduced.

Also, the second member 1226 may be integrally formed with the housing 1220 or separated therefrom. In a case in which the second member 1226 is integrally formed with the housing 1220, a coupling force between the second member 1226 and the housing 1220 may be improved and the reliability of the camera actuator may be improved. Also, in a case in which the second member 1226 is separated from the housing 1220, ease of assembly and manufacture of the second member 1226 and the housing 1220 may be improved. Hereinafter, description will be given on the basis of the case in which the second member 1226 is separated from the housing 1220.

The mover 1230 includes the prism holder 1231 and the prism 1232 seated on the prism holder 1231.

First, the prism holder 1231 may be seated on the accommodating part 1225 of the housing 1220. The prism holder 1231 may include a first prism outer side surface to a fourth prism outer side surface that correspond to the first housing side part 1221, the second housing side part 1222, the third housing side part 1223, and the fourth housing side part 1224, respectively. Also, the prism holder 1231 may include the first member 1231*a* disposed on a fourth seating groove 1231S4*a*. This will be described in detail below.

The prism 1232 may be seated on the prism holder 1231. To this end, the prism holder 1231 may have a seating surface, and the seating surface may be formed by an accommodation groove. In an embodiment, the prism 1232 may be formed of a mirror. Hereinafter, description will be given on the basis of the case in which the prism 1232 is formed of a mirror, but the prism 1232 may also be formed of a plurality of lenses as in the previous embodiment. For example, the prism 1232 may include a reflecting part disposed therein. However, the present invention is not limited thereto. Also, the prism 1232 may reflect light reflected from the outside (for example, an object) toward the inside of the camera module. In other words, the prism 1232 may change a path of the reflected light and improve a spatial limitation of the first camera actuator and the second camera actuator. It should be understood that, in this way, the camera module may expand an optical path and provide a high magnification range while a thickness of the camera module is minimized.

In addition, the first member 1231$a$ may be coupled to the prism holder 1231. The first member 1231$a$ may come in contact with a protruding part disposed in an area other than the fourth seating groove in the fourth prism outer side surface of the prism holder 1231. The first member 1231$a$ may be integrally formed with the prism holder 1231. Alternatively, the first member 1231$a$ may be formed of a structure separated from the prism holder 1231.

The rotating part 1240 includes the tilting guide part 1241, and the first magnetic body 1242 and the second magnetic body 1243 that have different polarities to press the tilting guide part 1241.

The tilting guide part 1241 may be coupled to the mover 1230 and the housing 1220. Specifically, the tilting guide part 1241 may be disposed between the first member 1231$a$ and the second member 1226 and be coupled to the mover 1230 and the housing 1220. However, unlike the above description, the tilting guide part 1241 may be disposed between the second member 1226 and the prism holder 1231 in the present embodiment. Specifically, the tilting guide part 1241 may be disposed between the second member 1226 and the fourth seating groove 1231S4$a$ of the prism holder 1231.

In the third direction (Z-axis direction), the fourth housing side part 1224, the first member 1231$a$, the second member 1226, the tilting guide part 1241, and the prism holder 1231 may be disposed in this order. Also, the first magnetic body 1242 and the second magnetic body 1243 may be seated on a first groove gr1 formed in the first member 1231$a$ and a second groove gr2 formed in the second member 1226, respectively. In the present embodiment, positions of the first groove gr1 and the second groove gr2 may be different from positions of first and second grooves described above in other embodiments. However, the first groove gr1 is disposed in the first member 1231$a$ and integrally moves with the mover, and the second groove gr2 is disposed in the second member 1226 to correspond to the first groove gr1 and is coupled to the housing 1220. Thus, the terms may be interchangeably used in the description.

Also, the tilting guide part 1241 may be disposed to be adjacent to the optical axis. In this way, an actuator according to an embodiment may easily change an optical path according to tilts about the first and second axes which will be described below.

The tilting guide part 1241 may include first protruding parts disposed to be spaced apart in the first direction (X-axis direction) and second protruding parts disposed to be spaced apart in the second direction (Y-axis direction). Also, the first protruding part and the second protruding part may protrude in opposite directions. This will be described in detail below.

Also, as described above, the first magnetic body 1242 may be seated on the fourth seating groove 1231S4$a$ of the prism holder 1231. In addition, the second magnetic body 1243 may be seated in the second member 1226.

The first magnetic body 1242 and the second magnetic body 1243 may have the same polarity. For example, the first magnetic body 1242 may be a magnet having an N-pole, and the second magnetic body 1243 may be a magnet having an N-pole. Alternatively, conversely, the first magnetic body 1242 may be a magnet having an S-pole, and the second magnetic body 1243 may be a magnet having an S-pole.

The first magnetic body 1242 and the second magnetic body 1243 may generate repulsive force therebetween due to having the same polarity as described above. Due to such a configuration, the repulsive force may be applied to the first member 1231$a$ or prism holder 1231 coupled to the first magnetic body 1242 and the second member 1226 or housing 1220 coupled to the second magnetic body 1243. Here, the repulsive force applied to the first member 1231$a$ may also be transmitted to the prism holder 1231. In this way, the tilting guide part 1241 disposed between the first member 1231$a$ and the second member 1226 may be pressed due to the repulsive force. That is, the repulsive force may maintain a force that allows the tilting guide part 1241 to be disposed between the first member 1231$a$ and the second member 1226. In this way, the position of the tilting guide part 1241 between the mover 1230 and the housing 1220 may be maintained even during the X-axis tilt or Y-axis tilt.

The driving part 1250 includes the driving magnet 1251, the driving coil 1252, the Hall sensor part 1253, the substrate part 1254, and the yoke part 1255. The above-given description thereon may apply identically.

FIG. 20A is a perspective view of a prism holder according to an embodiment, FIG. 20B is a bottom view of the prism holder according to an embodiment, and FIG. 20C is a lateral view of the prism holder according to an embodiment.

Referring to FIGS. 20A to 20C, the prism holder 1231 may include a seating surface 1231$k$ on which the prism 1232 is seated. The seating surface 1231$k$ may be an inclined surface. Also, the prism holder 1231 may include a stepped part 1231$b$ disposed at an upper portion of the seating surface 1231$k$. Also, in the prism holder 1231, the stepped part 1231$b$ may be coupled to the protruding part 1232$a$ of the prism 1232.

The prism holder 1231 may include a plurality of outer side surfaces. For example, the prism holder 1231 may include a first prism outer side surface 1231S1, a second prism outer side surface 1231S2, a third prism outer side surface 1231S3, and a fourth prism outer side surface 1231S4. The description thereon given above in the previous embodiments may apply identically.

Specifically, the fourth prism outer side surface 1231S4 may include the fourth seating groove 1231S4$a$. Also, in the fourth seating groove 1231S4$a$, the first member 1231$a$, the second member 1226, and the tilting guide part 1241 may be disposed in this order in the third direction (Z-axis direction).

In an embodiment, the fourth seating groove 1231S4$a$ may include a plurality of areas, e.g., a first area AR1, a second area AR2, and a third area AR3.

The first member 1231$a$ may be disposed in the first area AR1. That is, the first area AR1 may overlap the first member 1231$a$ in the first direction (X-axis direction).

The second member 1226 may be disposed in the second area AR2. That is, the second area AR2 may overlap the second member 1226 in the first direction (X-axis-direction).

The tilting guide part 1241 may be disposed in the third area AR3. Also, the third area AR3 may overlap the tilting guide part 1241 in the first direction (X-axis direction).

Also, the second area AR2 may be disposed between the first area AR1 and the third area AR3.

In the present embodiment, heights of the first area AR1, the second area AR2, and the third area AR3 may be different in the first direction (X-axis direction). In an embodiment, the height of the first area AR1 may be larger than the heights of the second area AR2 and the third area AR3 in the first direction (X-axis direction). Thus, a step may be formed between the first area AR1 and the second area AR2.

Also, the first member 1231a may include a first groove gr1. The first magnetic body 1242 described above may be seated in the first groove gr1. Also, the first groove gr1 may be provided as a plurality of first grooves gr1 according to the number of first magnetic bodies 1242. That is, the number of first grooves gr1 may correspond to the number of first magnetic bodies 1242.

FIG. 21A is a perspective view of a tilting guide part according to an embodiment, FIG. 21B is a perspective view of the tilting guide part in a direction different from FIG. 21A, and FIG. 21C is a cross-sectional view of the tilting guide part taken along line FF' in FIG. 21A.

Referring to FIGS. 21A to 21C, the tilting guide part 1241 according to an embodiment may include a base BS, a first protruding part PR1 protruding from a first surface 1241a of the base BS, and a second protruding part PR2 protruding from a second surface 1241b of the base BS. According to structures, the surfaces on which the first protruding part and the second protruding part are formed may be reversed, but description will be given on the basis of the above. Also, the description thereon given above in the previous embodiments may apply identically FIG. 22A is a perspective view of the second camera actuator from which a shield can and a substrate are removed according to an embodiment, FIG. 22B is a cross-sectional view taken along line PP' in FIG. 22A, and FIG. 22C is a cross-sectional view taken along line QQ' in FIG. 22A.

Referring to FIGS. 22A to 22C, the first coil 1252a may be disposed at the first housing side part 1221, and the first magnet 1251a may be disposed at the first prism outer side surface 1231S1 of the prism holder 1231. Thus, the first coil 1252a and the first magnet 1251a may be disposed opposite to each other. The first magnet 1251a may at least partially overlap the first coil 1252a in the second direction (Y-axis direction).

Also, the second coil 1252b may be disposed at the second housing side part 1222, and the second magnet 1251b may be disposed at the second prism outer side surface 1231S2 of the prism holder 1231. Thus, the second coil 1252b and the second magnet 1251b may be disposed opposite to each other. The second magnet 1251b may at least partially overlap the second coil 1252b in the second direction (Y-axis direction).

Also, the first coil 1252a and the second coil 1252b may overlap in the second direction (Y-axis direction), and the first magnet 1251a and the second magnet 1251b may overlap in the second direction (Y-axis direction).

Due to such a configuration, an electromagnetic force applied to outer side surfaces of the prism holder (the first prism outer side surface and the second prism outer side surface) may be disposed on an axis parallel to the second direction (Y-axis direction), and the X-axis tilt may be performed accurately and precisely.

Also, the second protruding parts PR2a and PR2b of the tilting guide part 1241 may come in contact with the second member 1226 of the housing 1220. The second protruding part PR2 may be seated in a second protrusion groove PH2 formed in one side surface of the second member 1226. In addition, in a case in which the X-axis tilt is performed, the second protruding parts PR2a and PR2b may be a reference axis (or an axis of rotation) of the tilt. Thus, the tilting guide part 1241 and the mover 1230 may move vertically.

Also, as described above, the first Hall sensor 1253a may be disposed at an outer side to be electrically connected and coupled to the substrate part 1254. However, the position of the first Hall sensor 1253a is not limited thereto.

Also, the third coil 1252c may be disposed at the third housing side part 1223, and the third magnet 1251c may be disposed at the third prism outer side surface 1231S3 of the prism holder 1231. The third coil 1252c and the third magnet 1251c may at least partially overlap in the first direction (X-axis direction). Accordingly, a strength of an electromagnetic force between the third coil 1252c and the third magnet 1251c may be easily controlled.

As described above, the tilting guide part 1241 may be disposed on the fourth prism outer side surface 1231S4 of the prism holder 1231. Also, the tilting guide part 1241 may be seated in the fourth seating groove 1231S4a of the fourth prism outer side surface. As described above, the fourth seating groove 1231S4a may include the first area AR1, the second area AR2, and the third area AR3.

The first member 1231a may be disposed in the first area AR1, and the first member 1231a may include a first groove gr1. Also, as described above, the first magnetic body 1242 may be disposed in the first groove gr1, and a repulsive force RF2 generated in the first magnetic body 1242 may be transmitted to the fourth seating groove 1231S4a of the prism holder 1231 through the first member 1231a (RF2'). Thus, the prism holder 1231 may apply force to the tilting guide part 1241 in the same direction as the repulsive force RF2 generated in the first magnetic body 1242.

The second member 1226 may be disposed in the second area AR2. The second member 1226 may include a second groove gr2 that faces the first groove gr1. Also, the second member 1226 may include the second protrusion groove PH2 disposed at a surface that corresponds to the second groove gr2. In addition, a repulsive force RF1 generated in the second magnetic body 1243 may be applied to the second member 1226. Accordingly, the second member 1226 and the first member 1231a may press the tilting guide part 1241 disposed between the second member 1226 and the prism holder 1231 through the generated repulsive forces RF1 and RF2'.

The tilting guide part 1241 may be disposed in the third area AR3. As described above, the tilting guide part 1241 may include the first protruding part PR1 and the second protruding part PR2. Here, the first protruding part PR1 and the second protruding part PR2 may be disposed on the second surface 1241b and the first surface 1241a, respectively, of the base BS. In this way, even in another embodiment that will be described below, the first protruding part PR1 and the second protruding part PR2 may be disposed in various ways on surfaces of the base BS that face each other.

The first protrusion groove PH1 may be disposed in the fourth seating groove 1231S4a. Also, the first protruding part PR1 of the tilting guide part 1241 may be accommodated in the first protrusion groove PH1. Thus, the first protruding part PR1 may come in contact with the first protrusion groove PH1. The maximum diameter of the first protrusion groove PH1 may correspond to the maximum diameter of the first protruding part PR1. This may also apply to the second protrusion groove PH2 and the second protruding part PR2. That is, the maximum diameter of the second protrusion groove PH2 may correspond to the maximum diameter of the second protruding part PR2. Also, thus, the second protruding part PR2 may come in contact with the second protrusion groove PH2. Due to such a configuration, the first-axis tilt with respect to the first protruding part PR1 and the second-axis tilt with respect to the second protruding part PR2 may occur easily, and a tilt radius may be improved.

Also, the tilting guide part 1241 may be disposed to be parallel to the first member 1231a and the second member 1226 in the third direction (Z-axis direction), and the tilting guide part 1241 may overlap the prism 1232 in the first direction (X-axis direction). More specifically, in an embodiment, the first protruding part PR1 may overlap the prism 1232 in the first direction (X-axis direction). Further, the first protruding part PR1 may at least partially overlap the third coil 1252c or the third magnet 1251c in the first direction (X-axis direction). That is, in the camera actuator according to an embodiment, each protruding part, which is a central axis of a tilt, may be disposed to be adjacent to the center of mass of the mover 1230. In this way, the tilting guide part may be disposed to be adjacent to the center of mass of the mover. In this way, the camera actuator according to an embodiment may minimize a moment value tilting the mover and minimize the consumption of current applied to a coil part or the like to tilt the mover. Thus, power consumption may be reduced and device reliability may be improved.

Further, the first magnetic body 1242 and the second magnetic body 1243 may not overlap the third coil 1252c or the prism 1232 in the first direction (X-axis direction). In other words, in an embodiment, the first magnetic body 1242 and the second magnetic body 1243 may be disposed to be spaced apart from the third coil 1252c or the prism 1232 in the third direction (Z-axis direction). In this way, the third coil 1252c may minimize a magnetic force received from the first magnetic body 1242 and the second magnetic body 1243. Thus, the camera actuator according to an embodiment may easily perform vertical driving (Y-axis tilt) and minimize power consumption.

Further, as described above, the second Hall sensor 1253b disposed at an inner side of the third coil 1252c may detect a change in a magnetic flux, and position sensing between the third magnet 1251c and the second Hall sensor 1253b may be performed thereby. Here, an offset voltage of the second Hall sensor 1253b may be changed due to an influence of a magnetic field formed from the first magnetic body 1242 and the second magnetic body 1243.

In the second camera actuator according to an embodiment, the first member 1231a, the first magnetic body 1242, the second magnetic body 1243, the second member 1226, and the tilting guide part 1241 may be disposed in this order in the third direction. In an embodiment, a distance at which the first magnetic body 1242 and the second magnetic body 1243 are separated from the prism holder 1231 (or the prism 1232) in the third direction may be larger as compared to a separation distance from the rotary plate 1241. In this way, the second Hall sensor 1253b at the lower portion of the prism holder 1231 may also be disposed to be spaced a predetermined distance apart from the first magnetic body 1242 and the second magnetic body 1243. Thus, since an influence of a magnetic field formed from the first magnetic body 1242 and the second magnetic body 1243 on the second Hall sensor 1253b is minimized, the second Hall sensor 1253b may prevent a Hall voltage from being biased and saturated positively or negatively. That is, the configuration allows a Hall electrode to have a range in which Hall calibration may be performed. Further, although temperature is also affected by a Hall sensor electrode and resolution of a camera lens varies according to temperature, in an embodiment, the case where the Hall voltage is biased positively or negatively may be prevented, compensation for resolution of a lens may also be performed to correspond thereto, and thus a decrease in resolution may be easily prevented.

Also, circuit design to compensate for offset relating to output of the second Hall sensor 1253b (that is, the Hall voltage) may also be easily performed.

FIG. 23 is a view illustrating a driving part according to an embodiment.

Referring to FIG. 23, as described above, the driving part 1250 includes the driving magnet 1251, the driving coil 1252, the Hall sensor part 1253, and the substrate part 1254. The description given above in relation to the camera actuator according to the second embodiment may apply identically.

FIG. 24A is a perspective view of the second camera actuator according to an embodiment, FIG. 24B is a cross-sectional view taken along line SS' in FIG. 24A, and FIG. 24C is an exemplary view of movement of the second camera actuator illustrated in FIG. 24B.

Referring to FIGS. 24A to 24C, the Y-axis tilt may be performed. That is, rotation may occur in the first direction (X-axis direction) and OIS may be implemented.

In an embodiment, the third magnet 1251c disposed at the lower portion of the prism holder 1231 may form an electromagnetic force with the third coil 1252c and tilt or rotate the mover 1230 with respect to the second direction (Y-axis direction).

Specifically, a repulsive force between the first magnetic body 1242 and the second magnetic body 1243 may be transmitted to the first member 1231a and the second member 1226 and finally transmitted to the tilting guide part 1241 disposed between the second member 1226 and the prism holder 1231. Accordingly, the tilting guide part 1241 may be pressed by the mover 1230 and the housing 1220 due to the repulsive force.

Also, the second protruding part PR2 may be supported by the second member 1226. Here, in an embodiment, the tilting guide part 1241 may rotate or tilt with the second protruding part PR2, which protrudes toward the second member 1226, as a reference axis (or an axis of rotation), that is, with respect to the second direction (Y-axis direction). In other words, the tilting guide part 1241 may rotate or tilt in the first direction (X-axis direction) with the second protruding part PR2 protruding toward the second member 1226 as the reference axis (or axis of rotation). For example, due to first electromagnetic forces F1A and F1B between the third magnet 1251c disposed in the third seating groove and the third coil 1252c disposed on the third substrate side part, the mover 1230 may rotate by a first angle θ1 (X1 to X1a) in the X-axis direction and OIS may be implemented. Also, due to the first electromagnetic forces F1A and F1B between the third magnet 1251c disposed in the third seating groove and the third coil 1252c disposed on the third substrate side part, the mover 1230 may rotate by the first angle θ1 (X1 to X1b) in the X-axis direction and OIS may be implemented. The first angle θ1 may be in a range of ±1° to 3° but is not limited thereto.

FIG. 25A is a perspective view of the second camera actuator according to an embodiment, FIG. 25B is a cross-sectional view taken along line RR' in FIG. 25A, and FIG. 25C is an exemplary view of movement of the second camera actuator illustrated in FIG. 25B.

Referring to FIGS. 25A to 25C, the X-axis tilt may be performed. That is, the mover 1230 may tilt or rotate in the Y-axis direction and OIS may be implemented.

In an embodiment, the first magnet 1251a and the second magnet 1251b disposed in the prism holder 1231 may form an electromagnetic force with the first coil 1252a and the second coil 1252b, respectively, and tilt or rotate the tilting guide part 1241 and the mover 1230 with respect to the first direction (X-axis direction).

Specifically, a repulsive force between the first magnetic body 1242 and the second magnetic body 1243 may be transmitted to the second member 1226 and the prism holder 1231 and finally transmitted to the tilting guide part 1241 disposed between the prism holder 1231 and the second member 1226. Accordingly, the tilting guide part 1241 may be pressed by the mover 1230 and the housing 1220 due to the repulsive force.

Also, the first-first protruding part PR1a and the first-second protruding part PR1b may be spaced apart in the first direction (X-axis direction) and supported by the first protrusion groove PH1 formed in the fourth seating groove 1231S4a of the prism holder 1231. Also, in an embodiment, the tilting guide part 1241 may rotate or tilt with the first protruding part PR1, which protrudes toward the prism holder 1231 (for example, in the third direction), as a reference axis (or an axis of rotation), that is, with respect to the first direction (X-axis direction).

For example, due to second electromagnetic forces F2A and F2B between the first and second magnets 1251a and 1251b disposed in the first seating groove and the first and second coils 1252a and 1252b disposed on the first and second substrate side parts, the mover 1230 may rotate by a second angle θ2 (Y1 to Y1a) in the Y-axis direction and OIS may be implemented. Also, due to the second electromagnetic forces F2A and F2B between the first and second magnets 1251a and 1251b disposed in the first seating groove and the first and second coils 1252a and 1252b disposed on the first and second substrate side parts, the mover 1230 may rotate by the second angle θ2 (Y1 to Y1b) in the Y-axis direction and OIS may be implemented. The second angle θ2 may be in a range of ±1° to 3° but is not limited thereto.

The second camera actuator according to an embodiment may control the mover 1230 to rotate in the first direction (X-axis direction) or the second direction (Y-axis direction) due to the electromagnetic force between the driving magnet in the prism holder and the driving coil disposed in the housing. In this way, during OIS implementation, an occurrence of the decentering or tilting phenomenon may be minimized, and optimal optical characteristics may be provided. Also, as described above, "Y-axis tilt" refers to rotating or tilting in the first direction (X-axis direction), and "X-axis tilt" refers to rotating or tilting in the second direction (Y-axis direction).

FIG. 26 is a perspective view of an auto-focusing (AF) or zooming actuator according to another embodiment of the present invention, FIG. 27 is a perspective view in which some components are omitted from the actuator according to the embodiment illustrated in FIG. 26, FIG. 28 is an exploded perspective view in which some components are omitted from the actuator according to the embodiment illustrated in FIG. 26, FIG. 29A is a perspective view of a first lens assembly in the actuator according to the embodiment illustrated in FIG. 28, and FIG. 29B is a perspective view in which some components are omitted from the first lens assembly illustrated in FIG. 29A.

FIG. 26 is a perspective view of an auto-focusing (AF) or zooming actuator according to another embodiment of the present invention, FIG. 27 is a perspective view in which some components are omitted from the actuator according to the embodiment illustrated in FIG. 26, and FIG. 28 is an exploded perspective view in which some components are omitted from the actuator according to the embodiment illustrated in FIG. 26.

Referring to FIG. 26, an actuator 2100 according to an embodiment may include a housing 2020 and a circuit board 2040, a driving part 2142, and a third lens assembly 2130 that are disposed at outer sides of the housing 2020.

FIG. 27 is a perspective view in which the housing 2020 and the circuit board 2040 are omitted from FIG. 26. Referring to FIG. 27, the actuator 2100 according to an embodiment may include a first guide part 2210, a second guide part 2220, a first lens assembly 2110, a second lens assembly 2120, a driving part 2141, and the driving part 2142.

The driving part 2141 and the driving part 2142 may include a coil or a magnet.

For example, in a case in which the driving part 2141 and the driving part 2142 include a coil, the driving part 2141 may include a first coil part 2141b and a first yoke 2141a, and the driving part 2142 may include a second coil part 2142b and a second yoke 2142a.

Alternatively, conversely, the driving part 2141 and the driving part 2142 may include a magnet.

Referring to FIG. 28, the actuator 2100 according to an embodiment may include the housing 2020, the first guide part 2210, the second guide part 2220, the first lens assembly 2110, the second lens assembly 2120, and the third lens assembly 2130.

For example, the actuator 2100 according to an embodiment may include the housing 2020, the first guide part 2210 disposed at one side of the housing 2020, the second guide part 2220 disposed at the other side of the housing 2020, the first lens assembly 2110 that corresponds to the first guide part 2210, the second lens assembly 2120 that corresponds to the second guide part 2220, first balls 2117 (see FIG. 29A) disposed between the first guide part 2210 and the first lens assembly 2110, and second balls (not illustrated) disposed between the second guide part 2220 and the second lens assembly 2120.

Also, in the embodiment, the actuator 2100 may include the third lens assembly 2130 disposed in front of the first lens assembly 2110 in the optical axis direction.

Referring to FIGS. 27 and 28, in the embodiment, the actuator 2100 may include the first guide part 2210 disposed to be adjacent to a first sidewall of the housing 2020 and the second guide part 2220 disposed to be adjacent to a second sidewall of the housing 2020.

The first guide part 2210 may be disposed between the first lens assembly 2110 and the first sidewall of the housing 2020.

The second guide part 2220 may be disposed between the second lens assembly 2120 and the second sidewall of the housing 2020. The first sidewall and the second sidewall of the housing 2020 may be disposed to face each other.

According to an embodiment, since the lens assembly is driven in a state in which the first guide part 2210 and the second guide part 2220, which are precisely numerically controlled, are coupled in the housing 2020, friction torque may be reduced and friction resistance may be reduced. In this way, there are technical effects such as an improvement of a driving force, a decrease in power consumption, and an improvement of control characteristics during zooming.

Accordingly, according to an embodiment, there is a complex technical effect in that, during zooming in or out, friction torque is minimized, and decentering of a lens, tilting of the lens, or an occurrence of a phenomenon in which a lens group and a central axis of an image sensor are not aligned are prevented so that image quality or resolution is significantly improved.

In particular, according to the present embodiment, since the first guide part 2210 and the second guide part 2220, which are separately formed from the housing 2020 and assembled thereto, are separately adopted instead of a guid-erail being disposed in the housing itself, there is a special technical effect in that an occurrence of gradient in a direction of injection may be prevented.

In an embodiment, the first guide part 2210 and the second guide part 2220 may be injected in the X-axis direction, and a length at which the first guide part 2210 and the second guide part 2220 are injected may be shorter than the length of the housing 2020. In this case, there are technical effects in that, when a rail is disposed in the first guide part 2210 and the second guide part 2220, an occur-rence of gradient during injection may be minimized, and the possibility of distortion of the straight line of the rail is low.

More specifically, FIG. 29A is a perspective view of the first lens assembly 2110 in the actuator according to the embodiment illustrated in FIG. 28, and FIG. 29B is a perspective view in which some components are omitted from the first lens assembly 2110 illustrated in FIG. 29A.

Referring to FIG. 28, in the embodiment, the actuator 2100 may include the first lens assembly 2110 that moves along the first guide part 2210 and the second lens assembly 2120 that moves along the second guide part 2220.

Referring back to FIG. 29A, the first lens assembly 2110 may include a first lens barrel 2112*a* in which a first lens 2113 is disposed and a first driving part housing 2112*b* in which a driving part 2116 is disposed. The first lens barrel 2112*a* and the first driving part housing 2112*b* may be a first housing, and the first housing may be formed in the shape of a barrel or a lens barrel. The driving part 2116 may be a driving magnet, but the present invention is not limited thereto, and a coil may be disposed in the driving part 2116 in some cases.

Also, the second lens assembly 2120 may include a second lens barrel (not illustrated) in which a second lens (not illustrated) is disposed and a second driving part housing (not illustrated) in which a driving part (not illus-trated) is disposed. The second lens barrel (not illustrated) and the second driving part housing (not illustrated) may be a second housing, and the second housing may be formed in the shape of a barrel or a lens barrel. The driving part may be a driving magnet, but the present invention is not limited thereto, and a coil may be disposed in the driving part in some cases.

The driving part 2116 may correspond to two first rails 2212.

In an embodiment, the actuator 2100 may be driven using a single ball or a plurality of balls. For example, in an embodiment, the actuator 2100 may include the first balls 2117 disposed between the first guide part 2210 and the first lens assembly 2110 and the second balls (not illustrated) disposed between the second guide part 2220 and the second lens assembly 2120.

For example, in an embodiment, the first balls 2117 may include a single first-first ball 2117*a* or a plurality of first-first balls 2117*a* disposed at an upper side of the first driving part housing 2112*b* and a single first-second ball 2117*b* or a plurality of first-second balls 2117*b* disposed at a lower side of the first driving part housing 2112*b*.

In an embodiment, the first-first ball 2117*a* of the first balls 2117 may move along a first-first rail 2212*a* which is one of the first rails 2212, and the first-second ball 2117*b* of the first balls 2117 may move along a first-second rail 2212*b* which is the other one of the first rails 2212.

According to an embodiment, since the first guide part includes the first-first rail and the first-second rail, the first-first rail and the first-second rail may guide the first lens assembly 2110, and there is a technical effect in that accu-racy of optical axis alignment with the second lens assembly 2120 may be improved during movement of the first lens assembly 2110.

Referring to FIG. 29B, in an embodiment, the first lens assembly 2110 may include a first assembly groove 2112*b*1 in which the first ball 2117 is disposed. The second lens assembly 2120 may include a second assembly groove (not illustrated) in which the second ball is disposed.

The first assembly groove 2112*b*1 of the first lens assem-bly 2110 may be provided as a plurality of first assembly grooves 2112*b*1. Here, a distance between the two first assembly grooves 2112*b*1 of the plurality of first assembly grooves 2112*b*1 in the optical axis direction may be larger than a thickness of the first lens barrel 2112*a*.

In an embodiment, the first assembly groove 2112*b*1 of the first lens assembly 2110 may be formed in a V-shape. Also, the second assembly groove (not illustrated) of the second lens assembly 2120 may be formed in a V-shape. The first assembly groove 2112*b*1 of the first lens assembly 2110 may be formed in a U-shape or a shape that comes in two-point contact or three-point contact with the first ball 2117 rather than the V-shape. The second assembly groove (not illustrated) of the second lens assembly 2120 may be formed in the U-shape or a shape that comes in two-point contact or three-point contact with the second ball rather than the V-shape.

Referring to FIGS. 28 and 29A, in an embodiment, the first guide part 2210, the first ball 2117, and the first assembly groove 2112*b*1 may be disposed on a virtual straight line in a direction from the first sidewall toward the second sidewall. The first guide part 2210, the first ball 2117, and the first assembly groove 2112*b*1 may be disposed between the first sidewall and the second sidewall.

Next, FIG. 30 is a perspective view of the third lens assembly 2130 in the actuator according to the embodiment illustrated in FIG. 28.

Referring to FIG. 30, in an embodiment, the third lens assembly 2130 may include a third housing 2021, a third barrel, and a third lens 2133.

In an embodiment, since the third lens assembly 2130 includes a barrel part recess 2021*r* disposed at an upper end of the third barrel, there are complex technical effects in that the thickness of the third barrel of the third lens assembly 2130 may be maintained to be constant, and the amount of injected product may be reduced to improve accuracy of numerical management.

Also, according to an embodiment, the third lens assem-bly 2130 may include a housing rib 2021*a* and a housing recess 2021*b* disposed in the third housing 2021.

In an embodiment, there are complex technical effects in that the amount of injected product may be reduced to improve accuracy of numerical management by the third lens assembly 2130 including the housing recess 2021*b* disposed in the third housing 2021 and, simultaneously, strength may be secured by the housing rib 2021*a* being disposed in the third housing 2021.

FIG. 31 is a perspective view of a mobile terminal to which a camera module according to an embodiment is applied.

As illustrated in FIG. 31, a mobile terminal 1500 according to an embodiment may include a camera module 1000, a flash module 1530, and an auto-focusing (AF) device 1510 that are provided at a rear surface.

The camera module 1000 may include an image capturing function and an AF function. For example, the camera module 1000 may include an AF function using an image.

The camera module 1000 processes a still image or a video frame of a moving image obtained by an image sensor in a capturing mode or a video call mode.

The processed video frame may be displayed on a predetermined display unit and stored in a memory. A camera (not illustrated) may also be disposed at a front surface of the body of the mobile terminal.

For example, the camera module 1000 may include a first camera module 1000A and a second camera module 1000B, and OIS implementation, as well as the AF or zooming function, may be possible due to the first camera module 1000A.

The flash module 1530 may include a light emitting device, which is configured to emit light, disposed therein. The flash module 1530 may be operated by operation of the camera of the mobile terminal or by user control.

The AF device 1510 may include, as a light emitting part, one package of a surface light emission laser device.

The AF device 1510 may include an AF function using a laser. The AF device 1510 may be mostly used under a condition in which the AF function using an image of the camera module 1000 is degraded, for example, in a dark environment or when a distance from a subject is around 10 m.

The AF device 1510 may include a light emitting part including a vertical-cavity surface-emitting laser (VCSEL) semiconductor device and a light receiving part, such as a photodiode, configured to convert light energy to electrical energy.

FIG. 32 is a perspective view of a vehicle to which the camera module according to an embodiment is applied.

For example, FIG. 32 is a view of an exterior of a vehicle that includes a vehicle driving assistance device to which the camera module 1000 according to an embodiment is applied.

Referring to FIG. 32, a vehicle 700 according to an embodiment may include wheels 13FL and 13FR, which are configured to rotate due to a power source, and a predetermined sensor. The sensor may be a camera sensor 2000 but is not limited thereto.

The camera sensor 2000 may be a camera sensor to which the camera module 1000 according to an embodiment is applied. The vehicle 700 according to the embodiment may obtain image information through the camera sensor 2000 that captures an image of the front or an image of surroundings and may, using the image information, determine whether a lane is not identified and generate a virtual lane when the lane is determined as not being identified.

For example, the camera sensor 2000 may capture the view in front of the vehicle 700 to obtain the image of the front, and a processor (not illustrated) may analyze an object included in the image of the front to obtain image information.

For example, in a case in which objects such as a lane, an adjacent vehicle, a driving obstacle, and a median strip, a kerb, roadside trees, or the like that correspond to indirect road markers are included in the image captured by the camera sensor 2000, the processor may detect the objects and include the objects in the image information. Here, the processor may obtain information on distances from the objects detected through the camera sensor 2000 and further supplement the image information.

The image information may be information on the objects included in the image. The camera sensor 2000 may include an image sensor and an image processing module.

The camera sensor 2000 may process a still image or a moving image obtained by the image sensor (e.g., a complementary metal oxide semiconductor (CMOS) or a charge-coupled device (CCD)).

The image processing module may process the still image or moving image obtained through the image sensor to extract necessary information and transmit the extracted information to the processor.

Here, the camera sensor 2000 may include a stereo camera to improve object measurement accuracy and to further secure information on a distance between the vehicle 700 and the objects or the like, but the present invention is not limited thereto.

According to an embodiment of the present invention, it is possible to provide a camera actuator that may be applied to an ultra-slim, ultra-small, and high-resolution camera. In particular, it is possible to efficiently arrange OIS actuators without increasing the overall size of a camera module.

According to an embodiment of the present invention, since tilting in the X-axis direction and tilting in the Y-axis direction do not cause magnetic field interference, the tilting in the X-axis direction and the tilting in the Y-axis direction can be implemented with a stable structure, and the tilting in the X-axis direction and the tilting in the Y-axis direction do not cause magnetic field interference with an AF or zooming actuator, it is possible to realize a precise OIS function.

According to an embodiment of the present invention, by addressing a limitation in the size of a lens, it is possible to secure a sufficient amount of light and implement OIS with low power consumption.

The present invention has been described above on the basis of embodiments thereof, but the embodiments are merely examples and are not intended to limit the present invention. Those of ordinary skill in the art to which the present invention pertains should understand that various modifications and applications that are not described herein are possible within the scope not departing from essential characteristics of the present embodiments. For example, each element specifically described in the embodiments may be modified and embodied. Also, all differences relating to the modifications and applications should be interpreted as falling within the scope of the present invention defined by the attached claims.

What is claimed is:

1. A camera actuator comprising:
a housing;
a mover disposed in the housing;
a tilting guide part disposed between the housing and the mover;
a driving part disposed in the housing to drive the mover;
a first magnetic body disposed at the mover;
a first member coupled to the mover;
a second member disposed between the first member and the tilting guide part; and a second magnetic body disposed to face the first magnetic body, wherein the tilting guide part is pressed by the mover due to repulsive force of the first magnetic body and the second magnetic body.

2. The camera actuator of claim 1, wherein:

the mover includes a groove configured to accommodate the tilting guide part; and wherein the first member and the second member are configured to be accommodated in the groove.

3. The camera actuator of claim 2, wherein:

the tilting guide part is disposed between the first member and the second member.

4. The camera actuator of claim 3, wherein:

the groove includes a first groove located on a bottom surface;

the second member includes a second groove disposed on a surface facing the first groove;

the first magnetic body is disposed in the first groove; and the second magnetic body is disposed in the second groove.

5. The camera actuator of claim 4, wherein the tilting guide part includes a base, a first protruding part that protrudes from a first surface of the base, and a second protruding part that protrudes from a second surface of the base.

6. The camera actuator of claim 5, wherein the mover is tilted about a first axis with respect to the first protruding part and is tilted about a second axis with respect to the second protruding part.

7. The camera actuator of claim 6, wherein:

the first member includes a first protrusion groove configured to accommodate the first protruding part; and the second member includes a second protrusion groove configured to accommodate the second protruding part.

8. The camera actuator of claim 7, wherein:

the first member, the second member, and the tilting guide part at least partially overlap the mover along the second axis;

the tilting guide part overlaps the first member and the second member along a third axis; and the third axis is perpendicular to the first axis and the second axis.

9. The camera actuator of claim 6, wherein:

the groove includes a first area in which the first member is accommodated and a second area in which the second member is accommodated; and a height of the first area is larger than a height of the second area.

10. The camera actuator of claim 9, wherein:

the groove includes a third area in which the tilting guide part is accommodated; and the third area is disposed between the first area and the second area.

11. The camera actuator of claim 10, wherein a height of the third area is smaller than the height of the first area and larger than the height of the second area.

12. The camera actuator of claim 6, wherein:

the driving part includes a driving magnet and a driving coil;

the driving magnet includes a first magnet, a second magnet, and a third magnet;

the driving coil includes a first coil, a second coil, and a third coil;

the first magnet and the second magnet are symmetrically disposed about the first axis on the mover;

the first coil and the second coil are symmetrically disposed about the first axis between the housing and the mover;

the third magnet is disposed on a bottom surface of the mover; and the third coil is disposed on a bottom surface of the housing.

13. The camera actuator of claim 12, wherein the tilting guide part overlaps the third coil or the third magnet along a third axis.

14. The camera actuator of claim 2, wherein the second member is disposed between the tilting guide part and the first member.

15. A camera actuator comprising:

a housing;

a mover disposed in the housing;

a tilting guide part disposed between the housing and the mover;

a driving part disposed in the housing to drive the mover;

a first magnetic body disposed at the mover;

a first member coupled to the mover;

a second member disposed between the first member and the tilting guide part; and a support member disposed in the housing and in which a second magnetic body is disposed, wherein the tilting guide part is disposed between the mover and the support member, and surfaces of the first magnetic body and the second magnetic body that face each other have the same polarity.

* * * * *